US012347922B2

(12) United States Patent
Son et al.

(10) Patent No.: US 12,347,922 B2
(45) Date of Patent: Jul. 1, 2025

(54) ELECTRONIC DEVICE COMPRISING ANTENNA

(71) Applicant: Samsung Electronics Co., Ltd., Suwon-si (KR)

(72) Inventors: Cheolhong Son, Suwon-si (KR); Sangha Lee, Suwon-si (KR); Soonho Hwang, Suwon-si (KR); Sungjun Lee, Suwon-si (KR); Hyunjeong Lee, Suwon-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 379 days.

(21) Appl. No.: 17/885,012

(22) Filed: Aug. 10, 2022

(65) Prior Publication Data
US 2022/0384934 A1 Dec. 1, 2022

Related U.S. Application Data

(63) Continuation of application No. PCT/KR2021/001125, filed on Jan. 28, 2021.

(30) Foreign Application Priority Data

Feb. 10, 2020 (KR) .................. 10-2020-0015647
Nov. 9, 2020 (KR) .................. 10-2020-0148691

(51) Int. Cl.
*H01Q 1/38* (2006.01)
*H01Q 1/24* (2006.01)
(Continued)

(52) U.S. Cl.
CPC .............. *H01Q 1/243* (2013.01); *H01Q 1/38* (2013.01); *H01Q 7/00* (2013.01); *H04M 1/0216* (2013.01); *H04M 1/0277* (2013.01)

(58) Field of Classification Search
CPC ............ H01Q 1/243; H01Q 1/38; H01Q 7/00; H01Q 1/01–38; H04M 1/0216; H04M 1/0277
(Continued)

(56) References Cited

U.S. PATENT DOCUMENTS 9,667,296 B2   5/2017 Kim et al.
10,230,154 B2  3/2019 Jeon et al.
(Continued)

FOREIGN PATENT DOCUMENTS

KR  10-2016-0027700 A   3/2016
KR  10-2017-0066944 A   6/2017
(Continued)

OTHER PUBLICATIONS

Korean Office Action dated Dec. 23, 2024, issued in Korean Application No. 10-2020-0148691.

*Primary Examiner* — Jean A Gelin
(74) *Attorney, Agent, or Firm* — Jefferson IP Law, LLP

(57) ABSTRACT

An electronic device comprising an antenna is provided. The electronic device includes a lateral member forming at least one region of the lateral surface of the electronic device, the lateral member including a first conductive portion, a second conductive portion, and a first non-conductive portion, a printed circuit board connected to one end of the second conductive portion, which is adjacent to the first conductive portion, and including a first region and a ground, the first region including a conductive layer, and a wireless communication circuit disposed on the printed circuit board. The conductive layer of the first region may be electrically connected to the ground, the first conductive portion may receive power from the wireless communication circuit at a first point and be grounded via the printed circuit board at a second point, and the second conductive portion may receive power from the wireless communication circuit.

15 Claims, 26 Drawing Sheets

(51) Int. Cl.
*H01Q 7/00* (2006.01)
*H04M 1/02* (2006.01)
(58) Field of Classification Search
USPC .................................................... 455/575.3
See application file for complete search history.

(56) References Cited

U.S. PATENT DOCUMENTS

| | | |
|---|---|---|
| 10,256,527 B2 | 4/2019 | Kim et al. |
| 10,651,542 B2 | 5/2020 | Choi et al. |
| 10,827,633 B2 | 11/2020 | Yoo et al. |
| 11,056,768 B2 | 7/2021 | Kim et al. |
| 11,101,827 B2 | 8/2021 | Kim et al. |
| 2016/0064820 A1 | 3/2016 | Kim et al. |
| 2018/0269561 A1* | 9/2018 | Kim .................... H01Q 1/48 |
| 2020/0051468 A1* | 2/2020 | Jung .................. G06F 1/1616 |
| 2020/0119429 A1* | 4/2020 | Park .................. G06F 1/1616 |
| 2022/0166867 A1 | 5/2022 | Nam et al. |
| 2023/0299460 A1* | 9/2023 | Lee .................. H04M 1/0216 |
| | | 343/702 |

FOREIGN PATENT DOCUMENTS

| | | |
|---|---|---|
| KR | 10-2018-0027802 A | 3/2018 |
| KR | 10-2018-0109509 A | 10/2018 |
| KR | 10-2018-0122210 A | 11/2018 |
| KR | 10-2019-0089375 A | 7/2019 |
| KR | 10-2020-0101234 A | 8/2020 |

* cited by examiner

ELECTRONIC DEVICE COMPRISING ANTENNA

CROSS-REFERENCE TO RELATED APPLICATION(S)

This application is a continuation application, claiming priority under § 365(c), of an International application No. PCT/KR2021/001125, filed on Jan. 28, 2021, which is based on and claims the benefit of a Korean patent application number 10-2020-0015647, filed on Feb. 10, 2020, in the Korean Intellectual Property Office, and of a Korean patent application number 10-2020-0148691, filed on Nov. 9, 2020, in the Korean Intellectual Property Office, the disclosure of each of which is incorporated by reference herein in its entirety.

BACKGROUND

1. Field

The disclosure relates to an electronic device including an antenna.

2. Description of Related Art

With the development of digital technologies, electronic devices have been provided in various forms such as a smartphone, a tablet personal computer (PC), or a personal digital assistant (PDA). Electronic devices have been developed in a portable form or a user wearable form in order to improve portability and a user's accessibility.

A portable electronic device such as a smartphone or a tablet PC has been made lighter and thinner for ease of portability, and has been developed in various fields for convenience of use. For example, while a foldable electronic device having a flexible display provides a relatively larger screen than a typical bar-type electronic device, portability can be improved since a size thereof is decreased when being folded, whereby the foldable electronic device is recognized as an electronic device satisfying consumer preferences.

The above information is presented as background information only to assist with an understanding of the disclosure. No determination has been made, and no assertion is made, as to whether any of the above might be applicable as prior art with regard to the disclosure.

SUMMARY

To support various communication technologies, an electronic device may include multiple antennas. As the area of a display applied to an electronic device gets larger with the development of digital technologies, an electronic device may utilize, as an antenna radiator, a conductive part included in a side member forming a side surface of the electronic device in order to reduce deterioration in radiation performance of an antenna by a display.

For example, when the electronic device utilizes, as an antenna radiator, the conductive part included in the side member, interference between radio frequency (RF) signals radiated from multiple antennas may occur due to a limit of the conductive part, and the radiation performance may thus deteriorate due to the interference. In another example, to implement multiple antennas, when an electronic device divides a conductive part into multiple parts and implements the same as an antenna radiator, a desired frequency band may not be supported.

Aspects of the disclosure are to address at least the above-mentioned problems and/or disadvantages and to provide at least the advantages described below. Accordingly, an aspect of the disclosure is to provide an electronic device which changes a layout structure of an antenna radiator to reduce interference occurring between antenna radiators and improve antenna performance (e.g., radiation performance).

Additional aspects will be set forth in part in the description which follows and, in part, will be apparent from the description, or may be learned by practice of the presented embodiments.

In accordance with an aspect of the disclosure, an electronic device is provided. The electronic device includes a lateral member which forms at least a region of a side surface of the electronic device and includes a first conductive portion, a second conductive portion adjacent to one end of the first conductive portion, and a first non-conductive portion positioned between the first conductive portion and the second conductive portion, a printed circuit board which is connected to one end of the second conductive portion adjacent to the first conductive portion and includes a first region including a conductive layer, and a ground, and a wireless communication circuit disposed on the printed circuit board, wherein the conductive layer of the first region is electrically connected to the ground, the first conductive portion is fed from the wireless communication circuit at a first point and is grounded to the ground of the printed circuit board at a second point adjacent to the first region, the second conductive portion is fed from the wireless communication circuit at a third point positioned at the other end of the second conductive portion, and the second conductive portion and the first region of the printed circuit board, which is connected to the second conductive portion, operate as a loop antenna.

In accordance with another aspect of the disclosure, an electronic device is provided. The electronic device includes a lateral member which forms at least a region of a side surface of the electronic device and includes a first conductive portion, a second conductive portion adjacent to one end of the first conductive portion, a third conductive portion adjacent to the other end of the first conductive portion, a fourth conductive portion adjacent to the second conductive portion, a fifth conductive portion adjacent to the third conductive portion, a first non-conductive portion positioned between the first conductive portion and the second conductive portion, a second non-conductive portion disposed between the first conductive portion and the third conductive portion, a third non-conductive portion disposed between the second conductive portion and the fourth conductive portion, a fourth non-conductive portion disposed between the third conductive portion and one end of the fifth conductive portion, and a fifth non-conductive portion disposed at the other end of the fifth conductive portion, a printed circuit board which is connected to one end of the second conductive portion adjacent to the first conductive portion and includes a first region including a conductive layer, and a ground, and a wireless communication circuit disposed on the printed circuit board and electrically connected to the first conductive portion, the second conductive portion, the third conductive portion, the fourth conductive portion, or the fifth conductive portion, wherein the conductive layer of the first region is electrically connected to the ground, the first conductive portion is fed from the wireless communication circuit at a first point and is grounded to the ground of the printed circuit board at a second point adjacent to the first region, the second conductive portion is fed from the wireless communication circuit at a third point positioned at the other end of the second conductive portion, and the second conductive portion and the first region of the printed circuit board, which is connected to the second conductive portion, operate as a loop antenna.

In accordance with another aspect of the disclosure, an electronic device is provided. The electronic device includes a foldable housing including a first housing, a second housing, and a connecting structure connecting the first housing and the second housing such that the second housing is rotatable with respect to the first housing, and a flexible display disposed to extend from a region of the first housing to at least a region of the second housing while crossing the connecting structure and configured to be foldable according to the rotation, wherein the first housing includes a first lateral member which forms a side surface of the first housing and includes a first conductive portion, a second conductive portion adjacent to one end of the first conductive portion, and a first non-conductive portion positioned between the first conductive portion and the second conductive portion, a first printed circuit board which is positioned in the first housing, is connected to one end of the second conductive portion adjacent to the first conductive portion, and includes a first region including a conductive layer, and a first ground, and a wireless communication circuit disposed on the first printed circuit board, the second housing includes a second lateral member forming a side surface of the second housing, and a second printed circuit board positioned in the second housing and including a second ground, the conductive layer of the first region is electrically connected to the first ground, the wireless communication circuit is electrically connected to the second printed circuit board through an electrical connecting member, the first conductive portion is fed from the wireless communication circuit at a first point and is grounded to the first ground of the first printed circuit board at a second point adjacent to the first region, the second conductive portion is fed from the wireless communication circuit at a third point positioned at the other end of the second conductive portion, and the second conductive portion and the first region of the first printed circuit board, which is connected to the second conductive portion, operate as a loop antenna.

An electronic device according to an embodiment of the disclosure can reduce the number of antennas through a loop antenna having a wideband characteristic, thereby improving space usability of the electronic device.

An electronic device according to an embodiment of the disclosure can improve isolation between adjacent antennas, thereby improving antenna radiation performance.

An electronic device according to an embodiment of the disclosure can implement 4-Rx antenna diversity through four reception antennas, thereby reducing network latency.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
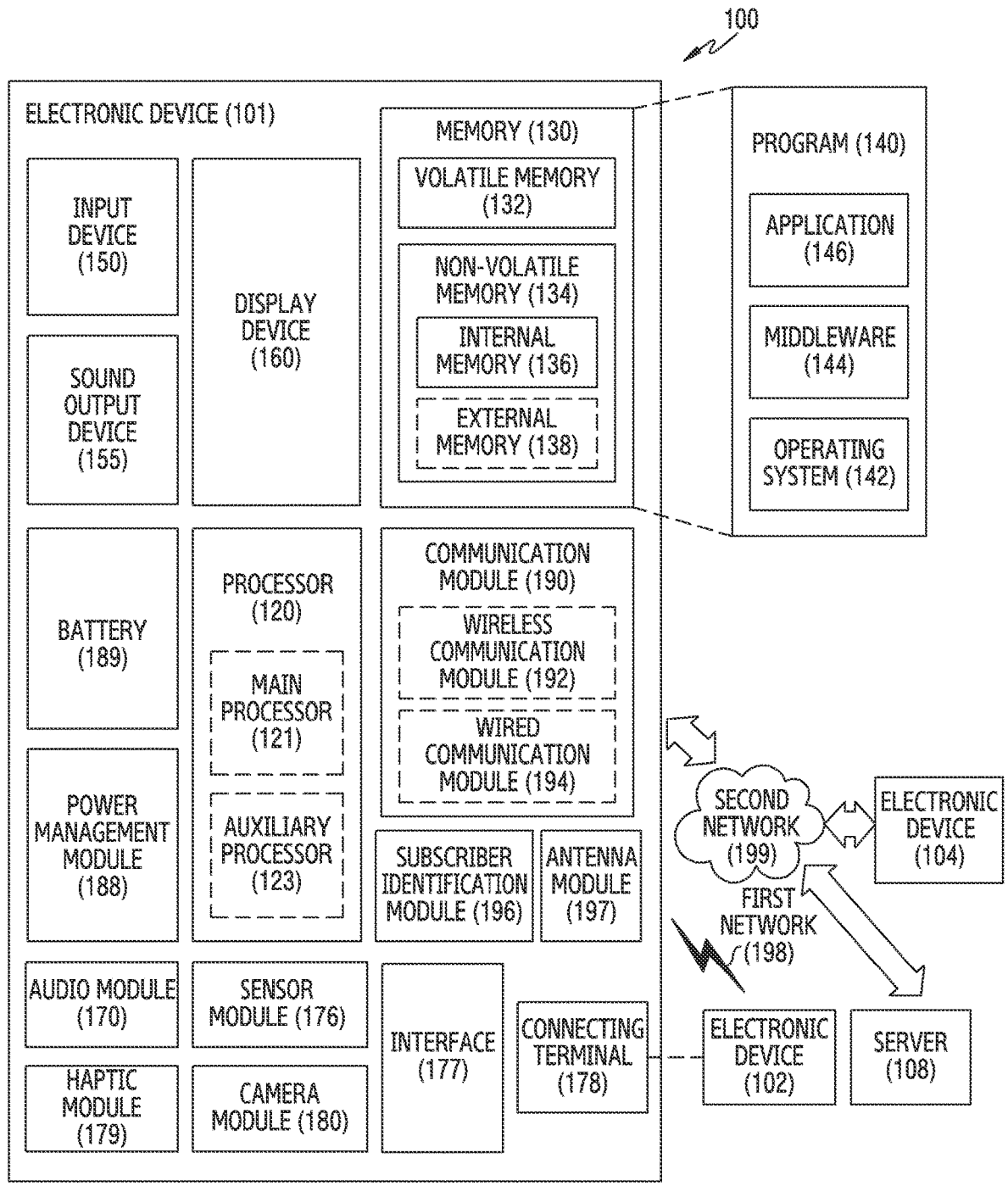
FIG. 1 is a block diagram of an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include internal memory 136 and external memory 138.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming call. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the displays, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a cellular network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2A:
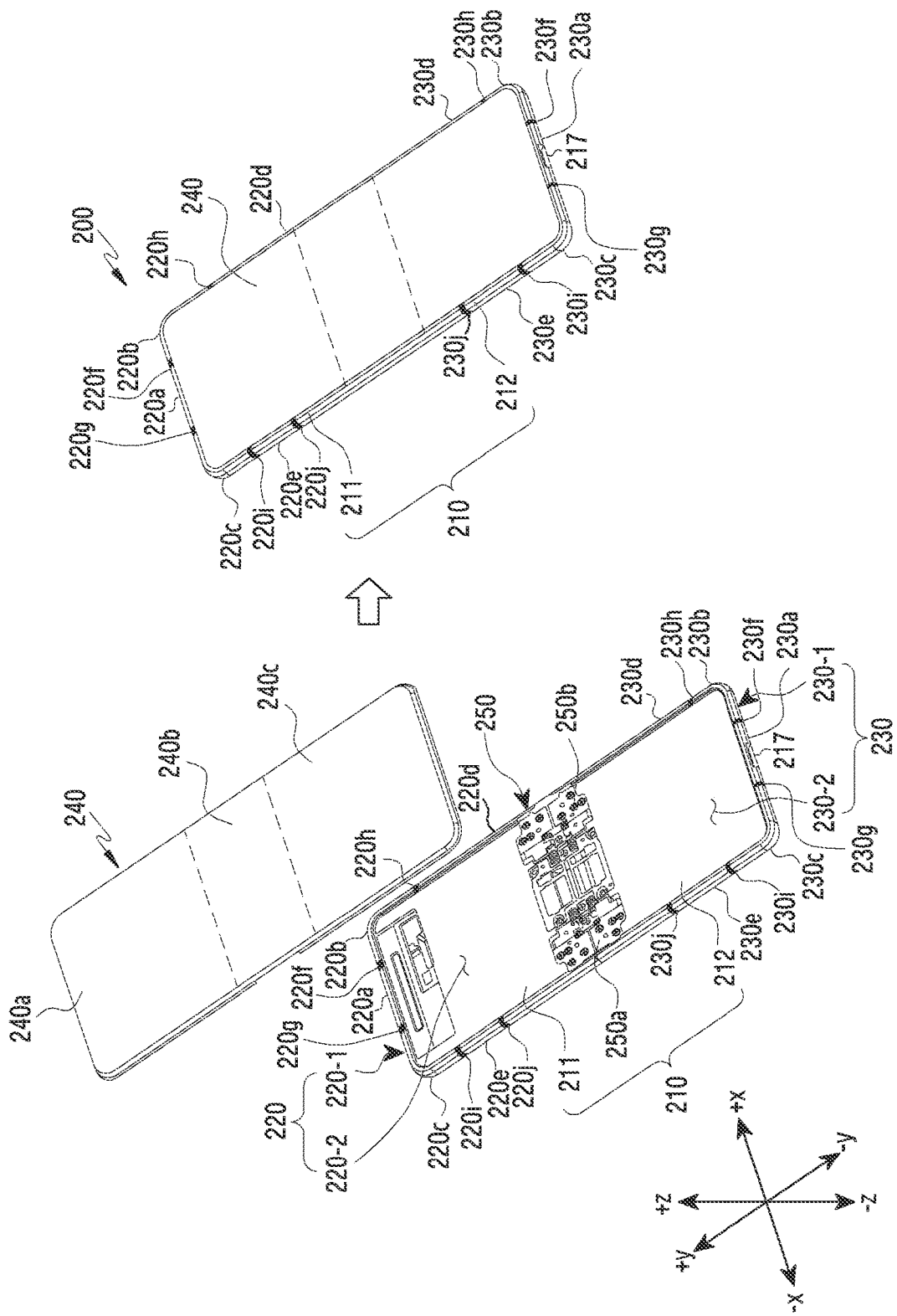
FIG. 2A is an exploded view of an electronic device and a view showing an unfolded state thereof according to an embodiment of the disclosure.
Figure 2B:
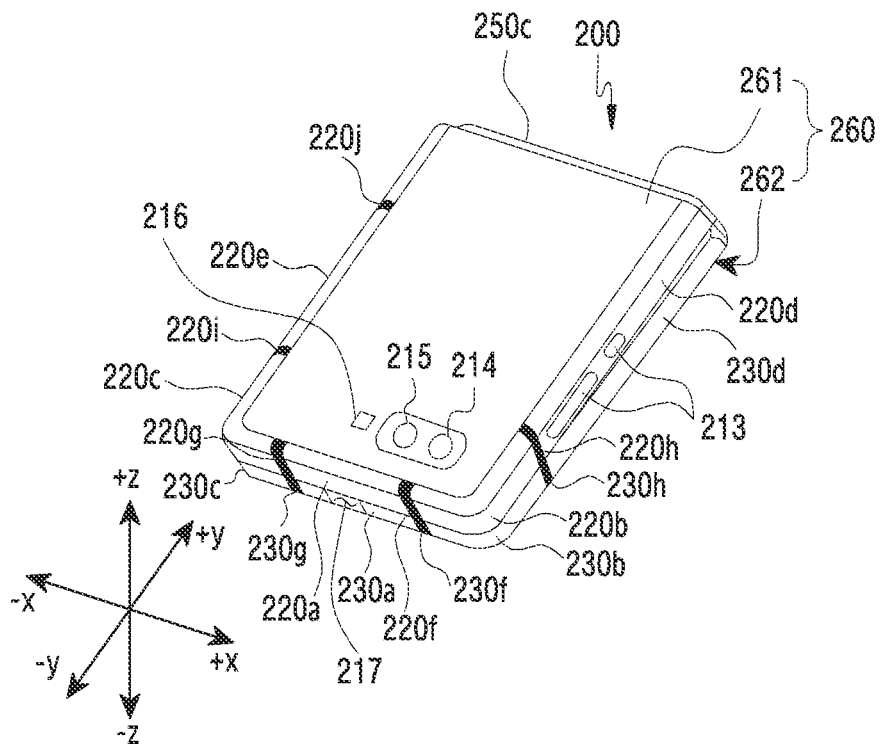
FIG. 2B is a view showing a folded state of the electronic device in FIG. 2A according to an embodiment of the disclosure.
Figure 2B:
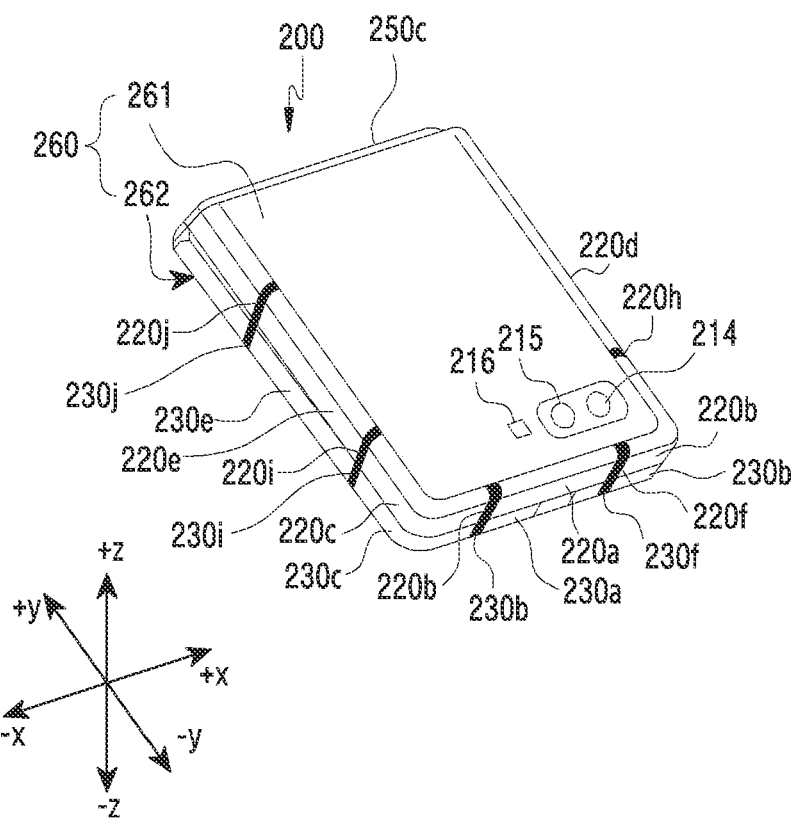

FIG. 2A is an exploded view of an electronic device and a view showing an unfolded state thereof according to an embodiment of the disclosure. FIG. 2B is a view showing a folded state of the electronic device in FIG. 2A according to an embodiment of the disclosure.

Referring to FIGS. 2A and 2B, an electronic device 200 (e.g., the electronic device 101 in FIG. 1) according to an embodiment may include a foldable housing 210 (or a "housing") including a first housing 211 and a second housing 212, a first lateral member 220, a second lateral member 230, a flexible display 240, a connecting structure 250, and/or a cover 260 (or a "rear cover").

According to an embodiment, the first housing 211 and the second housing 212 may form an inner space in which electronic components included in the electronic device 200 may be arranged. In an example, multiple electronic components for performing various functions of the electronic device 200 may be arranged in the inner space of the first housing 211 and the second housing 212. For example, electronic components such as a front camera, rear cameras 214 and 215, an interface (e.g., the interface 177 in FIG. 1), a receiver, or a sensor module (e.g., the sensor module 176 in FIG. 1) may be arranged in the inner space of the first housing 211 and the second housing 212. Although not illustrated in the drawings, according to an embodiment, some of the electronic components may be seen from the front surface of the electronic device 200 through at least one opening or recess formed in the flexible display 240.

In an example (e.g., see FIG. 2A), when the electronic device 200 is in an unfolded state, the first housing 211 and the second housing 212 may be arranged side by side to each other. In another example (e.g., see FIG. 4), when the electronic device 200 is in a folded state, the first housing 211 may be rotatable with reference to the second housing 212 through the connecting structure 250, and as the result, one surface of the first housing 211 and one surface of the second housing 212 may be arranged to face each other.

According to an embodiment, a recess for accommodating the flexible display 240 may be formed in the first housing 211 and the second housing 212. For example, the flexible display 240 may be seated in the recess to be supported by the first lateral member 220 and/or the second lateral member 230 which are arranged between the flexible display 240, the first housing 211, and the second housing 212.

According to an embodiment, the first lateral member 220 may form a side surface of the first housing 211 of the foldable housing 210. In an example, the first lateral member 220 may include a first structure 220-1 forming the side surface of the first housing 211 and/or a second structure 220-2 providing a space to be arranged electronic components arranged in the first housing 211. In an example, the first structure 220-1 of the first lateral member 220 may include multiple conductive portions (e.g., 220a, 220b, 220c, 220d, and 220e) having conductivity, and multiple non-conductive portions (e.g., 220f, 220g, 220h, 220i, and 220j) (or "segment regions") arranged between the multiple conductive portions. In an embodiment, the first structure 220-1 and the second structure 220-2 may be integrally formed, or may be formed by coupling thereof. As another example, the first structure 220-1 and the second structure 220-2 may include the same material, or may include materials different from each other.

In an example, the first structure 220-1 of the first lateral member 220 may include a first conductive portion 220a disposed on the side surface of the upper end (e.g., the +y-direction in FIG. 2A) of the first housing 211, a second conductive portion 220b disposed in a region adjacent to one end of the right side (e.g., the +x-direction in FIG. 2A) of the first conductive portion 220a, a third conductive portion 220c disposed in a region adjacent to one end of the left side (e.g., the −x-direction in FIG. 2A) of the first conductive portion 220a, a fourth conductive portion 220d which is adjacent to the second conductive portion 220b and disposed on the right side surface (e.g., the side surface in the +x-direction in FIG. 2A) of the first housing 211, and/or a fifth conductive portion 220e which is adjacent to the third conductive portion 220c and disposed on the left side surface (e.g., the side surface in the −x-direction in FIG. 2A) of the first housing 211.

In another example, the multiple non-conductive portions may include a first non-conductive portion 220f disposed between the first conductive portion 220a and the second conductive portion 220b, a second non-conductive portion 220g disposed between the first conductive portion 220a and the third conductive portion 220c, a third non-conductive portion 220h disposed between the second conductive portion 220b and the fourth conductive portion 220d, a fourth non-conductive portion 220i disposed between the third conductive portion 220c and one end of the fifth conductive portion 220e, and/or a fifth non-conductive portion 220j disposed at the other end of the fifth conductive portion 220e. The multiple non-conductive portions described above may be arranged between the first conductive portion 220a, the second conductive portion 220b, the third conductive portion 220c, the fourth conductive portion 220d, and/or the fifth conductive portion 220e to insulate the multiple conductive portions, and accordingly, the first structure 220-1 of the first lateral member 220 may be segmented into five regions. The electronic device 200 according to an embodiment may use, as an antenna radiator, at least one of the first conductive portion 220a, the second conductive portion 220b, the third conductive portion 220c, the fourth conductive portion 220d, and the fifth conductive portion 220e which are insulated. In an example, the multiple non-conductive portions may be filled with a non-conductive material such as a synthetic resin.

In an example, the second structure 220-2 of the first lateral member 220 may be formed of a metal material and/or non-metal material having a designated rigidity in order to support electronic components (e.g., the flexible display 240 or a printed circuit board). In an example, the second structure 220-2 may have one surface (e.g., the surface in the +z-direction in FIG. 2A) on which at least a region (e.g., the first region 240a) of the flexible display 240 is disposed, and the other surface (e.g., the surface in the −z-direction in FIG. 2A) which faces a direction opposite to the one surface and on which a printed circuit board (not shown) is disposed.

According to an embodiment, the second lateral member 230 may form a side surface of the second housing 212 of the foldable housing 210. In an example, the second lateral member 230 may include a third structure 230-1 forming the side surface of the second housing 212 and/or a fourth structure 230-2 providing a space to be arranged electronic components arranged in the second housing 212. In an example, the third structure 230-1 of the second lateral member 230 may include multiple conductive portions (e.g., 230a, 230b, 230c, 230d, and 230e) having conductivity, and multiple non-conductive portions (e.g., 230f, 230g, 230h, 230i, and 230j) (or "segment regions") arranged between the multiple conductive portions. In an embodiment, the third structure 230-1 and the fourth structure 230-2 may be integrally formed, or may be formed by coupling thereof. As another example, the third structure 230-1 and the fourth structure 230-2 may include the same material, or may include materials different from each other.

In an example, a third structure 230-1 of the second lateral member 230 may include a sixth conductive portion 230a disposed on the side surface of the lower end (e.g., the −y-direction in FIG. 2A) of the second housing 212, a seventh conductive portion 230b disposed in a region adjacent to one end of the right side (e.g., the +x-direction in FIG. 2A) of the sixth conductive portion 230a, an eighth conductive portion 230c disposed in a region adjacent to one end of the left side (e.g., the −x-direction in FIG. 2A) of the sixth conductive portion 230a, a ninth conductive portion 230d which is adjacent to the seventh conductive portion 230b and disposed on the right side surface (e.g., the side surface in the +x-direction in FIG. 2A) of the second housing 212, and/or a tenth conductive portion 230e which is adjacent to the eighth conductive portion 230c and disposed on the left side surface (e.g., the side surface in the −x-direction in FIG. 2A) of the second housing 212.

In another example, the multiple non-conductive portions may include a sixth non-conductive portion 230f disposed between the sixth conductive portion 230a and the seventh conductive portion 230b, a seventh non-conductive portion 230g disposed between the sixth conductive portion 230a and the eighth conductive portion 230c, an eighth non-conductive portion 230h disposed between the seventh conductive portion 230b and the ninth conductive portion 230d, a ninth non-conductive portion 230i disposed between the eighth conductive portion 230c and one end of the tenth conductive portion 230e, and/or a tenth non-conductive portion 230j disposed at the other end of tenth conductive portion 230e. The multiple non-conductive portions described above may be arranged between the sixth conductive portion 230a, the seventh conductive portion 230b, the eighth conductive portion 230c, the ninth conductive portion 230d, and/or the tenth conductive portion 230e to insulate the multiple conductive portions, and accordingly, the third structure 230-1 of the second lateral member 230 may be segmented into five regions. The electronic device 200 according to an embodiment may use, as an antenna radiator, at least one of the sixth conductive portion 230a, the seventh conductive portion 230b, the eighth conductive portion 230c, the ninth conductive portion 230d, and the tenth conductive portion 230e which are insulated. In an example, the multiple non-conductive portions may be filled with a non-conductive material such as a synthetic resin.

According to an embodiment, when the electronic device 200 is in a folded state (e.g., see FIG. 4), the first conductive portion 220a of the first lateral member 220 may be disposed at a position corresponding to the sixth conductive portion 230a of the second lateral member 230, and the second conductive portion 220b of the first lateral member 220 may be disposed at a position corresponding to the seventh conductive portion 230b of the second lateral member 230. According to an embodiment, when the electronic device 200 is in a folded state, the third conductive portion 220c may be disposed at a position corresponding to the eighth conductive portion 230c, the fourth conductive portion 220d may be disposed at a position corresponding to the ninth conductive portion 230d, and the fifth conductive portion 220e may be disposed at a position corresponding to the tenth conductive portion 230e. The electronic device 200 according to an embodiment may reduce interference between multiple conductive portions utilized as an antenna radiator through the above-described arrangement structure.

In an example, the fourth structure 230-2 of the second lateral member 230 may be formed of a metal material and/or non-metal material having a designated rigidity in order to support electronic components (e.g., the flexible display 240 or a printed circuit board). In an example, the fourth structure 230-2 may have one surface (e.g., the surface in the +z-direction in FIG. 2A) on which at least a region (e.g., the second region 240b) of the flexible display 240 is disposed, and the other surface (e.g., the surface in the −z-direction in FIG. 2A) which faces a direction opposite to the one surface and on which a printed circuit board (not shown) is disposed.

According to an embodiment, the flexible display 240 may be disposed in the first housing 211 and the second housing 212, and when the electronic device 200 is in an unfolded state, may form the front surface (e.g., the surface in the +z-direction in FIG. 3) of the electronic device 200. For example, the flexible display 240 may be disposed to extend from a region of the first housing 211 to at least a region of the second housing 212 while crossing the connecting structure 250. According to an embodiment, the flexible display 240 may be seated in a recess formed by the first housing 211 and the second housing 212 to be disposed in the first housing 211 and the second housing 212.

In an example, the flexible display 240 may include a first region 240a corresponding to at least a region of the first housing 211, a second region 240b corresponding to at least a region of the second housing 212, and a folding region 240c which is positioned between the first region 240a and the second region 240b and has a flexible characteristic. However, it is not limited to the above-described embodiment, and according to another embodiment, at least one of the first region 240a, the second region 240b, and the folding region 240c of the flexible display 240 may be formed to have a flexible characteristic. In an example, when the electronic device 200 is in an unfolded state, the first region 240a, the folding region 240c, and the second region 240b may face the same direction (e.g., the +z-direction in FIG. 3) and be may be arranged to be parallel to one another. As another example, when the electronic device 200 is in a folded state, at least a part of the folding region 240c may be bent, and thus the first region 240a and the second region 240b may be arranged to face each other.

According to an embodiment, the connecting structure 250 may connect the first housing 211 and the second housing 212. Accordingly, the second housing 212 may rotate within a designated rotation range with reference to the first housing 211, or conversely, the first housing 211 may rotate within a designated rotation range with reference to the second housing 212. In an example, a recess may be formed in a region to which the first housing 211 and the second housing 212 are connected, and the connecting structure 250 may be disposed between the first housing 211 and the second housing 212. As an example, the above-described recess may be formed in a groove shape having a specific curvature, but is not limited thereto.

According to an embodiment, the connecting structure 250 may be a hinge assembly. In an example, the hinge assembly may include at least one hinge structure 250a or 250b, and a hinge housing 250c. The at least one hinge structure 250a or 250b may include multiple gears, multiple gear shafts, and/or multiple rotating lateral members (brackets), and may be connected to the first housing 211 and/or second housing 212 so as to allow the first housing 211 and/or second housing 212 to rotate within a designated rotation range. As an embodiment, the hinge housing 250c may be seen from the outside of the electronic device 200 or covered by the foldable housing 210 according to a state of the electronic device 200. In an example (e.g., see FIG. 2A), when the electronic device 200 is in an unfolded state, the hinge housing 250c may be covered by the foldable housing 210, and thus not be seen from the outside of the electronic device 200. In another example (e.g., see FIG. 2B), when the electronic device 200 is in a folded state, the hinge housing 250c may be seen from the outside of the electronic device 200 by the rotation of the first housing 211 and the second housing 212.

According to an embodiment, the cover 260 may be disposed at the lower end (e.g., the −z-direction in FIG. 2A) of the first housing 211 and the second housing 212 so as to form the rear surface of the electronic device 200. As an example, the cover 260 may include a first cover 261 coupled to the lower end (e.g., the −z-direction in FIG. 2A) of the first housing 211, and a second cover 262 coupled to the lower end of the second housing 212. As another example, the first cover 261 and the first housing 211 may be integrally formed. As another example, the second cover 262 and the second housing 212 may be integrally formed.

The electronic device 200 according to an embodiment may further include a sensor module (not shown), a key input device 213, camera modules 214, 215, and 216, and/or connector holes 217 and 217.

In an embodiment, the electronic device 200 may include a sensor module not illustrated, and thus may generate an electronic signal or a data value corresponding to an internal operation state thereof or an external environment state. For example, the sensor module may further include a proximity sensor, a fingerprint sensor integrated into the flexible display 240 or disposed to be adjacent thereto, and/or a biometric sensor (e.g., a heart rate monitor (HRM) sensor). In an example, the electronic device 200 may further include a sensor module not illustrated, for example, at least one of a gesture sensor, a gyro sensor, a barometric pressure sensor, a magnetic sensor, an acceleration sensor, a grip sensor, a color sensor, an infrared (IR) sensor, a biometric sensor, a temperature sensor, a humidity sensor, or an illuminance sensor.

According to an embodiment, the key input device 213 may be disposed on at least a side surface of the foldable housing 210. For example (e.g., see FIG. 2B), the key input device 213 may be disposed on a side surface of the first housing 211. In another example (not shown), the key input device 213 may also be disposed on a side surface of the second housing 212. In another embodiment, the electronic device 200 may not include a part or the whole of key input device 213 described above, and the key input device 213 not included therein may also be implemented as a different type such as a soft key, on the flexible display 240.

According to an embodiment, the camera modules 214, 215, and 216 may include a first camera device (not shown) (or a "front camera") facing the flexible display 240, second camera devices 214 and 215 (or a "rear camera") arranged on the cover 260, and/or a flash 216. For example, the camera devices 214 and 215 may include at least one lens, an image sensor, and/or an image signal processor. For example, the flash 216 may include a light-emitting diode or a xenon lamp.

According to an embodiment, the connector hole 217 may accommodate a connector for transmitting or receiving power and/or data to or from an external electronic device, and/or a connector for transmitting or receiving an audio signal to or from an external electronic device. For an example, the connector hole 217 may include a USB connector or an earphone jack (not shown) (or "an earphone interface").

Figure 3:
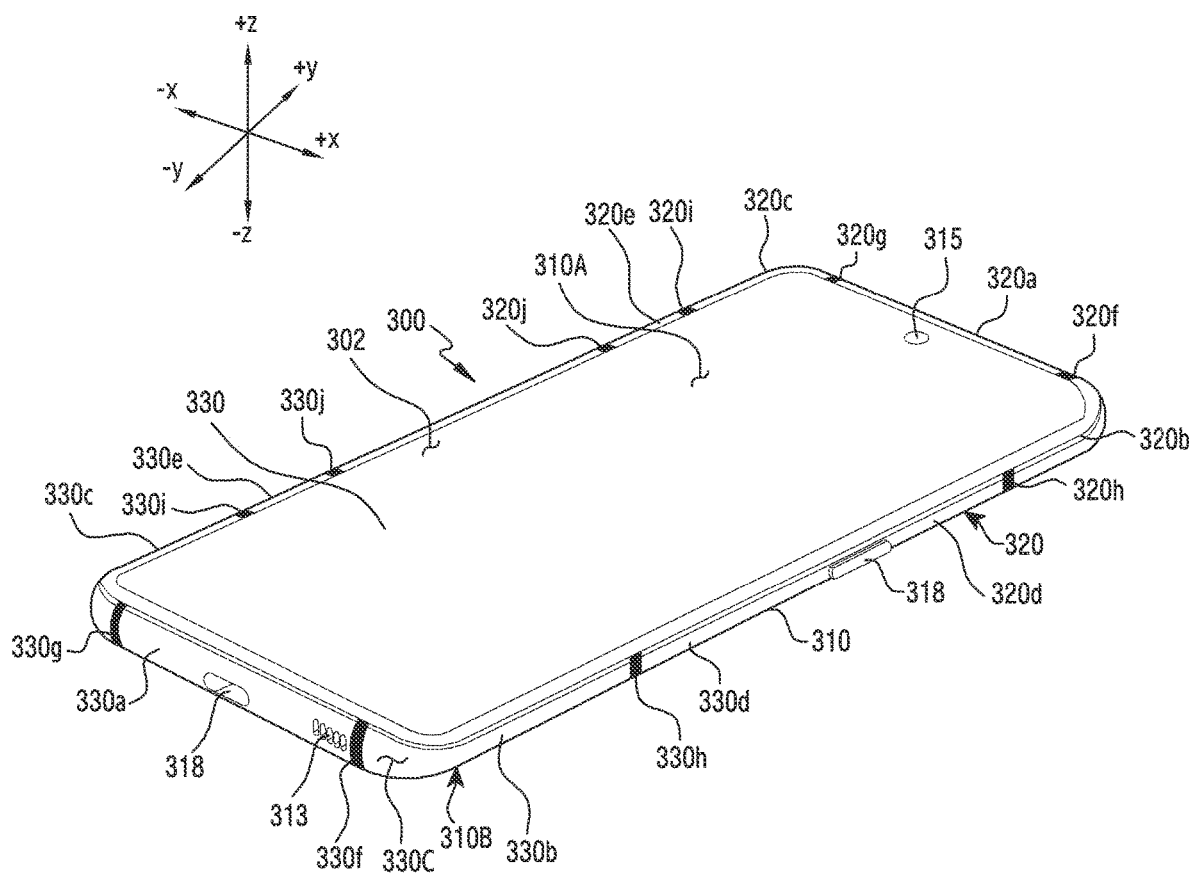
FIG. 3 is a perspective view seen from a side of an electronic device according to an embodiment of the disclosure.

FIG. 3 is a perspective view seen from a side of an electronic device according to an embodiment of the disclosure. FIG. 3 illustrates a bar-type electronic device 300.

Referring to FIG. 3, an electronic device 300 (e.g., the electronic device 101 in FIG. 1) according to another embodiment may include a housing 310, an audio module 313, a first camera device 315, a key input device 317, a connector hole 318, and/or a display 330.

According to an embodiment, the housing 310 may include a first surface (or a front surface) 310A, a second surface (or a rear surface) 310B, and a side surface (or a side wall) 310C surrounding the space between the first surface 310A and the second surface 310B. According to another embodiment (not shown), the housing 310 may be referred to as a structure which forms at least a part of the first surface 310A, the second surface 310B, and/or the side surface 310C in FIG. 3.

According to an embodiment, the first surface 310A may be formed by a front plate 302 (e.g., a glass plate including various coating layers, or a polymer plate) of which at least a portion is substantially transparent. According to an embodiment, the front plate 302 may include a curved-surface portion bent from the first surface 310A toward a rear plate (not shown) in at least a side edge portion thereof and to seamlessly extend therefrom.

According to an embodiment, the second surface 310B may be formed by a rear plate (not shown) substantially opaque. In an example, the rear plate may be formed of coated or colored glass, ceramic, polymer, metal (e.g., aluminum, stainless steel (STS), or magnesium), or a combination of at least two of the above-described materials. According to an embodiment, the rear plate may include a curved-surface portion bent from the second surface 310B toward the front plate 302 in at least a side edge portion thereof and to seamlessly extend therefrom.

According to an embodiment, the side surface 310C may be coupled to the front plate 302 and the rear plate, and may be formed by a lateral member 320 including a metal and/or a polymer. According to another embodiment (not shown), the rear plate and the lateral member 320 may be integrally formed and may include the same material (e.g., a metal material such as aluminum).

According to an embodiment, the lateral member 320 may include multiple conductive portions (e.g., 320a, 320b, 320c, 320d, 320e, 330a, 330b, 330c, 330d, and 330e) having conductivity and/or multiple non-conductive portions (e.g., 320f, 320g, 320h, 320i, 320j, 330f, 330g, 330h, 330i, and 330j) (or "segment regions") arranged between the multiple conductive portions.

In an example, the multiple conductive portions may include a first conductive portion 320a disposed on the top side surface (e.g., the side surface in the +y-direction in FIG. 3) of the housing 310, a second conductive portion 320b disposed in a region adjacent to one end of the right side (e.g., the +x-direction in FIG. 3) of the first conductive portion 320a, a third conductive portion 320c disposed in a region adjacent to one end of the left side (e.g., the −x-direction in FIG. 3) of the first conductive portion 320a, a fourth conductive portion 320d which is adjacent to the second conductive portion 320b and disposed on the right side surface (e.g., the side surface in the +x-direction in FIG. 3) of the housing 310, and/or a fifth conductive portion 320e which is adjacent to the third conductive portion 320c and disposed on the left side surface (e.g., the side surface in the −x-direction in FIG. 3) of the housing 310.

In another example, the multiple conductive portions may include a sixth conductive portion 330a disposed on the bottom side surface (e.g., the side surface in the −y-direction in FIG. 3) of the housing 310, a seventh conductive portion 330b disposed in a region adjacent to one end of the right side (e.g., the +x-direction in FIG. 3) of the sixth conductive portion 330a, an eighth conductive portion 330c disposed in a region adjacent to one end of the left side (e.g., the −x-direction in FIG. 3) of the sixth conductive portion 330a, a ninth conductive portion 330d which is adjacent to the seventh conductive portion 330b and/or the fourth conductive portion 320d and disposed on the right side surface (e.g., the side surface in the +x-direction in FIG. 3) of the housing 310, and/or a tenth conductive portion 330e which is adjacent to the eighth conductive portion 330c and/or the fifth conductive portion 320e and disposed on the left side surface (e.g., the side surface in the −x-direction in FIG. 3) of the housing 310.

In an example, the multiple non-conductive portions may include a first non-conductive portion 320f disposed between the first conductive portion 320a and the second conductive portion 320b, a second non-conductive portion 320g disposed between the first conductive portion 320a and the third conductive portion 320c, a third non-conductive portion 320h disposed between the second conductive portion 320b and the fourth conductive portion 320d, a fourth non-conductive portion 320i disposed between the third conductive portion 320c and one end of the fifth conductive portion 320e, and/or a fifth non-conductive portion 320j disposed at the other end of the fifth conductive portion 320e.

In another example, the multiple non-conductive portions may include a sixth non-conductive portion 330f disposed between the sixth conductive portion 330a and the seventh conductive portion 330b, a seventh non-conductive portion 330g disposed between the sixth conductive portion 330a and the eighth conductive portion 330c, an eighth non-conductive portion 330h disposed between the seventh conductive portion 330b and the ninth conductive portion 330d, a ninth non-conductive portion 330i disposed between the eighth conductive portion 330c and one end of the tenth conductive portion 330e, and/or a tenth non-conductive portion 330j disposed at the other end of the tenth conductive portion 330e.

According to an embodiment, the multiple non-conductive portions may be filled with a non-conductive material such as a synthetic resin. In an example, the multiple non-conductive portions (e.g., the first non-conductive portion 320f, the second non-conductive portion 320g, the third non-conductive portion 320h, the fourth non-conductive portion 320i, and the fifth non-conductive portion 320j) may be arranged between the first conductive portion 320a, the second conductive portion 320b, the third conductive portion 320c, the fourth conductive portion 320d, and/or the fifth conductive portion 320e so as to insulate the multiple conductive portions, and accordingly, the top region (e.g., the region in the +y-direction in FIG. 3) of the lateral member 320 may be segmented into five regions. In another example, the multiple non-conductive portions (e.g., the sixth non-conductive portion 330f, the seventh non-conductive portion 330g, the eighth non-conductive portion 330h, the ninth non-conductive portion 330i, the tenth non-conductive portion 330j) may be arranged between the sixth conductive portion 330a, the seventh conductive portion 330b, the eighth conductive portion 330c, the ninth conductive portion 330d, and/or the tenth conductive portion 330e so as to insulate multiple conductive portions, and accordingly, the bottom region (e.g., the region in the −y-direction in FIG. 3) of the lateral member 320 may be segmented into five regions.

According to an embodiment, the electronic device 300 may use, as an antenna radiator, at least one of the first conductive portion 320a, the second conductive portion 320b, the third conductive portion 320c, the fourth conductive portion 320d, and/or the fifth conductive portion 320e which are insulated. According to another embodiment, the electronic device 300 may use, as an antenna radiator, at least one of the sixth conductive portion 330a, the seventh conductive portion 330b, the eighth conductive portion 330c, the ninth conductive portion 330d, and/or the tenth conductive portion 330e which are insulated. For example, the multiple conductive portions may be electrically connected to a wireless communication circuit (e.g., the communication module 190 in FIG. 1) disposed in the housing 310, and the wireless communication circuit may transmit an RF signal in a designated frequency band to the multiple conductive portions or to receive an RF signal from the multiple conductive portions.

According to an embodiment, the audio module 313 may include a microphone hole and a speaker hole. A microphone for acquiring external sound may be disposed inside the microphone hole, and in some embodiments, multiple microphones may be arranged to detect the direction of sound. In some embodiments, the speaker hole and the microphone hole may be implemented as a single hole, or a speaker (e.g., a piezo speaker) may be included therein without a speaker hole. The speaker hole may include an external speaker hole and a receiver hole for a call.

According to an embodiment, the camera module may include a first camera device 315 disposed on the first surface 310A of the electronic device 300, and a second camera device (not shown) and/or a flash (not shown) arranged on the second surface 310B. The camera devices described above may include one lens or multiple lenses, an image sensor, and/or an image signal processor. For example, the flash may include a light-emitting diode or a xenon lamp. In some embodiments, two or more lenses (an infrared camera, a wide-angle lens, and a telephoto lens) and image sensors may be arranged on one surface of the electronic device 300.

According to an embodiment, the key input device 317 may be disposed on the side surface 310C of the housing 310. In another embodiment (not shown), the electronic device 300 may not include a part or the whole of the mentioned key input device 317, and the key input device 317 not included therein may be implemented as a different type such as a soft key, on the display 330.

According to an embodiment, the connector hole 318 may accommodate a connector for transmitting or receiving power and/or data to or from an external electronic device, and/or a connector for transmitting or receiving an audio signal to or from an external electronic device. For an example, the connector hole 318 may include a USB connector or an earphone jack.

According to an embodiment, the display 330 may be exposed through a significant portion of the front plate 302. In an example, the corner of the display 330 may be formed to have a shape which is the general same as a shape (e.g., a curved-surface) of the perimeter adjacent to the front plate 302. In another embodiment (not shown), in order to expand an area which allows the display 330 to be exposed, the gap between the outer perimeter of the display 330 and the outer perimeter of the front plate 302 may be formed to be generally the same. In another embodiment (not shown), a recess or an opening may be formed in a part of a screen display region of the display 330, and other electronic components, which are aligned with the recess or the opening, for example, the first camera device 315 and a proximity sensor or an illuminance sensor not illustrated, may be included therein.

According to another embodiment (not shown), the display 330 may be coupled to or disposed adjacent to a touch detection circuit, a pressure sensor capable of measuring the intensity (pressure) of touch, and/or a digitizer for detecting a magnetic field-typed stylus pen.

Figure 4:
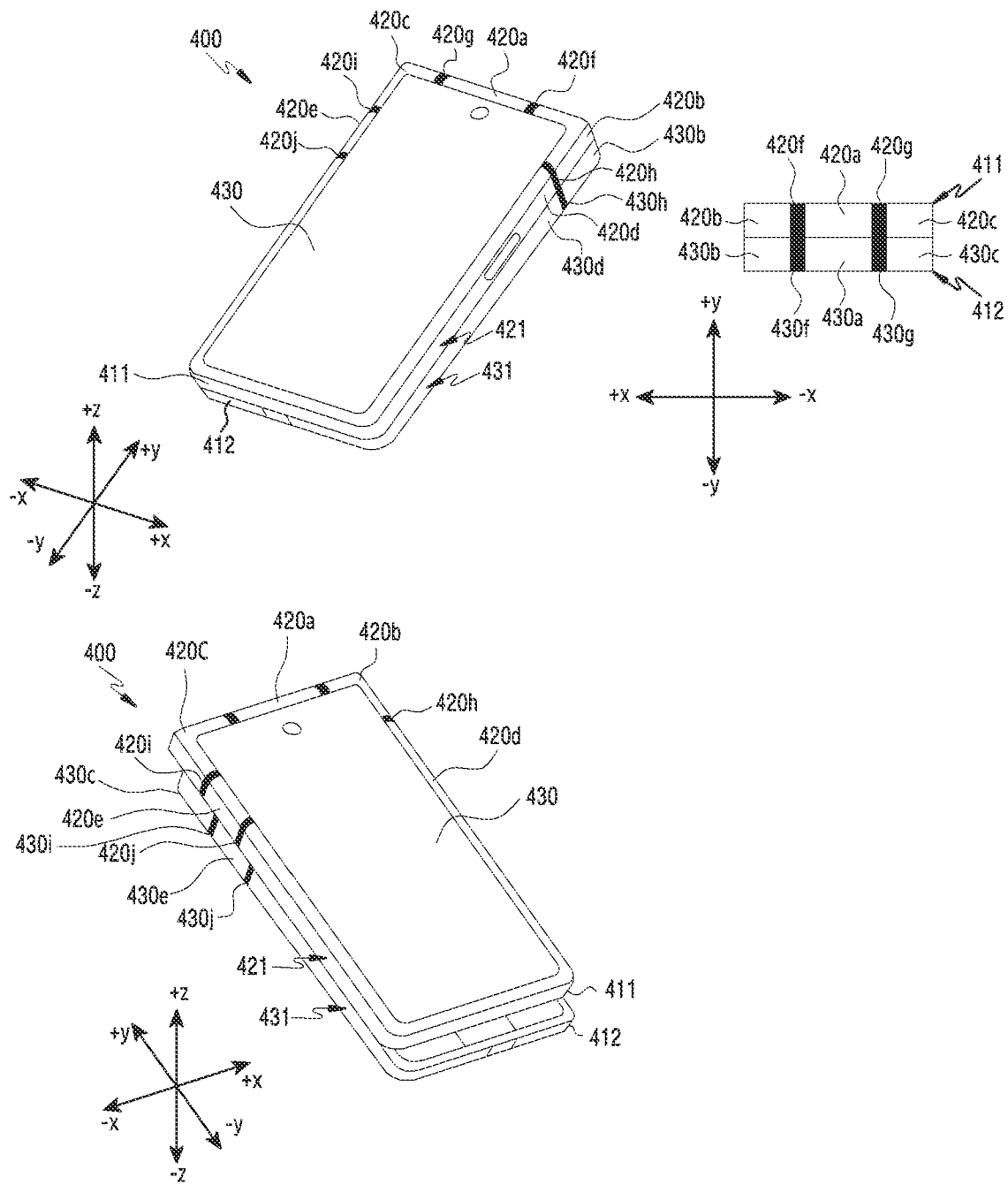
FIG. 4 is a perspective view seen from a side of an electronic device according to an embodiment of the disclosure.

FIG. 4 is a perspective view seen from a side of an electronic device according to an embodiment of the disclosure. FIG. 4 illustrates a slide-type electronic device 400.

Referring to FIG. 4, an electronic device 400 according to another embodiment may include a first housing 411, a second housing 412, a first lateral member 421, a second lateral member 422, and/or a display 430.

According to an embodiment, the first housing 411 may be disposed at the upper end (e.g., the +z-direction in FIG. 4) of the second housing 412. In an example, the first housing 411 may be coupled to be slidable to the second housing 412. For example, a guide rail (not shown) may be disposed between the first housing 411 and the second housing 412, and the first housing 411 and the second housing 412 may be slidably coupled to each other through the guide rail. In an example, the first housing 411 may be slid along one direction (e.g., the +y-direction in FIG. 4) with reference to the second housing 412.

According to an embodiment, the first lateral member 421 may form a side surface of the first housing 411. In an example, the first lateral member 421 may include multiple conductive portions 420a, 420b, 420c, 420d, and 420e, and/or multiple non-conductive portions 420f, 420g, 420h, 420i, and 420j (or "segment regions"). In an example, the multiple conductive portions may include a first conductive portion 420a disposed on the top side surface (e.g., the side surface in the +y-direction in FIGS. 5A to 5C) of the first housing 411, a second conductive portion 420b disposed in a region adjacent to one end of the right side (e.g., the +x-direction in FIGS. 5A to 5C) of the first conductive portion 420a, a third conductive portion 420c disposed in a region adjacent to one end of the left side (e.g., the −x-direction in FIG. 4) of the first conductive portion 420a, a fourth conductive portion 420d which is adjacent to the second conductive portion 420b and disposed on the right side surface (e.g., the side surface in the +x-direction in FIGS. 5A to 5C) of the first housing 411, and/or a fifth conductive portion 420e which adjacent to the third conductive portion 420c and disposed on the left side surface (e.g., the side surface in the −x-direction in FIGS. 5A to 5C) of the first housing 411.

In an example, the multiple non-conductive portions may include a first non-conductive portion 420f disposed between the first conductive portion 420a and the second conductive portion 420b, a second non-conductive portion 420g disposed between the first conductive portion 420a and the third conductive portion 420c, a third non-conductive portion 420h disposed between the second conductive portion 420b and the fourth conductive portion 420d, a fourth non-conductive portion 420i disposed between the third conductive portion 420c and one end of the fifth conductive portion 420e, and/or a fifth non-conductive portion 420j disposed at the other end of the fifth conductive portion 420e.

According to an embodiment, the multiple non-conductive portions may be filled with a non-conductive material such as a synthetic resin. In an example, the multiple non-conductive portions (e.g., the first non-conductive portion 420f, the second non-conductive portion 420g, the third non-conductive portion 420h, the fourth non-conductive portion 420i, and the fifth non-conductive portion 420j) may be arranged between the first conductive portion 420a, the second conductive portion 420b, the third conductive portion 420c, the fourth conductive portion 420d, and/or the fifth conductive portion 420e so as to insulate the multiple conductive portions, and accordingly, the first lateral member 421 may be segmented into five regions. According to an embodiment, the electronic device 400 may use, as an antenna radiator, at least one of the first conductive portion 420a, the second conductive portion 420b, the third conductive portion 420c, the fourth conductive portion 420d, and/or the fifth conductive portion 420e of the first lateral member 421, which are insulated. For example, the multiple conductive portions may be electrically connected to a wireless communication circuit (e.g., the communication module 190 in FIG. 1) disposed in the first housing 411, and the wireless communication circuit may transmit an RF signal in a designated frequency band to the multiple conductive portions or to receive an RF signal from the multiple conductive portions.

According to an embodiment, the second lateral member 431 may form a side surface of the second housing 412. In an example, the second lateral member 431 may include multiple conductive portions 430a, 430b, 430c, 430d, and 430e and/or multiple non-conductive portions 430f, 430g, 430h, 430i, and 430j (or "segment regions").

In an example, the multiple conductive portions may include a sixth conductive portion 430a disposed on the top side surface (e.g., the side surface in the +y-direction in FIG. 4) of the second housing 412, a seventh conductive portion 430b disposed in a region adjacent to one end of the right side (e.g., the +x-direction in FIG. 4) of the sixth conductive portion 430a, an eighth conductive portion 430c disposed in a region adjacent to one end of the left side (e.g., the −x-direction in FIG. 4) of the sixth conductive portion 430a, a ninth conductive portion 430d which is adjacent to the seventh conductive portion 430b and/or the fourth conductive portion 420d and disposed on the right side surface (e.g., the side surface in the +x-direction in FIG. 4) of the second housing 412, and/or a tenth conductive portion 430e which is adjacent to the eighth conductive portion 430c and/or the fifth conductive portion 420e and disposed on the left side surface (e.g., the side surface in the −x-direction in FIG. 4) of the second housing 412.

In an example, the multiple non-conductive portions may include a sixth non-conductive portion 430f disposed between the sixth conductive portion 430a and the seventh conductive portion 430b, a seventh non-conductive portion 430g disposed between the sixth conductive portion 430a and the eighth conductive portion 430c, an eighth non-conductive portion 430h disposed between the seventh conductive portion 430b and the ninth conductive portion 430d, a ninth non-conductive portion 430i disposed between the eighth conductive portion 430c and one end of the tenth conductive portion 430e, and/or a tenth non-conductive portion 430j disposed at the other end of tenth conductive portion 430e. According to an embodiment, the electronic device 400 may use, as an antenna radiator, at least one of the sixth conductive portion 430a, the seventh conductive portion 430b, the eighth conductive portion 430c, the ninth conductive portion 430d, and/or the tenth conductive portion 430e of the second housing 412, which are insulated. For example, the multiple conductive portions may be electrically connected to a wireless communication circuit disposed in the first housing 411 or the second housing 412, and the wireless communication circuit may transmit an RF signal in a designated frequency band to the multiple conductive portions or to receive an RF signal from the multiple conductive portions.

Figure 5A:
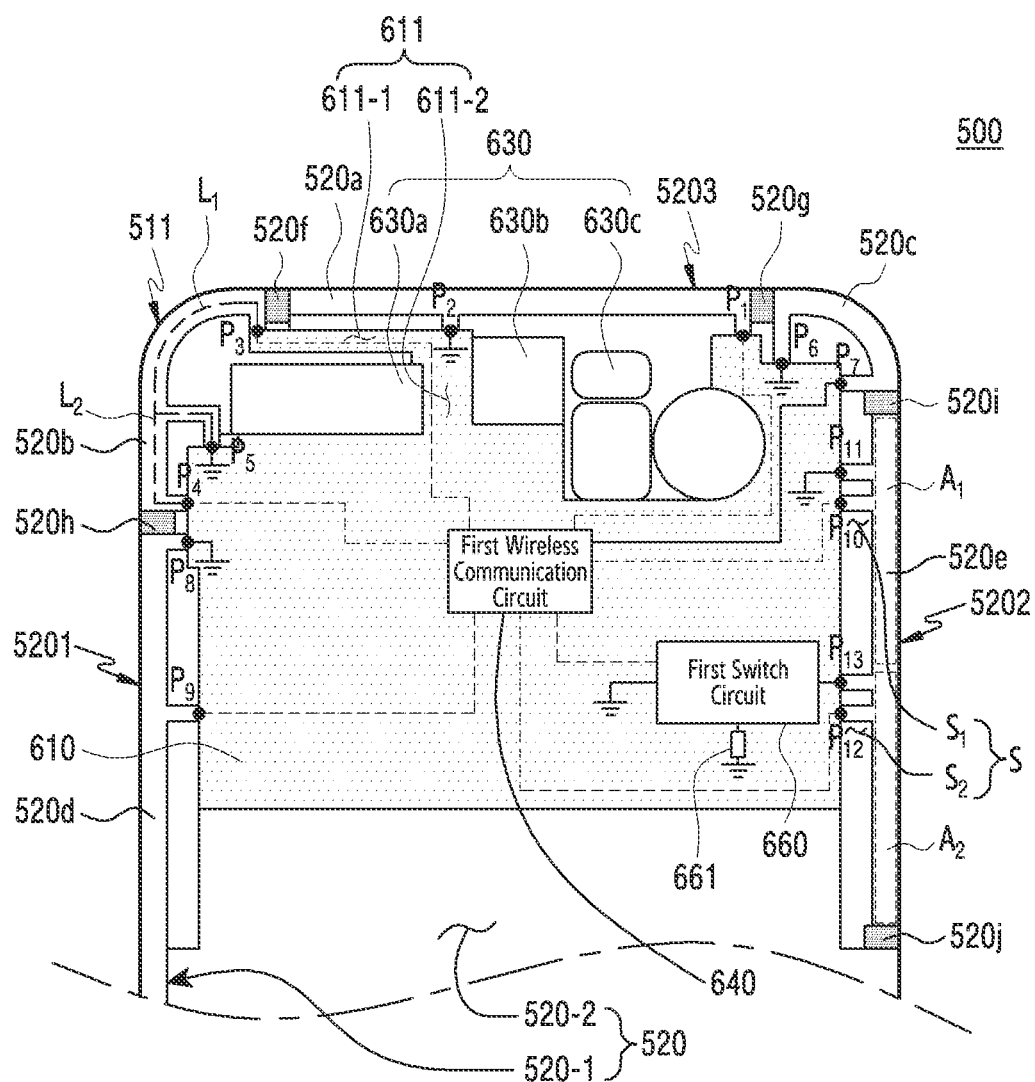
FIG. 5A is a view showing an antenna arrangement structure inside a first housing of an electronic device according to an embodiment of the disclosure.
Figure 5B:
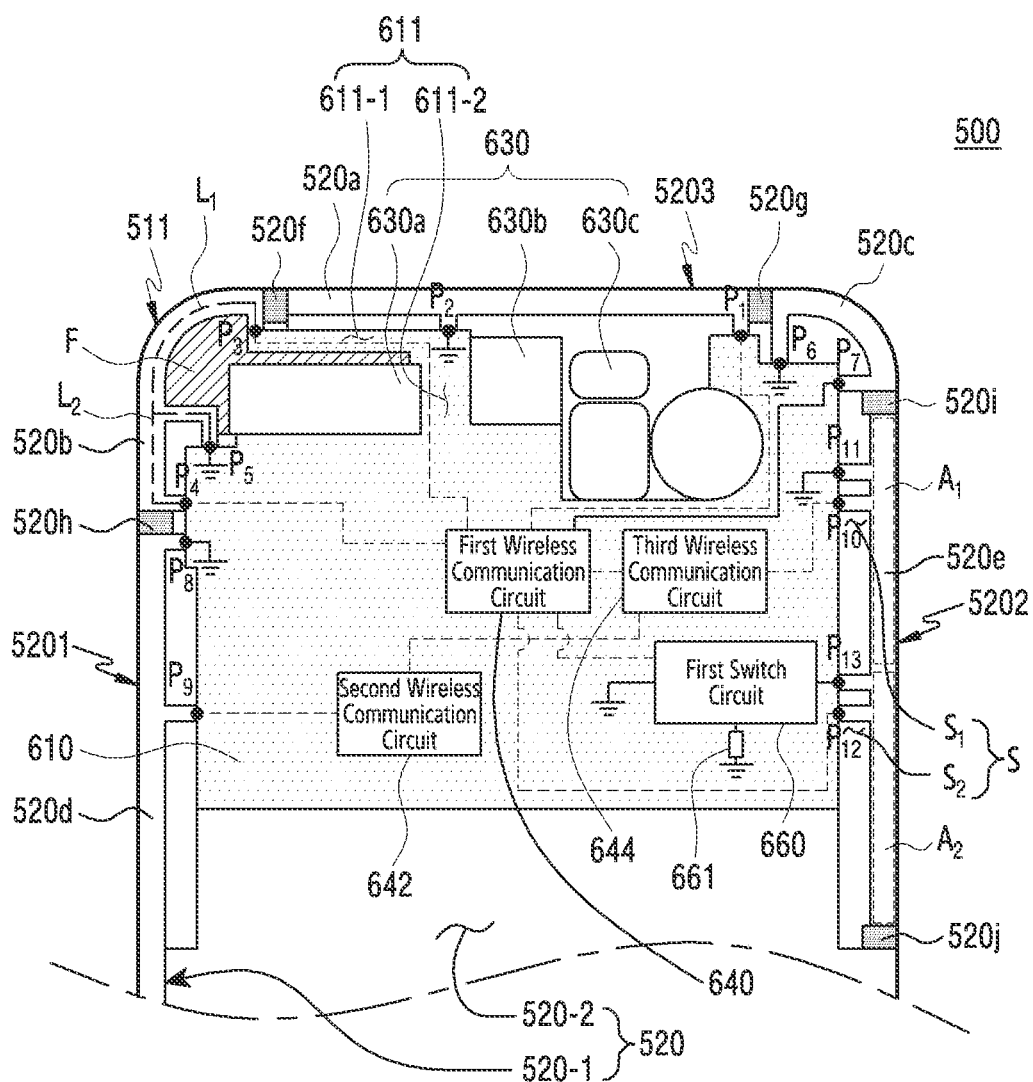
FIG. 5B is a view showing an antenna arrangement structure inside a first housing of an electronic device according to an embodiment of the disclosure.

FIG. 5A is a view showing an antenna arrangement structure inside a first housing of an electronic device according to an embodiment of the disclosure. FIG. 5B is a view showing an antenna arrangement structure inside a first housing of an electronic device according to an embodiment of the disclosure. FIG. 5A and/or FIG. 5B are views showing elements arranged on one surface (e.g., the inside in the −z-direction in FIG. 2A) of a first lateral member 520 disposed inside a first housing 511 of an electronic device 500 according to an embodiment. The antenna arrangement structure in FIG. 5A and/or FIG. 5B may be applied to the electronic device 200 in FIG. 2A and FIG. 2B and/or the electronic device 400 in FIG. 4.

Referring to FIGS. 5A and 5B, an electronic device 500 (e.g., the electronic device 200 in FIG. 2A, FIG. 2B and/or the electronic device 400 in FIG. 4) according to an embodiment may include a first housing 511 (e.g., the first housing 211 in FIG. 2A and FIG. 2B and/or the first housing 411 in FIG. 4), a first lateral member 520 (e.g., the first lateral member 220 in FIG. 2A and FIG. 2B and/or the first lateral member 420 in FIG. 4), a first printed circuit board 610, at least one electronic component 630, and/or a first wireless communication circuit 640 (e.g., the wireless communication module 192 in FIG. 1). At least one of elements of the electronic device 500 according to an embodiment may be the same as or similar to at least one of the elements of the electronic device 102 in FIG. 1, the electronic device 200 in FIG. 2A and FIG. 2B, and/or electronic device 400 in FIG. 4, and thus, hereinafter, overlapping descriptions thereof will be omitted.

According to an embodiment, the first lateral member 520 may be included in the first housing 511, and may include a first structure 520-1 (e.g., the first structure 220-1 in FIG. 3) forming at least one side surface of the electronic device 500 and/or a second structure 520-2 (e.g., the second structure 220-2 in FIG. 2A) forming a space in which elements of the electronic device 500 may be arranged.

In an example, the first structure 520-1 of the first lateral member 520 may form a first side surface 5201 which extends along a first direction (e.g., the +y-direction in FIG. 5A) and is positioned in the left side (e.g., the +x-direction in FIG. 2A or the −x-direction in FIG. 5A) of the electronic device 500 and/or the first housing 511, a second side surface 5202 which is parallel to the first side surface 5201 and positioned in the right side (e.g., the −x-direction in FIG. 2A or the +x-direction in FIG. 5A) of the electronic device 500 and/or the first housing 511, and/or a third side surface 5203 which extends along a second direction (e.g., the +x-direction in FIG. 5A) perpendicular to the first direction and connects one end of the first side surface 5201 and one end of the second side surface 5202.

According to an embodiment, the first structure 520-1 of the first lateral member 520 may include multiple conductive portions and multiple non-conductive portions arranged between the multiple conductive portions. In an example, the first structure 520-1 of the first lateral member 520 may include a first conductive portion 520a (e.g., the first conductive portion 220a in FIG. 2A) disposed on a third side surface 5203, a second conductive portion 520b (e.g., the second conductive portion 220b in FIG. 3) which is adjacent to one end (e.g., the one end in the −x-direction in FIG. 5A) of the first conductive portion 520a and disposed on the first side surface 5201 and the third side surface 5203, and/or a third conductive portion 520c (e.g., the third conductive portion 220c in FIG. 3) which is adjacent to the other end (e.g., the one end in the +x-direction in FIG. 5A) of the first conductive portion 520a and disposed on the second side surface 5202 and the third side surface 5203. As another example, the first structure 520-1 may further include a fourth conductive portion 520d (e.g., the fourth conductive portion 220d in FIG. 3) which is adjacent to the second conductive portion 520b and disposed on the first side surface 5201 and/or a fifth conductive portion 520e (e.g., the fifth conductive portion 220e in FIG. 3) which is adjacent to the third conductive portion 520c and disposed on the second side surface 5202.

In an example, the first structure 520-1 may include a first non-conductive portion 520f (e.g., the first non-conductive portion 220f in FIG. 2A) disposed between the first conductive portion 520a and the second conductive portion 520b so as to insulate the first conductive portion 520a and the second conductive portion 520b, a second non-conductive portion 520g (e.g., the second non-conductive portion 220g in FIG. 2A) disposed between the first conductive portion 520a and the third conductive portion 520c so as to insulate the first conductive portion 520a and the third conductive portion 520c, and/or a third non-conductive portion 520h (e.g., the third non-conductive portion 220h in FIG. 2A) disposed between the second conductive portion 520b and the fourth conductive portion 520d so as to insulate the second conductive portion 520b and the fourth conductive portion 520d. As another example, the first structure 520-1 may further include a fourth non-conductive portion 520i (e.g., the fourth non-conductive portion 220i in FIG. 2A) positioned between the third conductive portion 520c and one end of the fifth conductive portion 520e so as to insulate the third conductive portion 520c and the fifth conductive portion 520e, and/or a fifth non-conductive portion 520j (e.g., the fifth non-conductive portion 220j in FIG. 2A) positioned at the other end of the fifth conductive portion 520e. For example, the first structure 520-1 of the first lateral member 520 may be segmented into five regions by the first non-conductive portion 520f, the second non-conductive portion 520g, the third non-conductive portion 520h, the fourth non-conductive portion 520i, and/or the fifth non-conductive portion 520j.

According to an embodiment, the first printed circuit board 610 and/or at least one electronic component 630 may be arranged on at least one surface (e.g., the surface of the −z-direction in FIG. 3) of the second structure 520-2 of the first lateral member 520, and the second structure 520-2 may support the first printed circuit board 610 and/or the at least one electronic component 630. For example, the at least one electronic component 630 may include a front camera 630a, a rear camera 630b, and/or an audio module 630c.

According to an embodiment, a processor (e.g., the processor 120 in FIG. 1), a memory (e.g., the memory 130 in FIG. 1), an interface (e.g., the interface 177 in FIG. 1), and/or the first wireless communication circuit 640 may be arranged on the first printed circuit board 610. In an example, the processor may include at least one of a central processing unit, an application processor, a graphic processing unit, an image signal processor, a sensor hub processor, and a communication processor. In an example, the memory may include a volatile memory or a non-volatile memory. In an example, the interface may include a high-definition multimedia interface (HDMI) and/or an audio interface. In an example, the first printed circuit board 610 may include a ground (not shown). In an embodiment, the first conductive portion 520a, the second conductive portion 520b, the third conductive portion 520c, the fourth conductive portion 520d, and/or the fifth conductive portion 520e of the first lateral member 520 may be grounded to the ground of the first printed circuit board 610.

According to an embodiment, the first printed circuit board 610 may include a first region 611 adjacent to the first conductive portion 520a and/or the second conductive portion 520b of the first lateral member 520. In an example, the first region 611 may be formed in a letter "]" shape (or a letter "L" shape). In an embodiment, the first region 611 may include a first portion 611-1 or a second portion 611-2. For example, the first region 611 may include the first portion 611-1 substantially parallel to third side surface 5203 or the first conductive portion 520a of the electronic device 500, and the second portion 611-2 substantially perpendicular to the first portion 611-1 and substantially parallel to the first side surface 5201 or the second side surface 5202 of electronic device 500. According to an embodiment, one end (e.g., the one end in the −x-direction in FIG. 9A) of the first portion 611-1 of the first region 611 may be connected to a point (e.g., the third point $P_3$ in FIG. 5A) of the second conductive portion 920b, which is adjacent to the first conductive portion 920a. According to an embodiment, the first region 611 may include a ground layer.

According to an embodiment (e.g., see FIG. 5A), the first wireless communication circuit 640 may be electrically connected to the first conductive portion 520a, the second conductive portion 520b, the third conductive portion 520c, the fourth conductive portion 520d, and/or the fifth conductive portion 520e through an electrical connecting means (e.g., a signal wire, a coaxial cable, or a flexible printed circuit board (FPCB)). In an example, the first conductive portion 520a, the second conductive portion 520b, the third conductive portion 520c, the fourth conductive portion 520d, and/or the fifth conductive portion 520e may be electrically connected to the first wireless communication circuit 640 and thus may operate as an antenna radiator for transmitting or receiving an RF signal in a designated frequency band. In an example, the first wireless communication circuit 640 may feed an RF signal to the first conductive portion 520a, the second conductive portion 520b, the third conductive portion 520c, the fourth conductive portion 520d, and/or the fifth conductive portion 520e. In another example, the first wireless communication circuit 640 may also receive an RF signal from the first conductive portion 520a, the second conductive portion 520b, the third conductive portion 520c, the fourth conductive portion 520d, and/or the fifth conductive portion 520e.

According to another embodiment (e.g., see FIG. 5B), the electronic device 500 may further include a second wireless communication circuit 642 and/or a third wireless communication circuit 644 arranged on the first printed circuit board 610. According to another embodiment (not shown), the electronic device 500 may not include at least one wireless communication circuit (e.g., the third wireless communication circuit 644) of the second wireless communication circuit 642 or the third wireless communication circuit 644.

According to an embodiment, the second wireless communication circuit 642 and/or the third wireless communication circuit 644 may be electrically connected to the first wireless communication circuit 640. In an example, the second wireless communication circuit 642 and/or third wireless communication circuit 644 may transmit or feed, through a switch circuit (not shown) and/or a distribution circuit (not shown), an RF signal to at least one conductive portion of the first conductive portion 520a, the second conductive portion 520b, the third conductive portion 520c, the fourth conductive portion 520d, and/or the fifth conductive portion 520e, which operates as an antenna radiator. For example, the second wireless communication circuit 642 may transmit or feed, to the fourth conductive portion 520d, an RF signal in a Wi-Fi frequency band (e.g., about 2.4 gigahertz (GHz) and/or about 5 GHz). In another example, the third wireless communication circuit 644 may transmit or feed an RF signal in an ultra-wide band (UWB) frequency band (e.g., about 6 to 8 GHz) to the fifth conductive portion 520e. In an example, the second wireless communication circuit 642 and/or the third wireless communication circuit 644 may transmit or feed, through the first wireless communication circuit 640, an RF signal to at least one conductive portion of the first conductive portion 520a, the second conductive portion 520b, the third conductive portion 520c, the fourth conductive portion 520d, and/or the fifth conductive portion 520e. In another example (not shown), the second wireless communication circuit 642 and/or the third wireless communication circuit 644 may directly transmit or feed an RF signal to at least one conductive portion of the first conductive portion 520a, the second conductive portion 520b, the third conductive portion 520c, the fourth conductive portion 520d, and/or the fifth conductive portion 520e.

According to another embodiment, the second wireless communication circuit 642 and/or the third wireless communication circuit 644 may receive an RF signal from the first wireless communication circuit 640 electrically connected thereto. The number of wireless communication circuits and/or an electrical connection relation of the wireless communication circuits of the electronic device 500 according to an embodiment may not be limited to the above-described embodiment, and according to the embodiment, the electronic device 500 may include multiple (e.g., two, three, or four) wireless communication circuits, or the method, in which an RF signal is transmitted to the above-described conductive portions, may be changed.

In an example, the first conductive portion 520a may be electrically connected to the first wireless communication circuit 640 at a first point $P_1$ which is positioned at the first conductive portion 520a (e.g., the one end in the +x-direction in FIG. 5A) and adjacent to the third conductive portion 520c. In another example, the first conductive portion 520a may be electrically connected to a ground of the first printed circuit board 610 at a second point $P_2$ spaced apart from the first point $P_1$ in the −x-axis direction. For example, the first conductive portion 520a may be fed from the first wireless communication circuit 640 at the first point $P_1$, and may be grounded to the ground of the first printed circuit board 610 at the second point $P_2$. For example, through the above-described electrical connection relation, the first conductive portion 520a may operate as an inverted-F antenna (IFA) for transmitting and/or receiving an RF signal in a first frequency band, a second frequency band, a third frequency band, and/or a fourth frequency band. In an example, the first frequency band may be a global positioning system (GPS) L5 frequency band (e.g., about 1.176 GHz). The second frequency band may be a middle band (MB) (e.g., about 1.7 to 2.2 GHz). The third frequency band may be a high band (HB) (e.g., about 2.2 to 2.7 GHz) frequency band.

In an example, the second conductive portion 520b may be electrically connected to the first wireless communication circuit 640 at a third point $P_3$ which is positioned at the second conductive portion 520b and is adjacent to the first conductive portion 520a. As another example, the second conductive portion 520b may be electrically connected to the first wireless communication circuit 640 at a fourth point $P_4$ which is positioned at the second conductive portion 520b and is adjacent to the fourth conductive portion 520d. In another example, the second conductive portion 520b may be electrically connected to a ground of the first printed circuit board 610 at the fifth point $P_5$ positioned between the third point $P_3$ and the fourth point $P_4$. For example, the second conductive portion 520b may be fed from the first wireless communication circuit 640 at the third point $P_3$ and the fourth point $P_4$, and may be grounded to the ground of the first printed circuit board 610 at the fifth point $P_5$. In another example (e.g., see FIG. 5B), the second conductive portion 520b may be electrically connected to the second wireless communication circuit 642 at the fourth point $P_4$. In another example, the second conductive portion 520b may be fed from the first wireless communication circuit 640 at the third point $P_3$, and may be fed from the second wireless communication circuit 642 at the fourth point $P_4$. In an example, through the above-described electrical connection relation, for example, a region $L_1$ between the third point $P_3$ and the fifth point $P_5$ of the second conductive portion 520b may operate as a first loop antenna, and a region $L_2$ between the fourth point $P_4$ and the fifth point $P_5$ of the second conductive portion 520b may operate as a second loop antenna.

In an example, the fifth point $P_5$ may be positioned at a position adjacent to the fourth point $P_4$ compared to the third point $P_3$, and thus the length of the region $L_1$ between the third point $P_3$ and the fifth point $P_5$ of the second conductive portion 520b may be longer than the length of the region $L_2$ between the fourth point $P_4$ and the fifth point $P_5$ of the second conductive portion 520b. For example, the region $L_1$ between the third point $P_3$ and the fifth point $P_5$ of the second conductive portion 520b may operate as a loop antenna for transmitting or receiving an RF signal in a fourth frequency which is a frequency band relatively lower than the region $L_2$ between the fourth point $P_4$ and the fifth point $P_5$ of the second conductive portion 520b. In an example, the fourth frequency band may be a GPS L1 (e.g., about 1.575 GHz) frequency band. As another example, the region $L_2$ between the fourth point $P_4$ and the fifth point $P_5$ of the second conductive portion 520b may operate as a loop antenna for transmitting or receiving an RF signal in a fifth frequency which is a frequency band relatively higher than the region $L_1$ between the third point $P_3$ and the fifth point $P_5$ of the second conductive portion 520b. In an example, the fifth frequency band may be a WiFi (e.g., about 2.4 GHz and/or about 5 GHz) frequency band.

In an example (e.g., see FIG. 5A), the first printed circuit board 610 or the ground included in the first printed circuit board 610 may not be disposed in a region adjacent to the region $L_1$ between the third point $P_3$ and the fifth point $P_5$ of the second conductive portion 520b. In another example (e.g., see FIG. 5B), a fill-cut area (e.g., the area F in FIG. 5B) (or a "non-conductive layer") of the first printed circuit board 610 may be disposed in a region adjacent to the region $L_1$ between the third point $P_3$ and the fifth point $P_5$ of the second conductive portion 520b.

In an example, the third conductive portion 520c may be electrically connected to a ground of the first printed circuit board 610 at a sixth point $P_6$ which is positioned at the third conductive portion 520c and adjacent to the first conductive portion 520a. In another example, the third conductive portion 520c may be electrically connected to the first wireless communication circuit 640 at a seventh $P_7$ which is positioned at the third conductive portion 520c and adjacent to the fifth conductive portion 520e. For example, the third conductive portion 520c may be grounded to the ground of the first printed circuit board 610 at the sixth point $P_6$, and may be fed from the first wireless communication circuit 640 at the seventh point $P_7$. The third conductive portion 520c according to an embodiment may operate as an inverted-F antenna for transmitting or receiving an RF signal in a middle band (MB) (e.g., 1.7 to 2.2 GHz) frequency band.

In an example, the fourth conductive portion 520d may be electrically connected to a ground of the first printed circuit board 610 at an eighth point $P_8$ which is positioned at the fourth conductive portion 520d and adjacent to the second conductive portion 520b. In another example, the fourth conductive portion 520d may be electrically connected to the first wireless communication circuit 640 at a ninth point $P_9$ spaced apart from the eighth point $P_8$ in the −y-axis direction. For example, the fourth conductive portion 520d may be grounded to the ground of the first printed circuit board 610 at the eighth point $P_8$, and may be fed from the first wireless communication circuit 640 at the ninth point $P_9$. In another example, the fourth conductive portion 520d may be electrically connected to the second wireless communication circuit 642 at a ninth point $P_9$ spaced apart from the eighth point $P_8$ in the −y-axis direction. For example, the fourth conductive portion 520d may be grounded to the ground of the first printed circuit board 610 at the eighth point $P_8$, and may be fed from the second wireless communication circuit 642 at the ninth point $P_9$. The fourth conductive portion 520d according to an embodiment may operate as an inverted-F antenna for transmitting or receiving an RF signal in the fifth frequency band. In an example, the fifth frequency band may be a Wi-Fi (e.g., about 2.4 and/or about 5 GHz) frequency band.

According to an embodiment, the fifth conductive portion 520e may include a first portion $A_1$ which is adjacent to the third conductive portion 520c and has a first length, and a second portion $A_2$ which is adjacent to the first portion $A_1$ and has a second length. As an example, the second length may be longer than the first length, but it may be not limited thereto. According to an embodiment, a slot (e.g., the region S in FIG. 5A and FIG. 5B) may be formed in the second structure 520-2 of the first lateral member 520, which is adjacent to the fifth conductive portion 520e. In an example, the slot S may include a first slot region $S_1$ adjacent to the first slot region $S_1$ of the fifth conductive portion 520e, and/or a second slot region $S_2$ adjacent to the second portion $A_2$ of the fifth conductive portion 520e. In an example, the first slot region $S_1$ may mean a region between an eleventh point $P_{11}$ and a thirteenth point $P_{13}$. In another example, the second slot region $S_2$ may mean a region between the thirteenth point $P_{13}$ and the fifth non-conductive portion 520j.

In an example, the first portion $A_1$ of the fifth conductive portion 520e, which is adjacent to the first slot region $S_1$ of the slot S, may be electrically connected to the first wireless communication circuit 640 at the tenth point $P_{10}$, and may be electrically connected to a ground of the first printed circuit board 610 at the eleventh point $P_{11}$ positioned between the tenth point $P_{10}$ and the fourth non-conductive portion 520i. For example, the first portion $A_1$ may be fed from the first wireless communication circuit 640 at the tenth point $P_{10}$, and may be grounded to the ground of the first printed circuit board 610 at the eleventh point $P_{11}$. As the first portion $A_1$ of the fifth conductive portion 520e is fed at the tenth point $P_{10}$ and grounded at the eleventh point $P_{11}$, and the first slot region $S_1$, which is adjacent to the first portion $A_1$ of the fifth conductive portion 520e, may operate as a slot antenna. For example, the first slot region $S_1$ may operate as a slot antenna for transmitting or receiving an RF signal in a seventh frequency band. In an example, the seventh frequency band may be an ultra-high band (UHB) (e.g., about 3.55 to 3.7 GHz).

In an example, the second portion $A_2$ of the fifth conductive portion 520e, which is adjacent to the second slot region $S_2$ of the slot S, may be electrically connected to the first wireless communication circuit 640 at a twelfth point $P_{12}$, and may be electrically connected to a first switch circuit 660 at the thirteenth point $P_{13}$ positioned between the twelfth point $P_{12}$ and the tenth point $P_{10}$. In an embodiment, the first switch circuit 660 may selectively connect the second portion $A_2$ of the fifth conductive portion 520e to a first passive element 661 or a ground of the first printed circuit board 610. For example, the first passive element 661 may include an inductor and/or a capacitor, but it is not limited thereto.

In an example, when the first switch circuit 660 is in a first electrical connection state, the second portion $A_2$ may be electrically connected to a ground of the first printed circuit board 610 through the first passive element 661. In another example, when the first switch circuit 660 is in a second electrical connection state, the second portion $A_2$ may be electrically connected to the ground of the first printed circuit board 610 without passing through the first passive element 661. For example, the second portion $A_2$ of the fifth conductive portion 520e may be fed from the first wireless communication circuit 640 at the twelfth point $P_{12}$, and may be grounded to the ground of the first printed circuit board 610 at the thirteenth point $P_{13}$. In an example, the first switch circuit 660 may be electrically connected to a processor (e.g., the processor 120 in FIG. 1), and the processor may change an electrical connection state of the first switch circuit 660. In another example, the first switch circuit 660 may be electrically connected to the first wireless communication circuit 640, and the first wireless communication circuit 640 may change an electrical connection state of the first switch circuit 660 according to an operation of the electronic device 500.

In an example, according to an electrical connection state of the first switch circuit 660, the first slot region $S_1$ may be expanded from a region between the eleventh point $P_{11}$ and the thirteenth point $P_{13}$ to a region from the eleventh point $P_{11}$ to the fifth non-conductive portion 520j. For example, when the first switch circuit 660 is in the second electrical connection state, the first slot region $S_1$ may be expanded to region from the eleventh point $P_{11}$ to the fifth non-conductive portion 520j. According to an embodiment, as the second portion $A_2$ of the fifth conductive portion 520e is fed at the twelfth point $P_{12}$ and grounded at the thirteenth point $P_{13}$, the second slot region $S_2$, which is adjacent to the second portion $A_2$ of the fifth conductive portion 520e, may operate as a slot antenna. For example, the second slot region $S_2$ may operate as a slot antenna for transmitting or receiving an RF signal in a third frequency band or a sixth frequency band. In an example, the third frequency band may be a high band (HB) (e.g., about 2.2 to 2.7 GHz) frequency band. In another example, the sixth frequency band may be a low band (LB) (e.g., about 0.6 to 1 GHz) frequency band. For example, the second slot region $S_2$ may operate as a slot antenna for transmitting or receiving an RF signal in the sixth frequency band (e.g., a low band (LB)) when the first switch circuit 660 is in the first electrical connection state, and may operate as a slot antenna for transmitting or receiving an RF signal of the third frequency band (e.g., a high band (HB)) when the first switch circuit 660 is in the second electrical connection state. In another example, the second slot region $S_2$ may also operate as a slot antenna for transmitting or receiving an RF signal in the third frequency band (e.g., a high band (HB)) when the first switch circuit 660 is in the first electrical connection state, and may also operate as a slot antenna for transmitting or receiving an RF signal of the sixth frequency band (e.g., a low band (LB)) when the first switch circuit 660 is in the second electrical connection state.

As described above, the electronic device 500 according to an embodiment may transmit and/or receive an RF signal in various frequency bands through the first conductive portion 520a, the third conductive portion 520c, and the fourth conductive portion 520d which operate as an inverted-F antenna, the second conductive portion 520b operating as two loop antennas, and/or the slot S of the first lateral member 520, which operates as a slot antenna.

According to an embodiment, a protrusion (e.g., a flange), which extends from the first lateral member 520, may be formed in at least a part of the first point $P_1$ to the thirteenth point $P_{13}$ (or $P_1$ to $P_{13}$). For example, the protrusion may be formed in a direction toward the inside of the first housing 511. In an example, the first conductive portion 520a, the second conductive portion 520b, the third conductive portion 520c, the fourth conductive portion 520d, and/or the fifth conductive portion 520e may be electrically connected to the first wireless communication circuit 640 and/or a ground of the first printed circuit board 610 through the protrusion described above. In an example, the first conductive portion 520a, the second conductive portion 520b, the third conductive portion 520c, the fourth conductive portion 520d, and/or the fifth conductive portion 520e may be electrically connected to the first printed circuit board 610 through a connecting member (not shown) at the first point $P_1$ to the thirteenth point $P_{13}$. For example, the above-described connecting member may be a C-clip, a conductive screw, a conductive foam, or an FPCB, but it is not limited thereto.

Figure 5C:
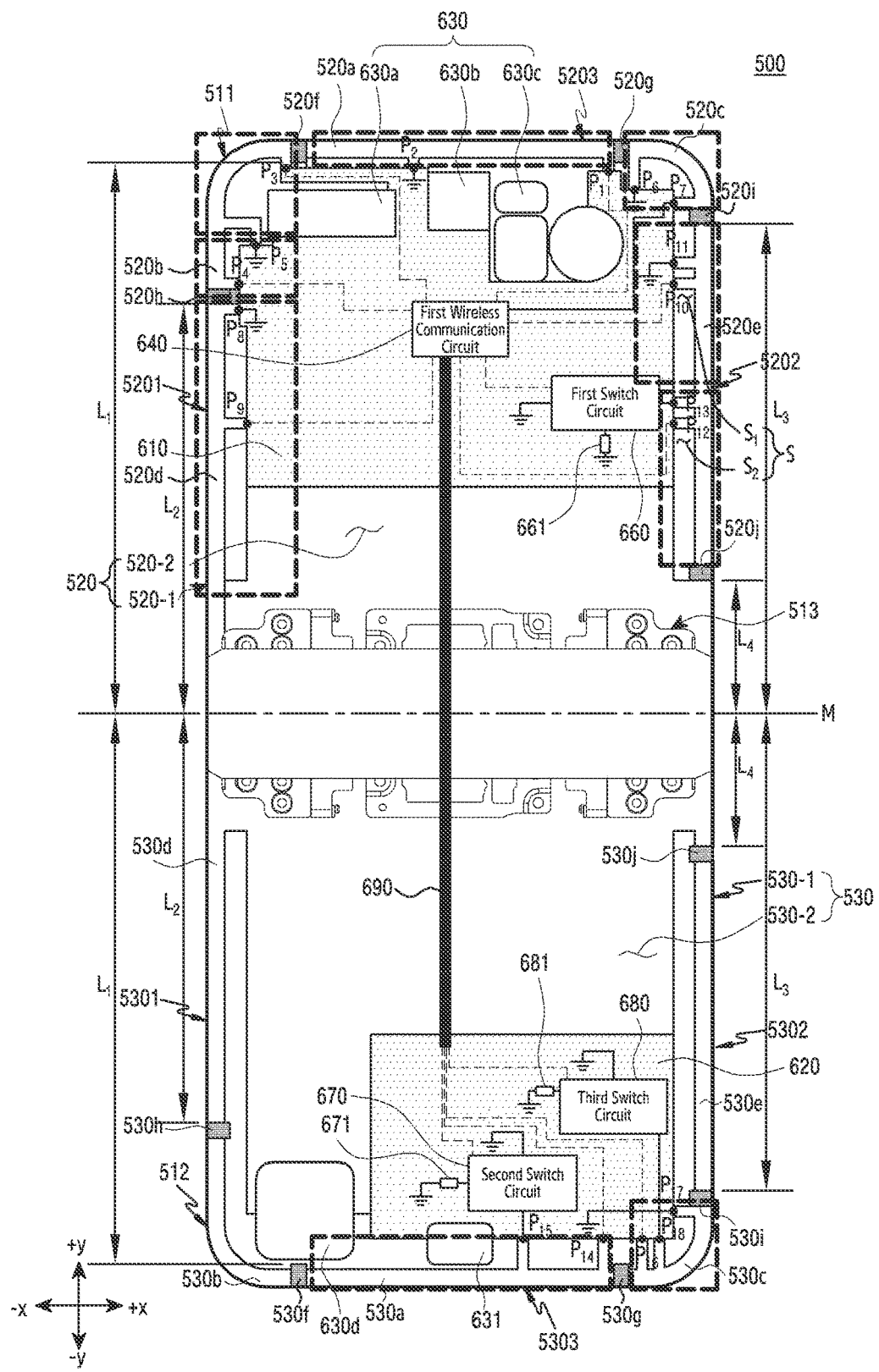
FIG. 5C is a view showing an antenna arrangement structure inside a first housing and a second housing of an electronic device according to an embodiment of the disclosure.

FIG. 5C is a view showing an antenna arrangement structure inside a first housing and a second housing of an electronic device according to an embodiment of the disclosure. FIG. 5C shows elements arranged on one surface (e.g., the inside the −z-direction in FIG. 2A) of the first lateral member 520 and the second lateral member 530 which are arranged inside the first housing 511 and the second housing 512 when the electronic device 500 is in an unfolded state. Although FIG. 5B illustrates a structure in which the first housing 511 and the second housing 512 are foldable with reference to the +x-axis or the −x-axis (or the "horizontal direction"), it is not limited thereto. According to another embodiment, the first housing 511 and the second housing 512 may be folded with reference to the +y-axis or the −y-axis (or a "vertical direction").

Referring to FIG. 5C, an electronic device 500 (e.g., the electronic device 200 in FIG. 2A, the electronic device 500 in FIG. 5A and FIG. 5B) according to an embodiment may include a first housing 511 (e.g., the first housing 211 in FIG. 2A, the first housing 411 in FIG. 4, or the first housing 511 in FIG. 5A), a second housing 512 (e.g., the second housing 212 in FIG. 2A or the second housing 412 in FIG. 4), a hinge assembly 513 (e.g., the connecting structure 250 in FIG. 2A), a first lateral member 520 (e.g., the first lateral member 220 in FIG. 2A, the first lateral member 420 in FIG. 4, or the first lateral member 520 in FIG. 5A), a second lateral member 530 (e.g., the second lateral member 230 in FIG. 2A or the second lateral member 422 in FIG. 4), a first printed circuit board 610 (e.g., the first printed circuit board 610 in FIG. 5A), a second printed circuit board 620, at least one electronic component 630, and/or a first wireless communication circuit 640 (e.g., the first wireless communication circuit 640 in FIG. 5A).

The electronic device 500 according to an embodiment may be an electronic device in which the second housing 512, the hinge assembly 513, the second lateral member 530, the second printed circuit board 620, the second wireless communication circuit 650 are added to the electronic device 500 in FIG. 5A, and, hereinafter, overlapping descriptions thereof will be omitted.

According to an embodiment, the second housing 512 may be rotatably coupled to the first housing 511 through the hinge assembly 513, and may be rotatable within a designated rotation range with reference to the first housing 511. In an example, the second housing 512 may be formed in a shape substantially symmetrical with the first housing 511 with reference to an imaginary center line M crossing the hinge assembly 513. For example, the first housing 511 and the second housing 512 may be formed in substantially the same size and/or the same shape.

According to an embodiment, the second lateral member 530 may be included in the second housing 512, and may include a third structure 530-1 (e.g., the third structure 230-1 in FIG. 2A) forming at least one side surface of the electronic device 500 and/or a fourth structure 530-2 (e.g., the fourth structure 230-2 in FIG. 2A) forming a space in which elements of the electronic device 500 may be arranged.

In an example, the third structure 530-1 of the second lateral member 530 may form a fourth side surface 5301 which extends along the first direction (e.g., the −y-direction in FIG. 5C) and is positioned in the left side (e.g., the −x-direction in FIG. 5B) of the electronic device 500 and/or the second housing 512, a fifth side surface 5302 which is parallel to the fourth side surface 5301 and positioned in the right side (e.g., the +x-direction in FIG. 5C) of the electronic device 500 and/or the second housing 512, and/or a sixth side surface 5303 which extends along a second direction (e.g., the +x-direction in FIG. 5C) perpendicular to the first direction and connects one end of the fourth side surface 5301 and one end of the fifth side surface 5302. For example, the first side surface 5201 (e.g., the first side surface 5201 in FIG. 5A), the second side surface 5202 (e.g., the second side surface 5202 in FIG. 5A), the third side surface 5203 (e.g., the third side surface 5203 in FIG. 5A) of the first lateral member 520, and the fourth side surface 5301, the fifth side surface 5302, or the sixth side surface 5303 of the second lateral member 530, may form the side surface of the electronic device 500.

According to an embodiment, the third structure 530-1 of the second lateral member 530 may include multiple conductive portions, and/or multiple non-conductive portions arranged between multiple conductive portions. In an example, the third structure 530-1 may include a sixth conductive portion 530a (e.g., the sixth conductive portion 230a in FIG. 2A) disposed on the sixth side surface 5303, a seventh conductive portion 530b (e.g., the seventh conductive portion 230b in FIG. 2A) which is adjacent to one end (e.g., the one end in the −x-direction in FIG. 5C) of the sixth conductive portion 530a and disposed on the fourth side surface 5301 and the sixth side surface 5303, and/or an eighth conductive portion 530c (e.g., the eighth conductive portion 230c in FIG. 2A) which is adjacent to the other end (e.g., the one end in the +x-direction in FIG. 5C) of the sixth conductive portion 530a and disposed on the fifth side surface 5302 and the sixth side surface 5303. As another example, the third structure 530-1 may further include a ninth conductive portion 530d (e.g., the ninth conductive portion 230d in FIG. 2A) which is adjacent to the seventh conductive portion 530b and disposed on the fourth side surface 5301, and/or a tenth conductive portion 530e (e.g., the tenth conductive portion 230e in FIG. 2A) which is adjacent to the eighth conductive portion 530c and disposed on the fifth side surface 5302.

In an example, the third structure 530-1 may include a sixth non-conductive portion 530f (e.g., the sixth non-conductive portion 230f in FIG. 2A) disposed between the sixth conductive portion 530a and the seventh conductive portion 530b so as to insulate the sixth conductive portion 530a and the seventh conductive portion 530b, a seventh non-conductive portion 530g (e.g., the seventh non-conductive portion 230g in FIG. 2A) disposed between the sixth conductive portion 530a and the eighth conductive portion 530c so as to insulate the sixth conductive portion 530a and the eighth conductive portion 530c, and/or an eighth non-conductive portion 530h (e.g., the eighth non-conductive portion 230h in FIG. 2A) disposed between the seventh conductive portion 530b and the ninth conductive portion 530d so as to insulate the seventh conductive portion 530b and the ninth conductive portion 530d. As another example, the third structure 530-1 may further include a ninth non-conductive portion 530i (e.g., the ninth non-conductive portion 230i in FIG. 2A) positioned between the eighth conductive portion 530c and one end of the tenth conductive portion 530e so as to insulate the eighth conductive portion 530c and the tenth conductive portion 530e, and/or a tenth non-conductive portion 530j (e.g., the tenth non-conductive portion 230j in FIG. 2A) positioned at the other end of the tenth conductive portion 530e. According to an embodiment, the third structure 530-1 of the second lateral member 530 may be segmented into five regions to be identical or similar to the first structure 520-1 of the first lateral member 520 by the sixth non-conductive portion 530f, the seventh non-conductive portion 530g, the eighth non-conductive portion 530h, the ninth non-conductive portion 530i, and/or the tenth non-conductive portion 530j.

In an example, each of the first non-conductive portion 520f and the sixth non-conductive portion 530f may be disposed to be spaced apart by the first length $L_1$ with reference to the imaginary center line M crossing the hinge assembly 513. As another example, the second non-conductive portion 520g and the seventh non-conductive portion 530g may be arranged to be spaced apart by the same first length $L_1$ with reference to the imaginary center line M. In another example, the third non-conductive portion 520h and the eighth non-conductive portion 530h may be arranged to be spaced apart by the second length $L_2$ with reference to the imaginary center line M. As another example, each of the fourth non-conductive portion 520i and the ninth non-conductive portion 530i may be disposed to be spaced apart by the third length $L_3$ with reference to the imaginary center line M. As another example, each of the fifth non-conductive portion 520j and the tenth non-conductive portion 530j may be disposed to be spaced apart by the third fourth $L_4$ with reference to the imaginary center line M.

According to an embodiment, by the above-described arrangement structure, when the electronic device 500 is in a folded state (e.g., see FIG. 4), the first conductive portion 520a of the first lateral member 520 may be disposed at a position corresponding to the sixth conductive portion 530a of the second lateral member 530, and the second conductive portion 520b of the first lateral member 520 may be disposed at a position corresponding to the seventh conductive portion 530b of the second lateral member 530. As another example, when the electronic device 500 is in a folded state, the third conductive portion 520c of the first lateral member 520 may be disposed at a position corresponding to the eighth conductive portion 530c of the second lateral member 530, the fourth conductive portion 520d of the first lateral member 520 may be disposed at a position corresponding to the ninth conductive portion 530d of the second lateral member 530, and the fifth conductive portion 520e of the first lateral member 520 may be disposed at a position corresponding to (or "facing") the tenth conductive portion 530e of the second lateral member 530. For example, when the electronic device 500 is in a folded state (e.g., see FIG. 4), when seen from above the first cover 261, the second conductive portion 520b of the first lateral member 520 may at least partially overlap the seventh conductive portion 530b of the second lateral member 530, the third conductive portion 520c of the first lateral member 520 may at least partially overlap the eighth conductive portion 530c of the second lateral member 530, the fourth conductive portion 520d of the first lateral member 520 may at least partially overlap the ninth conductive portion 530d of the second lateral member 530, and the fifth conductive portion 520e of the first lateral member 520 may at least partially overlap the tenth conductive portion 530e of the second lateral member 530. In the disclosure, the expression 'correspond' may mean that they may be arranged in directions facing each other while having or not having a physical contact with each other, and, hereinafter, it may be used in the same meaning. For example, that the first conductive portion 520a and the sixth conductive portion 530a correspond may mean that one region of the first conductive portion 520a and one region of the sixth conductive portion 530a are in contact with each other, or the first conductive portion 520a and the sixth conductive portion 530a are arranged to face each other without a physical contact.

According to an embodiment, the second printed circuit board 620 and/or the at least one electronic component 630 may be disposed on at least one surface (e.g., the surface of the −z-direction in FIG. 2A) of the fourth structure 530-2 of the second lateral member 530. As another example, the fourth structure 530-2 may support the second printed circuit board 620 and/or the at least one electronic component 630.

For example, the at least one electronic component 630 may include an audio module 630d.

According to an embodiment, an interface 631 (e.g., the interface 277 in FIGS. 2A and 2B) may be disposed on the second printed circuit board 620. In an example, the interface 631 may include a universal serial bus (USB) interface, or an audio interface. In another example, the second printed circuit board 620 may be electrically connected to the first printed circuit board 610 disposed on the first lateral member 520 through an electrical connecting means (e.g., an FPCB).

In an example, the second printed circuit board 620 may include a ground (not shown). For example, the sixth conductive portion 530a and the eighth conductive portion 530c of the second lateral member 530 may be grounded to the ground of the second printed circuit board 620.

According to an embodiment, the second printed circuit board 620 may be electrically connected to the first wireless communication circuit 640 disposed on the first printed circuit board 610 through an electrical connecting member 690. In an example, the electrical connecting member 690 may electrically connect the first wireless communication circuit 640 and the second printed circuit board 620 while crossing at least a region of the first lateral member 520, the hinge assembly 513, and/or at least a region of the second lateral member 530. In another example, the electrical connecting member 690 may be formed of a material having a ductile (or "flexible) characteristic so as to allow at least a region thereof to be bent in an operation in which the electronic device 500 rotates from a folded state to an unfolded state, or rotates from an unfolded state to a folded state. For example, the electrical connecting member 690 may be at least one of a signal wire, a coaxial cable, and an FPCB, but it is not limited thereto. In an example, the first wireless communication circuit 640 may be disposed on the second printed circuit board 620, and may be electrically connected to the sixth conductive portion 530a and/or the eighth conductive portion 530c of the second lateral member 530 through a transmission line (e.g., a signal wire and/or a coaxial cable) connected to the electrical connecting member 690. In an example, the sixth conductive portion 530a and/or the eighth conductive portion 530c may be electrically connected to the first wireless communication circuit 640 and thus may operate as an antenna radiator for transmitting or receiving an RF signal in a designated frequency band. In an example, the first wireless communication circuit 640 may transmit or feed an RF signal in a designated frequency band to the sixth conductive portion 530a and/or the eighth conductive portion 530c. In another example, the first wireless communication circuit 640 may also receive an RF signal from the sixth conductive portion 530a and/or the eighth conductive portion 530c.

In an example, the sixth conductive portion 530a may be electrically connected to the first wireless communication circuit 640 at a fourteenth point $P_{14}$ which is positioned at the sixth conductive portion 530a (e.g., the one end in the +x-direction in FIG. 5C) and adjacent to the eighth conductive portion 530c. In another example, the sixth conductive portion 530a may be electrically connected to the second switch circuit 670 at a fifteenth point $P_{15}$ spaced apart from the fourteenth point $P_{14}$ in the −x axis-direction. In an embodiment, the second switch circuit 670 may selectively connect the sixth conductive portion 530a to the second passive element 671 or a ground of the second printed circuit board 620. For example, the second passive element 671 may include an inductor and/or a capacitor, but it is not limited thereto. In an example, when the second switch circuit 670 is in the first electrical connection state, the sixth conductive portion 530a may be electrically connected to the ground of the second printed circuit board 620 through the second passive element 671. In another example, when the second switch circuit 670 is in the second electrical connection state, the sixth conductive portion 530a may be electrically connected to the ground of the second printed circuit board 620 without passing through the second passive element 671. For example, the sixth conductive portion 530a may be fed from the first wireless communication circuit 640 at the fourteenth point $P_{14}$, and may be grounded to the ground of the second printed circuit board 620 at the fifteenth point $P_{15}$. In an example, the second switch circuit 670 may be electrically connected to a processor (e.g., the processor 120 in FIG. 1), and the processor may change an electrical connection state of the second switch circuit 670 according to an operation of the electronic device 500. In another example, the second switch circuit 670 may be electrically connected to the first wireless communication circuit 640, and the first wireless communication circuit 640 may change an electrical connection state of the second switch circuit 670. For example, the first wireless communication circuit 640 may change an electrical connection state of the second switch circuit 670 according to a frequency band used for an operation or communication of the electronic device 500.

According to an embodiment, through the above-described electrical connection relation, the sixth conductive portion 530a may operate as an inverted-F antenna (IFA) for transmitting and/or receiving an RF signal in a second frequency band and/or a sixth frequency band. In an example, the second frequency band is a middle band (HB) (e.g., about 2.2 to 2.7 GHz) frequency band. In another example, the sixth frequency band may be a low band (LB) (e.g., about 0.6 to 1 GHz). For example, when the second switch circuit 670 is in the first electrical connection state, the sixth conductive portion 530a may operate as an antenna radiator for transmitting or receiving an RF signal in a sixth frequency band, and when the second switch circuit 670 is in the second electrical connection state, may operate as an antenna radiator for transmitting or receiving an RF signal in a second frequency band. In another example, when the second switch circuit 670 is in the first electrical connection state, the sixth conductive portion 530a may also operate as an antenna radiator for transmitting or receiving an RF signal in the second frequency band, and when the second switch circuit 670 is in the second electrical connection state, may also operate as an antenna radiator for transmitting or receiving an RF signal in the sixth frequency band.

In an example, the eighth conductive portion 530c may be electrically connected to the first wireless communication circuit 640 at a sixteenth point $P_{16}$ which is positioned at the eighth conductive portion 530c (e.g., the one end in the −x-direction in FIG. 5C) and adjacent to the sixth conductive portion 530a. The eighth conductive portion 530c may be electrically connected to a ground of the second printed circuit board 620 at the seventeenth point $P_{17}$ positioned at the eighth conductive portion 530c to be closer to the ninth non-conductive portion 530i than the sixteenth point $P_{16}$. In another example, the eighth conductive portion 530c may be electrically connected to a third switch circuit 680 at the eighteenth point $P_{18}$ positioned between the sixteenth point $P_{16}$ and the seventeenth point $P_{17}$. In an embodiment, the third switch circuit 680 may selectively connect the eighth conductive portion 530c to a third passive element 681 or the ground of the second printed circuit board 620. In an example, when the third switch circuit 680 is in the first electrical connection state, the eighth conductive portion 530c may be electrically connected to the ground of the second printed circuit board 620 through the third passive element 681. In another example, when the third switch circuit 680 is in the second electrical connection state, the eighth conductive portion 530c may be electrically connected to the ground of the second printed circuit board 620 without passing through the second passive element 671. In an example, the third switch circuit 680 may be electrically connected to a processor (e.g., the processor 120 in FIG. 1), and the processor may change an electrical connection state of the third switch circuit 680 according to an operation of the electronic device 500.

According to an embodiment, the eighth conductive portion 530c may be fed from the first wireless communication circuit 640 at the sixteenth point $P_{16}$ and grounded to a ground of the second printed circuit board 620 at the seventeenth point $P_{17}$, so as to operate as an inverted-F antenna for transmitting or receiving an RF signal in a third frequency band. In an example, the third frequency band may be a high band (HB) (e.g., about 2.2 to 2.7 GHz). In an embodiment, the resonant frequency of the eighth conductive portion 530c may be adjusted as an electrical connection state of the third switch circuit 680 is changed.

According to an embodiment, the electronic device 500 may use the first conductive portion 520a as an antenna radiator in a first frequency band (e.g., a GPS L5 band), a second frequency band (e.g., a middle band (MB)), and/or a third frequency band (e.g., a high band (HB)), the second conductive portion 520b as an antenna radiator in a fourth frequency band (e.g., GPS L1 band) and/or a fifth frequency band (e.g., a Wi-Fi band), and the third conductive portion 520c as an antenna radiator in the second frequency band (e.g., a middle band (MB)). As another example, the electronic device 500 may use the fourth conductive portion 520d as an antenna radiator in a fifth frequency band (e.g., a Wi-Fi band), and the slot S, which is formed in a region adjacent to the fifth conductive portion 520e, as an antenna radiator in a sixth frequency band (e.g., a low band (LB), a third frequency band (e.g., a high band (HB)), and/or a seventh frequency band (e.g., an ultra-high band (UHB)). As another example, the electronic device 500 may use the sixth conductive portion 530a as an antenna radiator in a sixth frequency band (e.g., a low band (LB)) and/or a second frequency band (e.g., a middle band (MB)), and the eighth conductive portion 530c as an antenna radiator in a third frequency band (e.g., a high band (HB)).

According to an embodiment, the electronic device 500 may use the slot S, which is formed in a region adjacent to the second side surface 5202, as an antenna radiator for transmitting and/or receiving an RF signal in a sixth frequency band (e.g., a low band (LB)), and when the electronic device 500 is in a folded state, may use the sixth conductive portion 530a, which is disposed on the sixth side surface 5303 not corresponding to the second side surface 5202, as an antenna radiator in a sixth frequency (e.g., a low band (LB)). Accordingly, when the electronic device 500 is in a folded state, the electronic device 500 according to an embodiment may reduce the generation of interference between RF signals in a sixth frequency band (e.g., a low band (LB)).

According to an embodiment, a protrusion (e.g., a flange), which extends from the second lateral member 530, may be formed in at least a part of the fourteenth point $P_{14}$ to the eighteenth point $P_{18}$ (or $P_{14}$ to $P_{18}$). For example, the protrusion may be formed in a direction toward the inside of the second housing 512. In an example, the sixth conductive portion 530a and/or the eighth conductive portion 530c may be electrically connected to a ground of the first wireless communication circuit 640 and/or the second printed circuit board 620 through the above-described protrusion. In an example, the sixth conductive portion 530a and/or the eighth conductive portion 530c may be electrically connected to the second printed circuit board 620 through a connecting member (not shown) at the fourteenth point $P_{14}$ to the eighteenth point $P_{18}$. For example, the above-described connecting member may be a C-clip, a conductive screw, a conductive foam, or an FPCB, but it is not limited thereto.

Figure 6:
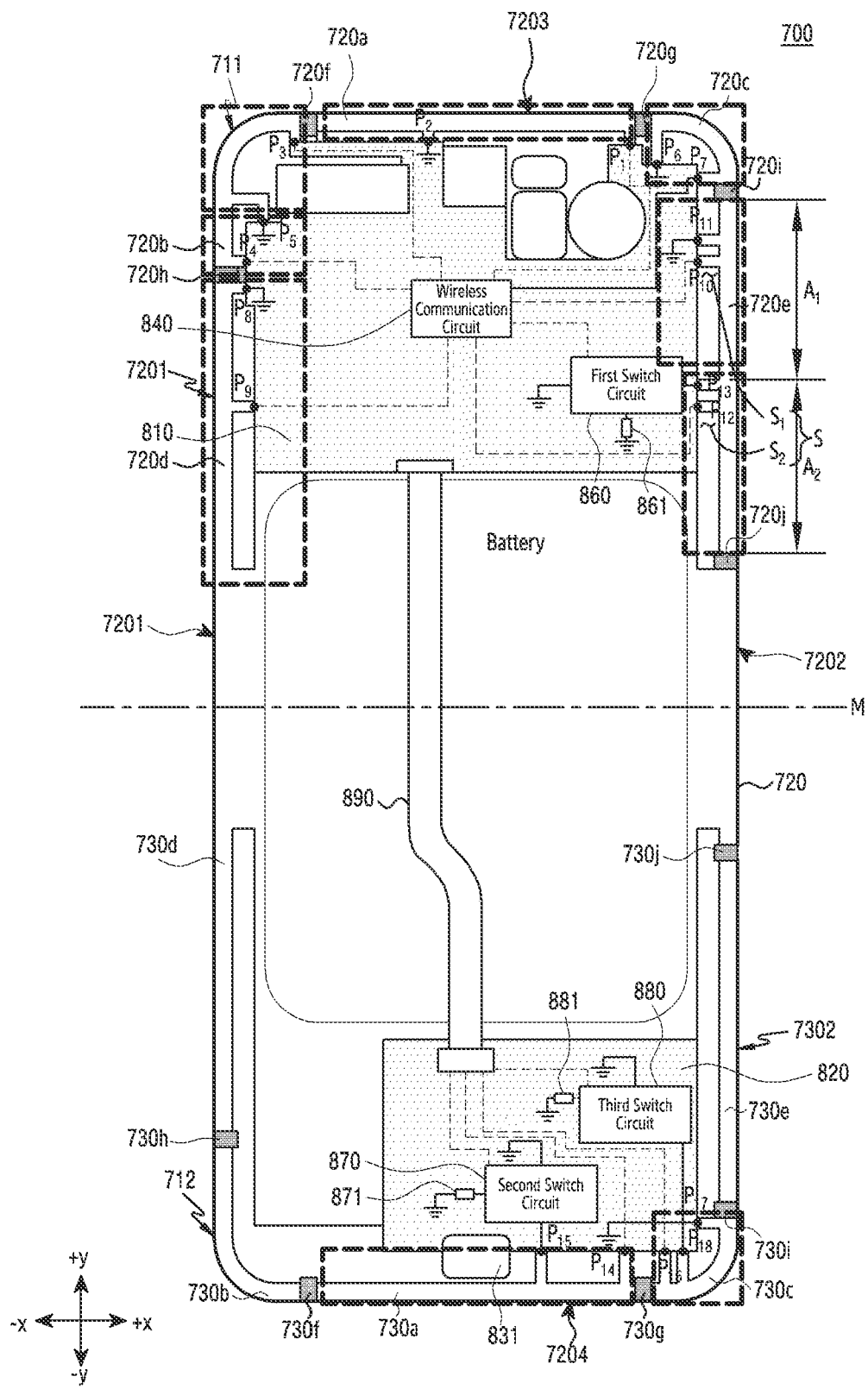
FIG. 6 is a view showing an antenna arrangement structure inside a housing of an electronic device according to an embodiment of the disclosure.

FIG. 6 is a view showing an antenna arrangement structure inside a housing of an electronic device according to an embodiment of the disclosure.

Referring to FIG. 6, an electronic device 700 (e.g., the electronic device 300 in FIG. 3) according to an embodiment may include a housing 710 (e.g., the housing 310 in FIG. 3), a lateral member 720 (e.g., the lateral member 320 in FIG. 3), a first printed circuit board 810, a second printed circuit board 820, a wireless communication circuit 840 (e.g., the wireless communication module 192 in FIG. 1), and/or an electrical connecting member 890. At least one of elements of the electronic device 700 according to an embodiment may be the same as or similar to at least one of elements of the electronic device 300 in FIG. 3, and, hereinafter, overlapping descriptions thereof will be omitted hereinafter. In an embodiment, the lateral member 720 may include a support member (not shown) (e.g., the second structure 220-2 or the fourth structure 230-2 in FIG. 2A). For example, the lateral member 720 may be formed integrally with the support member, or may be formed by coupling thereof. In an embodiment, at least a part of components included in the electronic device 700 may be disposed in a support member (not shown). A first housing 711, a second housing 712 and fifth side surface 7302 may correspond to the first housing 511, the second housing 512 and fifth side surface 5302, respectively.

According to an embodiment, the lateral member 720 may be included in the housing 710, and may form a side surface of the electronic device 700. In an example, the lateral member 720 may form a first side surface 7201 positioned in the left side (e.g., the −x-direction in FIG. 6) of the electronic device 700 and/or the housing 710, a second side surface 7202 which is parallel to the first side surface 7201 and positioned in the right side (e.g., the +x-direction in FIG. 6) of the electronic device 700 and/or the housing 710, a third side surface 7203 which extends along a second direction (e.g., the +x-direction in FIG. 6) perpendicular to a first direction and connects one end (e.g., the one end in the +y-direction in FIG. 6) of the first side surface 7201 and one end of (e.g., the one end in the +y-direction in FIG. 6) of the second side surface 7202, and/or a fourth side surface 7204 which is parallel to the third side surface 7203 and connects the other end (e.g., the one end in the −y-direction in FIG. 6) of the first side surface 7201 and the other end (e.g., the −y-direction in FIG. 6) of the second side surface 7202.

According to an embodiment, the lateral member 720 may include multiple conductive portions and multiple non-conductive portions arranged between the multiple conductive portions. In an example, the lateral member 720 may include a first conductive portion 720a (e.g., the first conductive portion 320a in FIG. 3) disposed on the third side surface 7203, a second conductive portion 720b (e.g., the second conductive portion 320b in FIG. 3) which is adjacent to one end (e.g., the one end in the −x-direction in FIG. 6) of the first conductive portion 720a and disposed on the first side surface 7201 and the third side surface 7203, and/or a third conductive portion 720c (e.g., the third conductive portion 320c in FIG. 3) which is adjacent to the other end (e.g., the one end in the +x-direction in FIG. 6) of the first conductive portion 720a and disposed on the second side surface 7202 and the third side surface 7203. In another example, the lateral member 720 may further include a fourth conductive portion 720d (e.g., the fourth conductive portion 320d in FIG. 3) which is adjacent to the second conductive portion 720b and disposed on the first side surface 7201 and/or a fifth conductive portion 720e (e.g., the fifth conductive portion 320e in FIG. 3) which is adjacent to the third conductive portion 720c and disposed on the second side surface 7202.

In an example, the lateral member 720 may include a sixth conductive portion 730a (e.g., the sixth conductive portion 330a in FIG. 3) disposed on the fourth side surface 7204, a seventh conductive portion 730b (e.g., the seventh conductive portion 330b in FIG. 3) which is adjacent to one end (e.g., the one end in the −x-direction in FIG. 6) of the sixth conductive portion 730a and disposed on the first side surface 7201 and the fourth side surface 7204, and/or an eighth conductive portion 730c (e.g., the eighth conductive portion 330c in FIG. 3) which is adjacent to the other end (e.g., the one end in the +x-direction in FIG. 6) of the sixth conductive portion 730a and disposed on the second side surface 7202 and the fourth side surface 7204. As another example, the lateral member 720 may further include a ninth conductive portion 730d (e.g., the ninth conductive portion 330d in FIG. 3) which is adjacent to the seventh conductive portion 730b and disposed on the first side surface 7201 and/or a tenth conductive portion 730e (e.g., the tenth conductive portion 330e in FIG. 3) which is adjacent to the eighth conductive portion 730c and disposed on the second side surface 7202.

In an example, the lateral member 720 may include a first non-conductive portion 720f (e.g., the first non-conductive portion 320f in FIG. 3) disposed between the first conductive portion 720a and the second conductive portion 720b so as to insulate the first conductive portion 720a and the second conductive portion 720b, a second non-conductive portion 720g (e.g., the second non-conductive portion 320g in FIG. 3) disposed between the first conductive portion 720a and the third conductive portion 720c so as to insulate the first conductive portion 720a and the third conductive portion 720c, and/or a third non-conductive portion 720h (e.g., the third non-conductive portion 320h in FIG. 3) disposed between the second conductive portion 720b and the fourth conductive portion 720d so as to insulate the second conductive portion 720b and the fourth conductive portion 720d. In another example, the lateral member 720 may further include a fourth non-conductive portion 720i (e.g., the fourth non-conductive portion 320i in FIG. 3) positioned between the third conductive portion 720c and one end of the fifth conductive portion 720e so as to insulate the third conductive portion 720c and the fifth conductive portion 720e, and/or a fifth non-conductive portion 720j (e.g., the fifth non-conductive portion 320j in FIG. 3) positioned at the other end of the fifth conductive portion 720e.

In another example, the lateral member 720 may include a sixth non-conductive portion 730f (e.g., the sixth non-conductive portion 330f in FIG. 3) disposed between the sixth conductive portion 730a and the seventh conductive portion 730b so as to insulate the sixth conductive portion 730a and the seventh conductive portion 730b, a seventh non-conductive portion 730g (e.g., the seventh non-conductive portion 330g in FIG. 3) disposed between the sixth conductive portion 730a and the eighth conductive portion 730c so as to insulate the sixth conductive portion 730a and the eighth conductive portion 730c, and/or an eighth non-conductive portion 730h (e.g., the eighth non-conductive portion 330h in FIG. 3) disposed between the seventh conductive portion 730b and the ninth conductive portion 730d so as to insulate the seventh conductive portion 730b and the ninth conductive portion 730d. As another example, the lateral member 720 may further include a ninth non-conductive portion 730i (e.g., the ninth non-conductive portion 330i in FIG. 3) positioned between the eighth conductive portion 730c and one end of the tenth conductive portion 730e so as to insulate the eighth conductive portion 730c and the tenth conductive portion 730e, and/or a tenth non-conductive portion 730j (e.g., the tenth non-conductive portion 330j in FIG. 3) positioned at the other end of the tenth conductive portion 730e.

According to an embodiment, the top region (e.g., the region in the +y-direction in FIG. 6) of the lateral member 720 may be segmented into five regions by the first non-conductive portion 720f, the second non-conductive portion 720g, the third non-conductive portion 720h, the fourth non-conductive portion 720i, and/or the fifth non-conductive portion 720j. According to another embodiment, the bottom region (e.g., the region in the −y-direction in FIG. 6) of the lateral member 720 may be segmented into five regions, which is identical or similar to the above-described top region of the lateral member 720, by the sixth non-conductive portion 730f, the seventh non-conductive portion 730g, the eighth non-conductive portion 730h, the ninth non-conductive portion 730i, and/or the tenth non-conductive portion 730j. According to another embodiment, the number of regions into which the bottom region (e.g., the region in the −y-direction in FIG. 6) of the lateral member 720 is segmented and the number of regions into which the top region (e.g., the +y-direction region in FIG. 6) of the lateral member 720 is segmented, may be various, and the number of regions into which the top region of the lateral member 720 is segmented and the number of regions into which the bottom region of the lateral member 720 is segmented, may be different from each other.

According to an embodiment, the first printed circuit board 810 may be disposed in at least a region (e.g., the region in the +y-direction of the lateral member 720) of the lateral member 720. For example, the first printed circuit board 810 may be disposed adjacent to the first conductive portion 720a, the second conductive portion 720b, the third conductive portion 720c, the fourth conductive portion 720d, and/or the fifth conductive portion 720e. In an example, a processor (e.g., the processor 120 in FIG. 1), a memory (e.g., the memory 130 in FIG. 1), an interface (e.g., the interface 177 in FIG. 1), and/or the wireless communication circuit 840 may be arranged on the first printed circuit board 810. In an example, the processor may include at least one of a central processing unit, an application processor, a graphic processing unit, an image signal processor, a sensor hub processor, and a communication processor. In an example, the memory may include a volatile memory or a non-volatile memory. In an example, the interface may include a high-definition multimedia interface (HDMI) and/or an audio interface.

In an example, the first printed circuit board 810 may include a ground (not shown). In an embodiment, the first conductive portion 720a, the second conductive portion 720b, the third conductive portion 720c, the fourth conductive portion 720d, and/or the fifth conductive portion 720e of the lateral member 720 may be grounded to the ground of the first printed circuit board 810.

According to an embodiment (e.g., see FIG. 6), the wireless communication circuit 840 may be electrically connected to the first conductive portion 720a, the second conductive portion 720b, the third conductive portion 720c, the fourth conductive portion 720d, and/or the fifth conductive portion 720e through a transmission line (e.g., a signal wire, a coaxial cable, or an FPCB). In an example, the first conductive portion 720a, the second conductive portion 720b, the third conductive portion 720c, the fourth conductive portion 720d, and/or the fifth conductive portion 720e may be electrically connected to the wireless communication circuit 840 and thus may operate as an antenna radiator for transmitting or receiving an RF signal in a designated frequency band. In an example, the wireless communication circuit 840 may feed an RF signal to the first conductive portion 720a, the second conductive portion 720b, the third conductive portion 720c, the fourth conductive portion 720d, and/or the fifth conductive portion 720e. In another example, the wireless communication circuit 840 may also receive an RF signal from the first conductive portion 720a, the second conductive portion 720b, the third conductive portion 720c, the fourth conductive portion 720d, and/or the fifth conductive portion 720e.

According to an embodiment, the second printed circuit board 820 may be spaced apart from the first printed circuit board 810 so as to be disposed in at least a region (e.g., the region in the −y-direction of the lateral member 720) of the lateral member 720. For example, the second printed circuit board 820 may be disposed adjacent to the sixth conductive portion 730a, the seventh conductive portion 730b, the eighth conductive portion 730c, the ninth conductive portion 730d, and/or the tenth conductive portion 730e. In an example, an interface 831 (e.g., the interface 177 in FIG. 1) may be disposed on the second printed circuit board 820. In an example, the interface 831 may include a universal serial bus (USB) interface, or an audio interface.

According to an embodiment, the second printed circuit board 820 may be electrically connected to the first printed circuit board 810 through an electrical connecting member 890 (e.g., a coaxial cable or an FPCB). In an example, the second printed circuit board 820 may be electrically connected to the wireless communication circuit 840 disposed on the first printed circuit board 810 through the electrical connecting member 890. In an example, the second printed circuit board 820 may include a transmission line (e.g., a signal wire, a coaxial cable or an FPCB) electrically connecting the electrical connecting member 890 to the sixth conductive portion 730a and/or the eighth conductive portion 730c. For example, through the above-described electrical connecting member 890 and/or transmission line, the sixth conductive portion 730a and/or the eighth conductive portion 730c of the lateral member 720 may be electrically connected to the wireless communication circuit 840.

In an example, the sixth conductive portion 730a and/or the eighth conductive portion 730c may be electrically connected to the wireless communication circuit 840 and thus may operate as an antenna radiator for transmitting or receiving an RF signal in a designated frequency band. In an example, the wireless communication circuit 840 may transmit or feed an RF signal in a designated frequency band to the sixth conductive portion 730a and/or the eighth conductive portion 730c. In another example, the wireless communication circuit 840 may also receive an RF signal from the sixth conductive portion 730a and/or the eighth conductive portion 730c.

According to an embodiment, the second printed circuit board 820 may include a ground (not shown). For example, the sixth conductive portion 730a and the eighth conductive portion 730c of the second lateral member 730 may be grounded to the ground of the second printed circuit board 820.

In an example, the first conductive portion 720a may be electrically connected to the wireless communication circuit 840 at the first point $P_1$ which is positioned at the first conductive portion 720a and adjacent to the third conductive portion 720c. In another example, the first conductive portion 720a may be electrically connected to a ground of the first printed circuit board 810 at a second point $P_2$ spaced apart from the first point $P_1$ in the −x-axis direction. For example, the first conductive portion 720a may be fed from the wireless communication circuit 840 at the first point $P_1$, and may be grounded to the ground of the first printed circuit board 810 at the second point $P_2$. For example, through the above-described electrical connection relation, the first conductive portion 720a may operate as an inverted-F antenna (IFA) for transmitting and/or receiving an RF signal in a first frequency band, a second frequency band, a third frequency band, and/or a fourth frequency band. In an example, the first frequency band may be a GPS L5 frequency band (e.g., about 1.176 GHz), the second frequency band may be a middle band (MB) (e.g., about 1.7 to 2.2 GHz), and the third frequency band may be a high band (HB) (e.g., about 2.2 to 2.7 GHz) frequency band.

In an example, the second conductive portion 720b may be electrically connected to the wireless communication circuit 840 at the third point $P_3$ which is positioned at the second conductive portion 720b and adjacent to the first conductive portion 720a. As another example, the second conductive portion 720b may be electrically connected to the wireless communication circuit 840 at a fourth point $P_4$ which is positioned at the second conductive portion 720b and adjacent to the fourth conductive portion 720d. In another example, the second conductive portion 720b may be electrically connected to a ground of the first printed circuit board 810 at the fifth point $P_5$ positioned between the third point $P_3$ and the fourth point $P_4$. For example, the second conductive portion 720b may be fed from the wireless communication circuit 840 at the third point $P_3$ and the fourth point $P_4$, and may be grounded to the ground of the first printed circuit board 810 at the fifth point $P_5$. In another example, the second conductive portion 720b may be electrically connected to a second wireless communication circuit (not shown) (e.g., the second wireless communication circuit 642 in FIG. 5B) at the fourth point $P_4$. In another example, the second conductive portion 720b may be fed from the wireless communication circuit 840 at the third point $P_3$, and may be fed from the second wireless communication circuit at the fourth point $P_4$. In an example, through the above-described electrical connection relation, for example, a region $L_1$ between the third point $P_3$ and the fifth point $P_5$ of the second conductive portion 720b may operate as a first loop antenna, and a region $L_2$ between the fourth point $P_4$ and the fifth point $P_5$ of the second conductive portion 720b may operate as a second loop antenna.

In an example, the fifth point $P_5$ may be positioned at a position adjacent to the fourth point $P_4$ compared to the third point $P_3$, and thus the length of the region $L_1$ between the third point $P_3$ and the fifth point $P_5$ of the second conductive portion 720b may be longer than the length of the region $L_2$ between the fourth point $P_4$ and the fifth point $P_5$ of the second conductive portion 720b. For example, the region $L_1$ between the third point $P_3$ and the fifth point $P_5$ of the second conductive portion 720b may operate as a loop antenna for transmitting or receiving an RF signal in a fourth frequency which is a frequency band relatively lower than the region $L_2$ between the fourth point $P_4$ and the fifth point $P_5$ of the second conductive portion 720b. In an example, the fourth frequency band may be a GPS L1 (e.g., about 1.575 GHz) frequency band. As another example, the region $L_2$ between the fourth point $P_4$ and the fifth point $P_5$ of the second conductive portion 720b may operate as a loop antenna for transmitting or receiving an RF signal in a fifth frequency which is a frequency band relatively higher than the region $L_1$ between the third point $P_3$ and the fifth point $P_5$ of the second conductive portion 720b. In an example, the fifth frequency band may be a WiFi (e.g., about 2.4 GHz and/or about 5 GHz) frequency band.

In an example, the first printed circuit board 810 may not be disposed in a region adjacent to the region $L_1$ between the third point $P_3$ and the fifth point $P_5$ of the second conductive portion 720b. In another example (not shown), a fill-cut area (e.g., the area F in FIG. 5B) (or a "non-conductive layer") may be disposed in a region adjacent to the region $L_1$ between the third point $P_3$ and the fifth point $P_5$ of the second conductive portion 720b.

In an example, the third conductive portion 720c may be electrically connected to a ground of the first printed circuit board 810 at a sixth point $P_6$ which is positioned at the third conductive portion 720c and adjacent to the first conductive portion 720a. In another example, the third conductive portion 720c may be electrically connected to the wireless communication circuit 840 at a seventh $P_7$ which is positioned at the third conductive portion 720c and adjacent to the fifth conductive portion 720e. For example, the third conductive portion 720c may be grounded to the ground of the first printed circuit board 810 at the sixth point $P_6$, and may be fed from the wireless communication circuit 840 at the seventh point $P_7$. The third conductive portion 720c according to an embodiment may operate as an inverted-F antenna for transmitting or receiving an RF signal in a middle band (MB) (e.g., about 1.7 to 2.2 GHz) frequency band.

In an example, the fourth conductive portion 720d may be electrically connected to a ground of the first printed circuit board 810 at an eighth point $P_8$ which is positioned at the fourth conductive portion 720d and adjacent to the second conductive portion 720b. In another example, the fourth conductive portion 720d may be electrically connected to the wireless communication circuit 840 at a ninth point $P_9$ spaced apart from the eighth point $P_8$ in the −y-axis direction. For example, the fourth conductive portion 720d may be grounded to the ground of the first printed circuit board 810 at the eighth point $P_8$, and may be fed from the wireless communication circuit 840 at the ninth point $P_9$. In another example, the fourth conductive portion 720d may be electrically connected to a second wireless communication circuit (not shown) (e.g., the second wireless communication circuit 642 in FIG. 5B) at the ninth point $P_9$ spaced apart from the eighth point $P_8$ in the −y-axis direction. For example, the fourth conductive portion 720d may be grounded to a ground of the first printed circuit board 810 at the eighth point $P_8$, and may be fed from the second wireless communication circuit (not shown) at the ninth point $P_9$. The fourth conductive portion 720d according to an embodiment may operate as an inverted-F antenna for transmitting or receiving an RF signal in the fifth frequency band. In an example, the fifth frequency band may be a Wi-Fi (e.g., about 2.4 and/or about 5 GHz) frequency band.

According to an embodiment, the fifth conductive portion 720e may include a first portion $A_1$ which is adjacent to the third conductive portion 720c and has a first length, and a second portion $A_2$ which is adjacent to the first portion $A_1$ and has a second length. As an example, the second length may be longer than the first length, but it may be not limited thereto. According to an embodiment, a slot (e.g., the region S in FIG. 6) may be formed in the lateral member 720 adjacent to the fifth conductive portion 720e. In an example, the slot S may include a first slot region $S_1$ adjacent to the first slot region $S_1$ of the fifth conductive portion 720e, and/or a second slot region $S_2$ adjacent to the second portion $A_2$ of the fifth conductive portion 720e. In an example, the first slot region $S_1$ may mean a region between an eleventh point $P_{11}$ and a thirteenth point $P_{13}$. In another example, the second slot region $S_2$ may mean a region between the thirteenth point $P_{13}$ and the fifth non-conductive portion 720j.

In an example, the first portion $A_1$ of the fifth conductive portion 720e, which is adjacent to the first slot region $S_1$ of the slot S, may be electrically connected to the wireless communication circuit 840 at the tenth point $P_{10}$, and may be electrically connected to a ground of the first printed circuit board 810 at the eleventh point $P_{11}$ positioned between the tenth point $P_{10}$ and the fourth non-conductive portion 720i. For example, the first portion $A_1$ may be fed from the wireless communication circuit 840 at the tenth point $P_{10}$, and may be grounded to the ground of the first printed circuit board 810 at the eleventh point $P_{11}$. As the first portion $A_1$ of the fifth conductive portion 720e is fed at the tenth point $P_{10}$ and grounded at the eleventh point $P_{11}$, and the first slot region $S_1$, which is adjacent to the first portion $A_1$ of the fifth conductive portion 720e, may operate as a slot antenna. For example, the first slot region $S_1$ may operate as a slot antenna for transmitting or receiving an RF signal in a seventh frequency band. In an example, the seventh frequency band may be an ultra-high band (UHB) (e.g., about 3.55 to 3.7 GHz).

In an example, the second portion $A_2$ of the fifth conductive portion 720e, which is adjacent to the second slot region $S_2$ of the slot S, may be electrically connected to the wireless communication circuit 840 at a twelfth point $P_{12}$, and may be electrically connected to the first switch circuit 860 at the thirteenth point $P_{13}$ positioned between the twelfth point $P_{12}$ and the tenth point $P_{10}$. In an embodiment, the first switch circuit 860 may selectively connect the second portion $A_2$ of the fifth conductive portion 720e to a ground of the first printed circuit board 810 or a first passive element 861. For example, the first passive element 861 may include an inductor and/or a capacitor, but it is not limited thereto.

In an example, when the first switch circuit 860 is in the first electrical connection state, the second portion $A_2$ may be electrically connected to a ground of the first printed circuit board 810 through the first passive element 861. In another example, when the first switch circuit 860 is in the second electrical connection state, the second portion $A_2$ may be electrically connected to the ground of the first printed circuit board 810 without passing through the first passive element 861. For example, the second portion $A_2$ of the fifth conductive portion 720e may be fed from the wireless communication circuit 840 at the twelfth point $P_{12}$, and may be grounded to the ground of the first printed circuit board 810 at the thirteenth point $P_{13}$. In an example, the first switch circuit 860 may be electrically connected to a processor (e.g., the processor 120 in FIG. 1), and the processor may change an electrical connection state of the first switch circuit 860. In another example, the second switch circuit 870 may be electrically connected to the wireless communication circuit 840, and the wireless communication circuit 840 may change an electrical connection state of the second switch circuit 870 according to an operation of the electronic device 700. In an example, according to an electrical connection state of the first switch circuit 860, the first slot region $S_1$ may be expanded from a region between the eleventh point $P_{11}$ and the thirteenth point $P_{13}$ to a region from the eleventh point $P_{11}$ to the fifth non-conductive portion 720j. For example, when the first switch circuit 860 is in the second electrical connection state, the first slot region $S_1$ may be expanded to a region from the eleventh point $P_{11}$ to the fifth non-conductive portion 720j. According to an embodiment, as the second portion $A_2$ of the fifth conductive portion 720e is fed at the twelfth point $P_{12}$ and grounded at the thirteenth point $P_{13}$, the second slot region $S_2$, which is adjacent to the second portion $A_2$ of the fifth conductive portion 720e, may operate as a slot antenna. For example, the second slot region $S_2$ may operate as a slot antenna for transmitting or receiving an RF signal in a third frequency band or a sixth frequency band. In an example, the third frequency band may be a high band (HB) (e.g., 2.2 to 2.7 GHz) frequency band. In another example, the sixth frequency band may be a low band (LB) (e.g., 0.6 to 1 GHz) frequency band. For example, the second slot region $S_2$ may operate as a slot antenna for transmitting or receiving an RF signal in the sixth frequency band (e.g., a low band (LB)) when the first switch circuit 860 is in the first electrical connection state, and may operate as a slot antenna for transmitting or receiving an RF signal of the third frequency band (e.g., a high band (HB)) when the first switch circuit 860 is in the second electrical connection state. In another example, the second slot region $S_2$ may also operate as a slot antenna for transmitting or receiving an RF signal in the third frequency band (e.g., a high band (HB)) when the first switch circuit 860 is in the first electrical connection state, and may also operate as a slot antenna for transmitting or receiving an RF signal of the sixth frequency band (e.g., a low band (LB)) when the first switch circuit 860 is in the second electrical connection state.

As described above, the electronic device 700 according to an embodiment may transmit and/or receive an RF signal in various frequency bands through the first conductive portion 720a, the third conductive portion 720c, and the fourth conductive portion 720d which operate as an inverted-F antenna, the second conductive portion 720b operating as two loop antennas, and/or the slot S of the lateral member 720 operating as a slot antenna.

In an example, the sixth conductive portion 730a may be electrically connected to the wireless communication circuit 840 at a fourteenth point $P_{14}$ which is positioned at the sixth conductive portion 730a (e.g., the one end in the +x-direction in FIG. 6) and adjacent to the eighth conductive portion 730c. In another example, the sixth conductive portion 730a may be electrically connected to the second wireless communication circuit at a fifteenth point $P_{15}$ spaced apart from the fourteenth point $P_{14}$ in the −x axis-direction. In an embodiment, the second switch circuit 870 may selectively connect the sixth conductive portion 730a to a second passive element 871 or a ground of the second printed circuit board 820. For example, the second passive element 871 may include an inductor and/or a capacitor, but it is not limited thereto. In an example, when the second switch circuit 870 is in the first electrical connection state, the sixth conductive portion 730a may be electrically connected to a ground of the second printed circuit board 820 through the second passive element 871. In another example, when the second switch circuit 870 is in the second electrical connection state, the sixth conductive portion 730*a* may be electrically connected to the ground of the second printed circuit board 820 without passing through the second passive element 871. For example, the sixth conductive portion 730*a* may be fed from the wireless communication circuit 840 at the fourteenth point $P_{14}$, and may be grounded to a ground of the second printed circuit board 820 at the fifteenth point $P_{15}$. In an example, the second switch circuit 870 may be electrically connected to a processor (e.g., the processor 120 in FIG. 1), and the processor may change an electrical connection state of the second switch circuit 870 according to an operation of the electronic device 700. In another example, the second switch circuit 870 may be electrically connected to the wireless communication circuit 840, and the wireless communication circuit 840 may change an electrical connection state of the second switch circuit 870 according to an operation of the electronic device 700.

According to an embodiment, through the above-described electrical connection relation, the sixth conductive portion 730*a* may operate as an inverted-F antenna (IFA) for transmitting and/or receiving an RF signal in a second frequency band and/or a sixth frequency band. In an example, the second frequency band is a middle band (HB) (e.g., about 2.2 to 2.7 GHz) frequency band. In another example, the sixth frequency band may be a low band (LB) (e.g., about 0.6 to 1 GHz). For example, when the second switch circuit 870 is in the first electrical connection state, the sixth conductive portion 730*a* may operate as an antenna radiator for transmitting or receiving an RF signal in a sixth frequency band, and when the second switch circuit 870 is in the second electrical connection state, may operate as an antenna radiator for transmitting or receiving an RF signal in a second frequency band. In another example, when the second switch circuit 870 is in the first electrical connection state, the sixth conductive portion 730*a* may also operate as an antenna radiator for transmitting or receiving an RF signal in the second frequency band, and when the second switch circuit 870 is in the second electrical connection state, may also operate as an antenna radiator for transmitting or receiving an RF signal in the sixth frequency band.

In an example, the eighth conductive portion 730*c* may be electrically connected to the wireless communication circuit 840 at the sixteenth point $P_{16}$ which is positioned at the eighth conductive portion 730*c* and adjacent to the sixth conductive portion 730*a*. The eighth conductive portion 730*c* may be electrically connected to the ground of the second printed circuit board 820 at the seventeenth point $P_{17}$ positioned at the eighth conductive portion 730*c* to be closer to the ninth non-conductive portion 730*i* than the sixteenth point $P_{16}$. In another example, the eighth conductive portion 730*c* may be electrically connected to a third switch circuit 880 at the eighteenth point $P_{18}$ positioned between the sixteenth point $P_{16}$ and the seventeenth point $P_{17}$. In an embodiment, the third switch circuit 880 may selectively connect the eighth conductive portion 730*c* to a third passive element 881 or the ground of the second printed circuit board 820. In an example, when the third switch circuit 880 is in the first electrical connection state, the eighth conductive portion 730*c* may be electrically connected to the ground of the second printed circuit board 820 through the third passive element 881. In another example, when the third switch circuit 880 is in the second electrical connection state, the eighth conductive portion 730*c* may be electrically connected to the ground of the second printed circuit board 820 without passing through the second passive element 871. In an example, the third switch circuit 880 may be electrically connected to a processor (e.g., the processor 120 in FIG. 1), and the processor may change an electrical connection state of the third switch circuit 880 according to an operation of the electronic device 700.

According to an embodiment, the eighth conductive portion 730*c* may be fed from the wireless communication circuit 840 at the sixteenth point $P_{13}$ and grounded to the ground of the second printed circuit board 820 at the seventeenth point $P_{17}$, so as to operate as an inverted-F antenna for transmitting or receiving an RF signal in a third frequency band. In an example, the third frequency band may be a high band (HB) (e.g., about 2.2 to 2.7 GHz). In an embodiment, the resonant frequency of the eighth conductive portion 730*c* may be adjusted as an electrical connection state of the third switch circuit 880 is changed.

According to an embodiment, the electronic device 700 may use the first conductive portion 720*a* as an antenna radiator in a first frequency band (e.g., a GPS L5 band), a second frequency band (e.g., a middle band (MB)), and/or a third frequency band (e.g., a high band (HB)), the second conductive portion 720*b* as an antenna radiator in a fourth frequency band (e.g., GPS L1 band) and/or a fifth frequency band (e.g., a Wi-Fi band), and the third conductive portion 720*c* as an antenna radiator in the second frequency band (e.g., a middle band (MB)). As another example, the electronic device 700 may use the fourth conductive portion 720*d* as an antenna radiator in a fifth frequency band (e.g., a Wi-Fi band), and the slot S, which is formed in a region adjacent to the fifth conductive portion 720*e*, as an antenna radiator in a sixth frequency band (e.g., a low band (LB), a third frequency band (e.g., a high band (HB)), and/or a seventh frequency band (e.g., an ultra-high band (UHB)). As another example, the electronic device 700 may use the sixth conductive portion 730*a* as an antenna radiator in a sixth frequency band (e.g., a low band (LB)) and/or a second frequency band (e.g., a middle band (MB)), and the eighth conductive portion 730*c* as an antenna radiator in a third frequency band (e.g., a high band (HB)).

According to an embodiment, a protrusion (e.g., a flange), which extends from the lateral member 720, may be formed in at least a part of the first point $P_1$ to the eighteenth point $P_{18}$ (or $P_1$ to $P_{18}$). For example, the protrusion may be formed in a direction toward the inside of the housing 710.

Figure 7A:
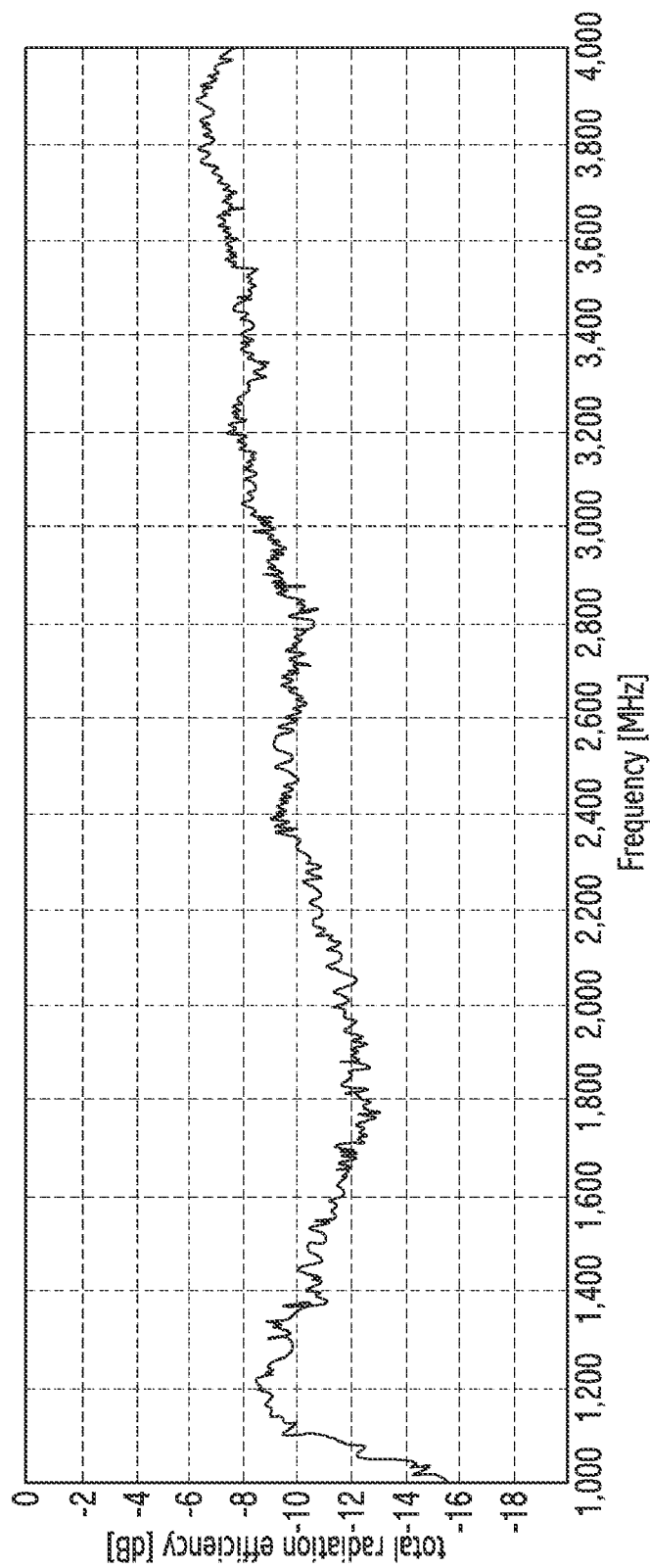
FIG. 7A illustrates a graph showing the antenna gain of a first conductive portion operating as an antenna radiator of an electronic device according to an embodiment of the disclosure.
Figure 7B:
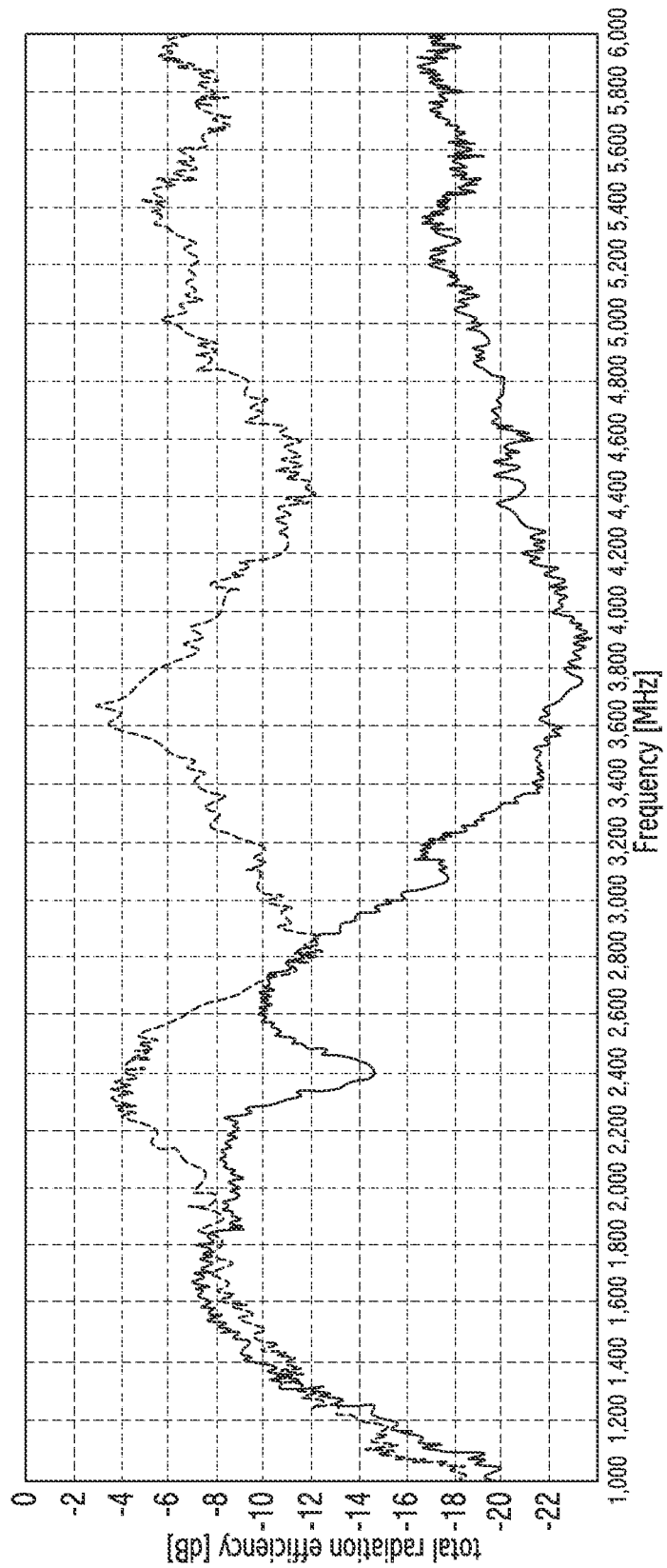
FIG. 7B illustrates a graph showing the antenna gain of a second conductive portion operating as an antenna radiator in an electronic device according to an embodiment of the disclosure.

FIG. 7A illustrates a graph showing an antenna gain of a first conductive portion (e.g., a first conductive portion in FIG. 5A and FIG. 5B, or a first conductive portion in FIG. 6) operating as an antenna radiator of an electronic device (e.g., an electronic device in FIG. 5A and FIG. 5B, or an electronic device in FIG. 6) according to an embodiment of the disclosure. FIG. 7B illustrates a graph showing an antenna gain of a second conductive portion operating as an antenna radiator (e.g., a second conductive portion in FIG. 5A and FIG. 5B, or a second conductive portion in FIG. 6) in an electronic device (e.g., an electronic device in FIG. 5A and FIG. 5B) according to an embodiment of the disclosure.

Figure 8:
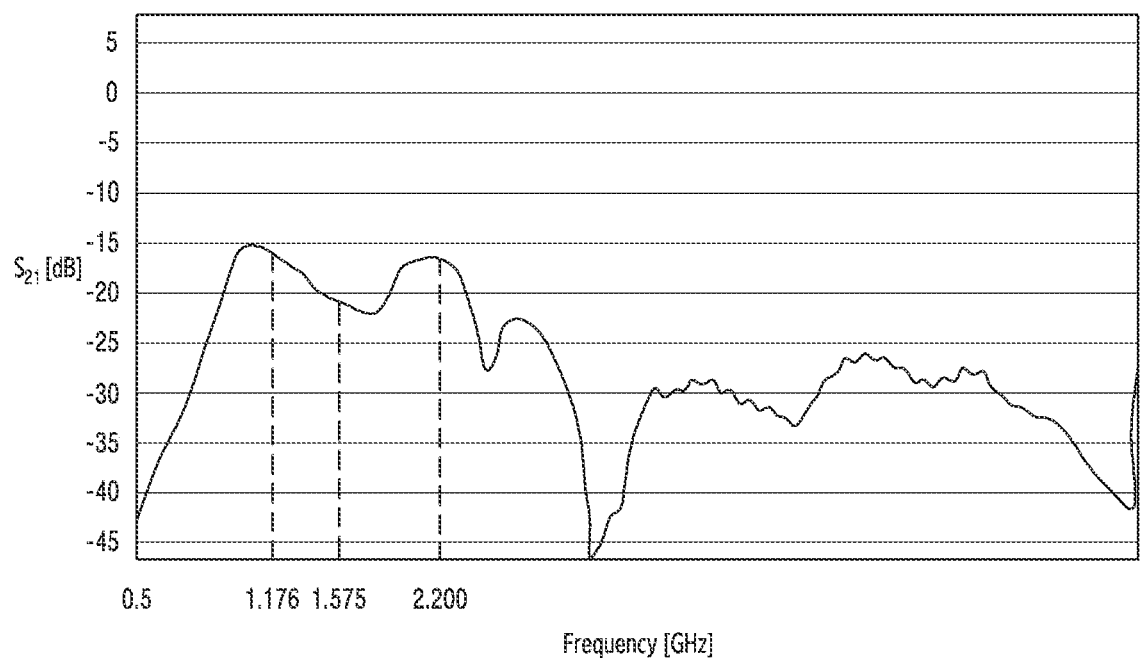
FIG. 8 illustrates a graph showing a transmission coefficient $S_{21}$ between a first conductive portion and a second conductive portion operating as an antenna radiator of an electronic device according to an embodiment of the disclosure.

FIG. 8 illustrates a graph showing a transmission coefficient between a first conductive portion and a second conductive portion of an electronic device according to an embodiment of the disclosure.

According to an embodiment of the disclosure, the dotted line in FIG. 7B shows the antenna gain when a region (e.g., the region $L_1$ in FIG. 5A or FIG. 6) of the second conductive portion operates as a loop antenna for transmitting or receiving an RF signal, and the solid line in FIG. 7B shows the antenna gain when a region (e.g., the region $L_2$ in FIG.

5A or FIG. 6) of the second conductive portion operates as a loop antenna for transmitting or receiving an RF signal.

According to an embodiment, as a first conductive portion (e.g., the first conductive portion 520a in FIG. 5A or FIG. 5B, or the first conductive portion 620a in FIG. 6) of an electronic device (e.g., the electronic device 500 in FIG. 5A or FIG. 5B) is fed from a wireless communication circuit (e.g., the first wireless communication circuit 640 in FIG. 5A and the wireless communication circuit 840 in FIG. 6) at a first point (e.g., the first point $P_1$ in FIG. 5A or FIG. 6), and is grounded to a ground of the printed circuit board (e.g., the first printed circuit board 610 in FIG. 5A or FIG. 6) at a second point (e.g., the second point $P_2$ in FIG. 5A or FIG. 6), the first conductive portion may operate as an inverted-F antenna for transmitting or receiving an RF signal.

Referring to FIG. 7A, the first conductive portion, which operates as an antenna radiator, may have an antenna gain of about −10 dB or more in the frequency band between about 1.17 GHz (about 1,170 megahertz (MHz)) and about 1.2 GHz (about 1,200 MHz), and may have an antenna gain of −12 dB or more in a frequency band of about 1.8 GHz (about 1,800 MHz) or more.

In an example, transmission and/or reception of an RF signal can be performed efficiently in the frequency band in which the antenna gain is about −12 dB or more. Referring to FIG. 7A, since a first conductive portion according to an embodiment has an antenna gain of about −12 dB or more in a frequency band of about 1.17 GHz to about 1.2 GHz and/or about 1.8 GHz or more, it may be identified that the first conductive portion can operate as an inverted-F antenna for transmitting and/or receiving an RF signal in a GPS L5 (e.g., 1.176 GHz) frequency band, a middle band (MB) (e.g., 1.7 to 2.2 GHz) frequency band, or a high band (HB) (e.g., 2.2 to 2.7 GHz) frequency band.

According to an embodiment, a second conductive portion (e.g., the second conductive portion 520b in FIG. 5A or FIG. 5B, or the second conductive portion 620b in FIG. 6), which is adjacent to the first conductive portion of the electronic device, may be fed from a first wireless communication circuit at a third point (e.g., the third point $P_3$ in FIG. 5A) and a fourth point (e.g., the fourth point $P_4$ in FIG. 5A), and may be grounded to a ground of the first printed circuit board at a fifth point (e.g., the fifth point $P_5$ in FIG. 5A) positioned between the third point and the fourth point. Accordingly, each of the region (e.g., the region $L_1$ in FIG. 5A) between the third point and the fifth point of the second conductive portion and the region (e.g., the region $L_2$ in FIG. 5A) between the fourth point and the fifth point may operate as a loop antenna for transmitting or receiving an RF signal.

Referring to FIG. 7B, since the region between the third point and the fifth point of the second conductive portion has an antenna gain of about −10 dB or more in about 1.4 GHz (about 1,400 MHz) to about 2.2 GHz (about 2,200 MHz) frequency band, it may be identified that the region between the third point and the fifth point of the second conductive portion can operate as a loop antenna for transmitting and/or receiving an RF signal in a GPS L1 frequency band (e.g., 1.575 GHz).

As another example, the region between the fourth point and the fifth point of the second conductive portion has an antenna gain of about −8 dB or more in a frequency band of about 1.8 GHz (about 1,800 MHz) to about 2.7 GHz (about 2,700 MHz) and/or in a frequency band of about 4.9 GHz (about 4,900 MHz) or more, it may be identified that the region between the fourth point and the fifth point of the second conductive portion can operate as a loop antenna for transmitting and/or receiving an RF signal in a Wi-Fi frequency band (e.g., 2.4 GHz or 5 GHz).

Referring to FIG. 8, since a first conductive portion and a second conductive portion, which operate as antenna radiators in different frequency bands, have a transmission coefficient $S_{21}$ of about −15 dB or less in a frequency band of about 0.5 GHz or more, it may be identified that the isolation between the first conductive portion and the second conductive portion, which are arranged in a region adjacent thereto, is effectively preformed.

Figure 9A:
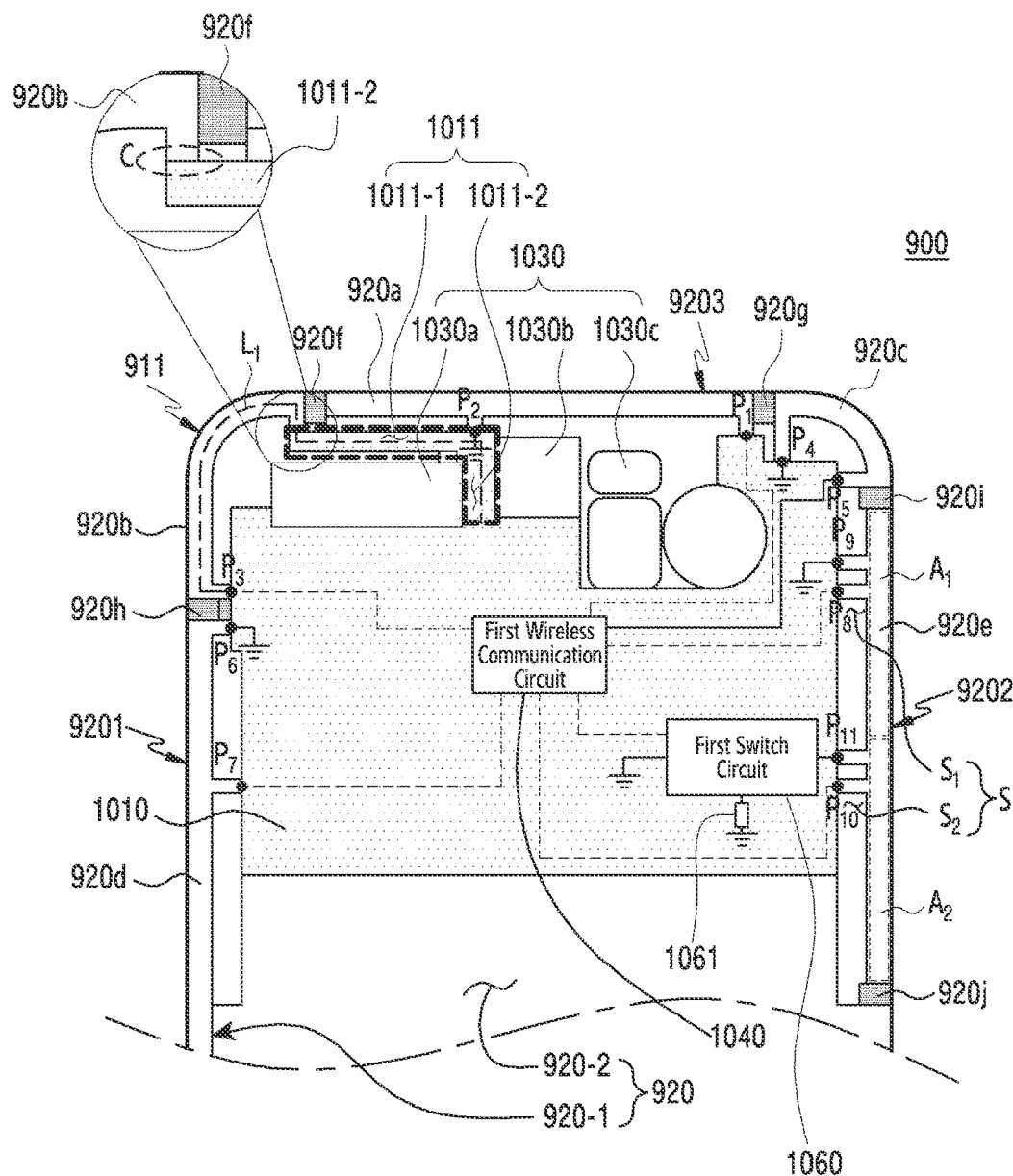
FIG. 9A is a view showing an antenna arrangement structure inside a first housing of an electronic device according to an embodiment of the disclosure.
Figure 9B:
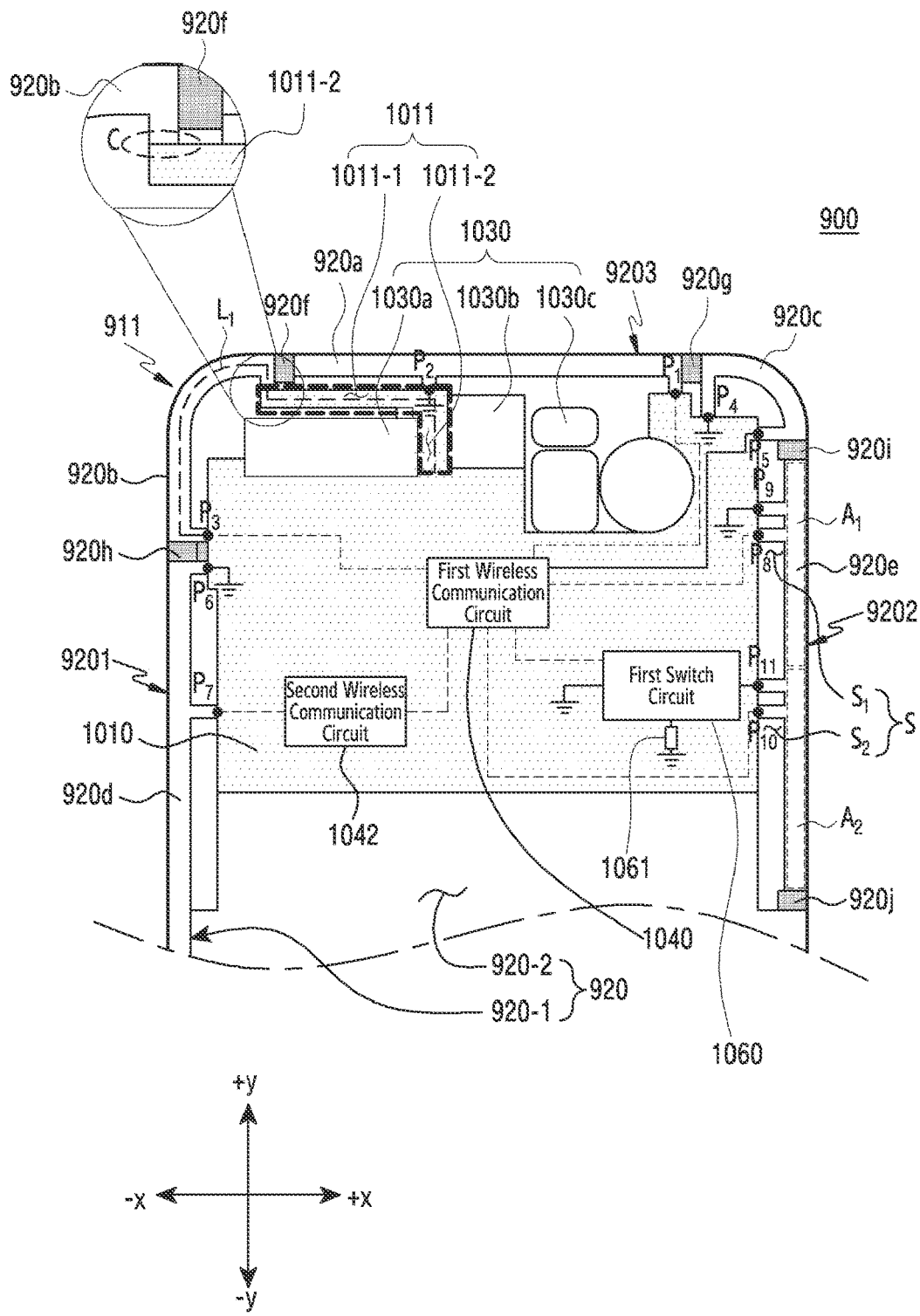
FIG. 9B is a view showing an antenna arrangement structure inside a first housing of an electronic device according to an embodiment of the disclosure.

FIG. 9A is a view showing an antenna arrangement structure inside a first housing of an electronic device according to an embodiment of the disclosure. FIG. 9B is a view showing an antenna arrangement structure inside a first housing of an electronic device according to an embodiment of the disclosure. FIG. 9A is a view showing elements arranged on one surface (e.g., the inside in the −z-direction in FIG. 2A) of a first lateral member 920 disposed inside a first housing 911 of an electronic device 900 according to another embodiment. An antenna arrangement structure in FIG. 9A and/or FIG. 9B may be applied to the electronic device 200 in FIG. 2A and FIG. 2B and/or the electronic device 400 in FIG. 4.

Referring to FIGS. 9A and 9B, an electronic device 900 (e.g., the electronic device 200 in FIG. 2A and/or the electronic device 400 in FIG. 4) according to an embodiment may include a first housing 911 (e.g., the first housing 211 in FIG. 2A and FIG. 4), a first lateral member 920 (e.g., the first lateral member 220 in FIG. 2A), a first printed circuit board 1010, at least one electronic component 1030, and/or a first wireless communication circuit 1040 (e.g., the wireless communication module 192 in FIG. 1). At least one of elements of the electronic device 900 according to an embodiment may be the same as or similar to at least one of the elements of the electronic device 101 in FIG. 1 and/or the electronic device 200 in FIG. 2A, and/or the electronic device 400 in FIG. 4, and thus, hereinafter, overlapping descriptions thereof will be omitted.

According to an embodiment, the first lateral member 920 may be included in the first housing 911, and may include a first structure 920-1 (e.g., the first structure 220-1 in FIG. 2A) forming at least one side surface of the electronic device 900, and/or a second structure 920-2 (e.g., the second structure 220-2 in FIG. 2A) forming a space in which elements included in the electronic device 900 may be arranged.

In an example, the first structure 920-1 of the first lateral member 920 may form a first side surface 9201 which extends along a first direction (e.g., the +y-direction in FIG. 9A) and is positioned in the left side (e.g., the −x-direction in FIG. 5A) of the electronic device 900 and/or the first housing 911, a second side surface 9202 which is parallel to the first side surface 9201 and positioned in the right side (e.g., the +x-direction in FIG. 9A) of the electronic device 900 and/or the first housing 911, and/or a third side surface 9203 which extends along a second direction (e.g., the +x-direction in FIG. 9A) perpendicular to the first direction and connects one end of the first side surface 9201 and one end of the second side surface 9202.

According to an embodiment, the first structure 920-1 of the first lateral member 920 may include multiple conductive portions and multiple non-conductive portions arranged between the multiple conductive portions. In an example, the first structure 920-1 of the first lateral member 920 may include a first conductive portion 920a (e.g., the first conductive portion 220a in FIG. 2A) disposed on the third side surface 9203, a second conductive portion 920b (e.g., the second conductive portion 220b in FIG. 2A) which is adjacent to one end (e.g., the one end in the +x-direction in FIG. 2A, or the one end in the −x-direction in FIG. 5A) of the first conductive portion 920a and disposed on the first side surface 9201 and the third side surface 9203, and/or a third conductive portion 920c (e.g., the third conductive portion 220c in FIG. 3) which is adjacent to the other end (e.g., the one end in the −x-direction in FIG. 2A, or the one end in the +x-direction in FIG. 5A) of the first conductive portion 920a and disposed on the second side surface 9202 and the third side surface 9203. As another example, the first structure 920-1 may further include a fourth conductive portion 920d (e.g., the fourth conductive portion 220d in FIG. 2A) which is adjacent to the second conductive portion 920b and disposed on the first side surface 9201, and/or a fifth conductive portion 920e (e.g., the fifth conductive portion 220e in FIG. 2A) which is adjacent to the third conductive portion 920c and disposed on the second side surface 9202.

In an example, the first structure 920-1 may include a first non-conductive portion 920f (e.g., the first non-conductive portion 220f in FIG. 2A) disposed between the first conductive portion 920a and the second conductive portion 920b so as to insulate the first conductive portion 920a and the second conductive portion 920b, a second non-conductive portion 920g (e.g., the second non-conductive portion 220g in FIG. 2A) disposed between the first conductive portion 920a and the third conductive portion 920c so as to insulate the first conductive portion 920a and the third conductive portion 920c, and/or a third non-conductive portion 920h (e.g., the third non-conductive portion 220h in FIG. 2A) disposed between the second conductive portion 920b and the fourth conductive portion 920d so as to insulate the second conductive portion 920b and the fourth conductive portion 920d. As another example, the first structure 920-1 may further include a fourth non-conductive portion 920i (e.g., the fourth non-conductive portion 220i in FIG. 2A) positioned between the third conductive portion 920c and one end of the fifth conductive portion 920e so as to insulate the third conductive portion 920c and the fifth conductive portion 920e, and/or a fifth non-conductive portion 920j (e.g., the fifth non-conductive portion 220j in FIG. 2A) positioned at the other end of the fifth conductive portion 920e. According to an embodiment, the first structure 920-1 of the first lateral member 920 may be segmented into five regions by the first non-conductive portion 920f, the second non-conductive portion 920g, the third non-conductive portion 920h, the fourth non-conductive portion 920i, and/or the fifth non-conductive portion 920j.

According to an embodiment, the first printed circuit board 1010 and/or the at least one electronic component 1030 may be disposed on at least one surface (e.g., the surface in the −z-direction in FIG. 2A) of the second structure 920-2 of the first lateral member 920. As another example, the second structure 920-2 may support the first printed circuit board 1010 and/or the at least one electronic component 1030. For example, the at least one electronic component 1030 may include a front camera 1030a, a rear camera 1030b, and/or an audio module 1030c.

According to an embodiment, a processor (e.g., the processor 120 in FIG. 1), a memory (e.g., the memory 130 in FIG. 1), an interface (e.g., the interface 177 in FIG. 1), and/or the first wireless communication circuit 1040 may be arranged on the first printed circuit board 1010. In an example, the processor may include at least one of a central processing device, an application processor, a graphic processing device, an image signal processor, a sensor hub processor, and a communication processor. In an example, the memory may include a volatile memory or a non-volatile memory. In an example, the interface may include a high-definition multimedia interface (HDMI) and/or an audio interface. In an example, the first printed circuit board 1010 may include a ground (not shown). In an embodiment, the first conductive portion 920a, the second conductive portion 920b, the third conductive portion 920c, the fourth conductive portion 920d, and/or the fifth conductive portion 920e of the first lateral member 920 may be grounded to the ground of the first printed circuit board 1010.

According to an embodiment, the first printed circuit board 1010 may include a first region 1011 adjacent to the first conductive portion 920a and/or the second conductive portion 920b of the first lateral member 920. In an example, the first region 1011 may be formed in a letter "]" shape (or a letter "L" shape). In an embodiment, the first region 1011 may include a first portion 1011-1 or a second portion 1011-2. For example, the first region 1011 may include the first portion 1011-1 substantially parallel to third side surface 9203 or the first conductive portion 920a of the electronic device 900, and the second portion 1011-2 substantially perpendicular to the first portion 1011-1 and substantially parallel to the first side surface 9201 or the second side surface 9202 of electronic device 900. According to an embodiment, one end (e.g., the one end in the −x-direction in FIG. 9A) of the first portion 1011-1 of the first region 1011 may be connected to a point (e.g., the third point $P_3$ in FIG. 5A) of the second conductive portion 920b, which is adjacent to the first conductive portion 920a. In an embodiment, the first region 1011 may be a region to which the ground included in the first printed circuit board 1010 is extended. The above-described ground (hereinafter, a "conductive layer") may operate as a conductor.

In an example, the first region 1011 may be a region formed as a region of the first printed circuit board 1010 is trimmed in order to secure a space in which at least one electronic component 1030 of the electronic device 900 is disposed. The shape of the first region 1011 may not be limited to the above-mentioned letter "]" shape or letter "L" shape, and if the first region 1011 can operate as an antenna radiator, the shape of the first region 1011 may be variously changed. For example, when the first region 1011 has an elongated region capable of operating as an antenna radiator, the shape of the first region 1011 may be changed into various shapes in addition to the letter "]" shape or the letter "L" shape.

According to an embodiment (e.g., see FIG. 9A), the first wireless communication circuit 1040 may be electrically connected to the first conductive portion 920a, the second conductive portion 920b, the third conductive portion 920c, the fourth conductive portion 920d, and/or the fifth conductive portion 920e through an electrical connecting means (e.g., a signal wire, a coaxial cable, or an FPCB). In an example, the first conductive portion 920a, the second conductive portion 920b, the third conductive portion 920c, the fourth conductive portion 920d, and/or the fifth conductive portion 920e may be electrically connected to the first wireless communication circuit 1040 and accordingly, may operate as an antenna radiator for transmitting or receiving an RF signal in a designated frequency band. In an example, the first wireless communication circuit 1040 may feed an RF signal to the first conductive portion 920a, the second conductive portion 920b, the third conductive portion 920c, the fourth conductive portion 920d, and/or the fifth conductive portion 920e. In another example, the first wireless communication circuit 1040 may also receive an RF signal from the first conductive portion 920a, the second conductive portion 920b, the third conductive portion 920c, the fourth conductive portion 920d, and/or the fifth conductive portion 920e.

Referring to FIG. 9B, according to another embodiment, the electronic device 900 may further include a second wireless communication circuit 1042 (e.g., the second wireless communication circuit 642 in FIG. 5B) disposed on the first printed circuit board 1010. According to another embodiment, the electronic device 900 may further include at least one wireless communication circuit (e.g., the third wireless communication circuit 644 in FIG. 5B) in addition to the second wireless communication circuit 1042.

According to an embodiment, the second wireless communication circuit 642 may be electrically connected to the first wireless communication circuit 1040. In an example, the second wireless communication circuit 1042 may transmit or feed an RF signal to at least one conductive portion of the first conductive portion 920a, the second conductive portion 920b, the third conductive portion 920c, the fourth conductive portion 920d, and/or the fifth conductive portion 920e, which operates as an antenna radiator through a switch circuit (not shown) and/or a distribution circuit (not shown). For example, the second wireless communication circuit 1042 may transmit or feed an RF signal in a Wi-Fi frequency band (e.g., 2.4 GHz and/or 5 GHz) to the above-described conductive portion. In an example, the second wireless communication circuit 1042 may transmit or feed an RF signal to at least one conductive portion of the first conductive portion 920a, the second conductive portion 920b, the third conductive portion 920c, the fourth conductive portion 920d, and/or the fifth conductive portion 920e through the first wireless communication circuit 640. In another example (see FIG. 9B), the second wireless communication circuit 1042 may directly transmit or feed an RF signal to at least one conductive portion of the first conductive portion 920a, the second conductive portion 920b, the third conductive portion 920c, the fourth conductive portion 920d, and/or the fifth conductive portion 920e. According to an embodiment, the number of wireless communication circuits of the electronic device 900 and/or an electrical connection relation of the wireless communication circuits may not be limited to the above-described embodiment, and according to an embodiment, the electronic device 900 may include multiple wireless communication circuits (e.g., two, three, or four), or the method, in which an RF signal is transmitted to the above-described conductive portions, may be changed.

In an example, the first conductive portion 920a may be electrically connected to the first wireless communication circuit 1040 at the first point $P_1$ which is positioned at the first conductive portion 920a (e.g., the one end in the +x-direction in FIG. 9A) and adjacent to the third conductive portion 920c. In another example, the first conductive portion 920a may be electrically connected to a ground of the first printed circuit board 1010 at the second point $P_2$ spaced apart from the first point $P_1$ in the −x-axis direction. For example, the first conductive portion 920a may be electrically connected to the ground positioned in the first region 1011 of the first printed circuit board 1010. For example, the first conductive portion 920a may be fed from the first wireless communication circuit 1040 at the first point $P_1$, and may be grounded to the ground of the first printed circuit board 1010 at the second point $P_2$. For example, through the above-described electrical connection relation, the first conductive portion 920a may operate as an inverted-F antenna (IFA) for transmitting and/or receiving an RF signal in a first frequency band, a second frequency band, and/or a third frequency band. In an example, the first frequency band may be a GPS L5 (e.g., about 1.176 GHz) band. In another example, the second frequency band may be a middle band (MB) (e.g., about 1.7 to 2.2 GHz) frequency band. In another example, the third frequency band may be a high band (HB) (e.g., about 2.2 to 2.7 GHz) frequency band.

In an example, the second conductive portion 920b may be electrically connected to the first region 1011 of the first printed circuit board 1010. For example, the second conductive portion 920b may be connected to the first portion 1011-1 (e.g., the one end in the −x-direction in FIG. 9A) of the first region 1011 in a region (e.g., the region C in FIG. 9A) adjacent to the first conductive portion 920a. As the second conductive portion 920b and the first region 1011 of the first printed circuit board 1010 are connected, the electrical path $L_1$ may be formed between the second conductive portion 920b and the first region 1011 of the first printed circuit board 1010. For example, the first region 1011 of the first printed circuit board 1010 may be formed to have a designated length, and thus a conductive layer disposed in the first region 1011 may operate as at least a part of an antenna radiator. The above-described conductive layer of the first region 1011 may be electrically connected to a ground of the first printed circuit board 1010, and as the result, the electrical path $L_1$ may be formed between the second conductive portion 920b and the first region 1011 of the first printed circuit board 1010. In an embodiment, the designated length of the first region 1011 may be determined based on a frequency of a signal to be transmitted and/or received.

In an example, the second conductive portion 920b may be electrically connected to the first wireless communication circuit 1040 at the third point $P_3$ which is positioned at the second conductive portion 920b (e.g., the one end in the −y-direction in FIG. 9A) and adjacent to the fourth conductive portion 920d. For example, the second conductive portion 920b may be fed from the first wireless communication circuit 1040 at the third point $P_3$, and the fed RF signal may be transmitted to the first region 1011 of the first printed circuit board 1010 along the electrical path $L_1$. For example, the second conductive portion 920b and the first region 1011 of the first printed circuit board 1010, which is connected to the second conductive portion 920b, may operate as a loop antenna for transmitting or receiving an RF signal of a designated frequency band.

For example, since a loop antenna has a maximum radiation characteristic in one-wavelength (λ) length, as the length of an antenna radiator operating as a loop antenna increases, antenna performance (e.g., radiation performance) can be improved. The electronic device 900 according to an embodiment may use not only the second conductive portion 920b of the first lateral member 920 but also the first region 1011 of the first printed circuit board 1010 as an antenna radiator so as to increase the length of the antenna radiator. Accordingly, radiation performance of the second conductive portion 920b and the first region 1011 of the first printed circuit board 1010 connected to the second conductive portion 920b, which operate as a loop antenna, can be improved. For example, the second conductive portion 920b and the first region 1011 of the first printed circuit board 1010 may operate as a loop antenna covering a wide band. In an example, the second conductive portion 920b and the first region 1011 of the first printed circuit board 1010 may operate as a wideband loop antenna for transmitting or receiving an RF signal in a second frequency band, a third frequency band, a fourth frequency band, and/or a fifth frequency band. In an example, the second frequency band may be a middle band (MB) (e.g., about 1.7 to about 2.2 GHz) frequency band. In another example, the third frequency band may be a high band (HB) (e.g., about 2.2 to about 2.7 GHz) frequency band. In another example, the fourth frequency band may be a GPS L1 (e.g., about 1.575 GHz) band. In another example, the fifth frequency band may be a Wi-Fi (e.g., about 2.4 GHz and/or about 5 GHz) band. According to an embodiment, through the above-described structure, the electronic device 900 may allow the length of an antenna radiator operating as a loop antenna to be lengthened without increasing the size of the form factor of the electronic device 900.

According to an embodiment, differently from the electronic device 500 in FIG. 5A, in which an RF signal is fed at a point of the second conductive portion 920b, which is adjacent to the first conductive portion 920a, the electronic device 900 may be configured such that an RF signal is fed at a point of the second conductive portion 920b, which is adjacent to the fourth conductive portion 920d, and thus interference generated between the first conductive portion 920a and the second conductive portion 920b can be reduced. The electronic device 900 according to an embodiment may be configured such that feeding is performed at a point of the second conductive portion 920b, which is separated from the first conductive portion 920a, and thus isolation between the first conductive portion 920a and the second conductive portion 920b, which are adjacent to each other, can be improved.

In an example, the third conductive portion 920c may be electrically connected to a ground of the first printed circuit board 1010 at the fourth point $P_4$ which is positioned at the third conductive portion 920c to be adjacent to the first conductive portion 920a. In another example, the third conductive portion 920c may be electrically connected to the first wireless communication circuit 1040 at the fifth $P_5$ which is positioned at the third conductive portion 920c to be closer to the fifth conductive portion 920e than the first conductive portion 920a. For example, the third conductive portion 920c may be grounded to the ground of the first printed circuit board 1010 at the fourth point $P_4$, and may be fed from the first wireless communication circuit 1040 at the fifth point $P_5$. The third conductive portion 920c according to an embodiment may operate as an inverted-F antenna for transmitting or receiving an RF signal in a second frequency band through the above-described electrical connection relation. In an example, the second frequency band may be a middle band (MB) (e.g., about 1.7 to about 2.2 GHz) frequency band.

In an example (e.g., FIG. 9A), the fourth conductive portion 920d may be electrically connected to a ground of the first printed circuit board 1010 at the sixth point $P_6$ which is positioned at the fourth conductive portion 920d and adjacent to the second conductive portion 920b. In another example, the fourth conductive portion 920d may be electrically connected to the first wireless communication circuit 1040 at the seventh point $P_7$ spaced apart from the sixth point $P_6$ in the −y-axis direction. For example, the fourth conductive portion 920d may be grounded to the ground of the first printed circuit board 1010 at the sixth point $P_6$, and may be fed from the first wireless communication circuit 1040 at the seventh point $P_7$. The fourth conductive portion 920d according to an embodiment may operate as an inverted-F antenna for transmitting or receiving an RF signal in a fifth frequency band through the above-described electrical connection relation. In an example, the fifth frequency band may be a Wi-Fi (e.g., about 2.4 and/or about 5 GHz) band.

According to another embodiment (e.g., FIG. 9B), the fourth conductive portion 920d may be electrically connected to a ground of the first printed circuit board 1010 at the sixth point $P_6$ which is positioned at the fourth conductive portion 920d and adjacent to the second conductive portion 920b. In another example, the fourth conductive portion 920d may be electrically connected to the second wireless communication circuit 1042 at the seventh point $P_7$ spaced apart from the sixth point $P_6$ in the −y-axis direction. According to another embodiment, the fourth conductive portion 920d may be grounded to the ground of the first printed circuit board 1010 at the sixth point $P_6$, and may be fed from the second wireless communication circuit 1042 at the seventh point $P_7$.

According to an embodiment, the fifth conductive portion 920e may include a first portion $A_1$ which is adjacent to the third conductive portion 920c and has a first length, and a second portion $A_2$ which is adjacent to the first portion $A_1$ and has a second length. As an example, the second length may be longer than the first length, but it may be not limited thereto. According to an embodiment, a slot (e.g., the slot S in FIG. 5A) may be formed in the second structure 920-2 of the first lateral member 920, which is adjacent to the fifth conductive portion 920e. In an example, the slot S may include a first slot region $S_1$ adjacent to the first slot region $S_1$ of the fifth conductive portion 920e, and/or a second slot region $S_2$ adjacent to the second portion $A_2$ of the fifth conductive portion 920e. In an example, the first slot region $S_1$ may mean a region between the ninth point $P_9$ and the eleventh point $P_{11}$. In another example, the second slot region $S_2$ may mean a region between the eleventh point $P_{11}$ and the fifth non-conductive portion 920j.

In an example, the first portion $A_1$ of the fifth conductive portion 920e, which is adjacent to the first slot region $S_1$ of the slot S, may be electrically connected to the first wireless communication circuit 1040 at the eighth point $P_8$, and may be electrically connected to a ground of the first printed circuit board 1010 at the ninth point $P_9$ positioned between the eighth point $P_8$ and the fourth non-conductive portion 920i. For example, the first portion $A_1$ may be fed from the first wireless communication circuit 1040 at the eighth point $P_8$, and may be grounded to the ground of the first printed circuit board 1010 at the ninth point $P_9$. For example, as the first portion $A_1$ of the fifth conductive portion 920e is fed at the eighth point $P_8$ and grounded at the ninth point $P_9$, and the first slot region $S_1$, which is adjacent to the first portion $A_1$ of the fifth conductive portion 920e, may operate as a slot antenna. For example, the first slot region $S_1$ may operate as a slot antenna for transmitting or receiving an RF signal in a seventh frequency band. In an example, the seventh frequency band may be an ultra-high band (UHB) (e.g., about 3.55 to about 3.7 GHz).

In an example, the second portion $A_2$ of the fifth conductive portion 920e, which is adjacent to the second slot region $S_2$ of the slot S, may be electrically connected to the first wireless communication circuit 1040 at the tenth point $P_{10}$, and may be electrically connected to a first switch circuit 1060 at the eleventh point $P_{11}$ positioned between the tenth point $P_{10}$ and the eighth point $P_8$. In an embodiment, the first switch circuit 1060 may selectively connect the second portion $A_2$ of the fifth conductive portion 920e to a first passive element 1061 or a ground of the first printed circuit board 1010. For example, the first passive element 1061 may include an inductor and/or a capacitor, but it is not limited thereto. In an example, when the first switch circuit 1060 is in the first electrical connection state, the second portion $A_2$ may be electrically connected to the ground of the first printed circuit board 1010 through the first passive element 1061. In another example, when the first switch circuit 1060 is in the second electrical connection state, the second portion $A_2$ may be electrically connected to the ground of the first printed circuit board 1010 without passing through the first passive element 1061. For example, the second portion $A_2$ of the fifth conductive portion 920e may be fed from the first wireless communication circuit 1040 at the tenth point $P_{10}$, and may be grounded to the ground of the first printed circuit board 1010 at the eleventh point $P_{11}$. In an example, the first switch circuit 1060 may be electrically connected to a processor (e.g., the processor 120 in FIG. 1), and the processor may change an electrical connection state of the first switch circuit 1060. In another example, the first switch circuit 1060 may be electrically connected to the first wireless communication circuit 1040, and the first wireless communication circuit 1040 may change an electrical connection state of the first switch circuit 1060 according to an operation of the electronic device 900.

In an example, according to an electrical connection state of the first switch circuit 1060, the first slot region $S_1$ may be expanded from a region between the ninth point $P_9$ and the eleventh point $P_{11}$ to a region from the ninth point $P_9$ to the fifth non-conductive portion 920j. For example, when the first switch circuit 1060 is in the second electrical connection state, the first slot region $S_1$ may be expanded to a region from the ninth point $P_9$ to the fifth non-conductive portion 920j. According to an embodiment, as the second portion $A_2$ of the fifth conductive portion 920e is fed at the tenth point $P_{10}$, and grounded at the eleventh point $P_{11}$, the second slot region $S_2$, which is adjacent to the second portion $A_2$ of the fifth conductive portion 920e, may operate as a slot antenna. For example, the second slot region $S_2$ may operate as a slot antenna for transmitting or receiving an RF signal in a third frequency band and/or a sixth frequency band. In an example, the third frequency band may be a high band (HB) (e.g., about 2.2 to about 2.7 GHz) frequency band. In another example, the sixth frequency band may be a low band (LB) (e.g., about 0.6 to about 1 GHz) frequency band. For example, the second slot region $S_2$ may operate as a slot antenna for transmitting or receiving an RF signal in the sixth frequency band (e.g., a low band (LB)) when the first switch circuit 1060 is in the first electrical connection state, and may operate as a slot antenna for transmitting or receiving an RF signal of the third frequency band (e.g., a high band (HB)) when the first switch circuit 1060 is in the second electrical connection state. In another example, the second slot region $S_2$ may also operate as a slot antenna for transmitting or receiving an RF signal in the third frequency band when the first switch circuit 1060 is in the first electrical connection state, and may also operate as a slot antenna for transmitting or receiving an RF signal of the sixth frequency band when the first switch circuit 1060 is in the second electrical connection state.

The electronic device 900 according to an embodiment may transmit and/or receive an RF signal in various frequency bands through the first conductive portion 920a, the third conductive portion 920c, and the fourth conductive portion 920d which operate as an inverted-F antenna, the second conductive portion 920b and the first region 1011 of the first printed circuit board 1010 which operate as a loop antenna, and/or the slot S of the first lateral member 920 operating as a slot antenna.

According to an embodiment, a protrusion (e.g., a flange), which extends from the first lateral member 920, may be formed in at least a part of the first point $P_1$ to the eleventh point $P_{11}$ (or $P_1$ to $P_{11}$). For example, the protrusion may be formed in a direction toward the inside of the first housing 911. In an example, the first conductive portion 920a, the second conductive portion 920b, the third conductive portion 920c, the fourth conductive portion 920d, and/or the fifth conductive portion 920e may be electrically connected to the ground of the first wireless communication circuit 1040 and/or the first printed circuit board 1010 through the above-described protrusion. In an example, the first conductive portion 920a, the second conductive portion 920b, the third conductive portion 920c, the fourth conductive portion 920d, and/or the fifth conductive portion 920e may be electrically connected to the first printed circuit board 1010 through a connecting member (not shown) at the first point $P_1$ to the eleventh point $P_{11}$. For example, the above-described connecting member may be a C-clip, a conductive screw, a conductive foam, or an FPCB, but it is not limited thereto.

Figure 9C:
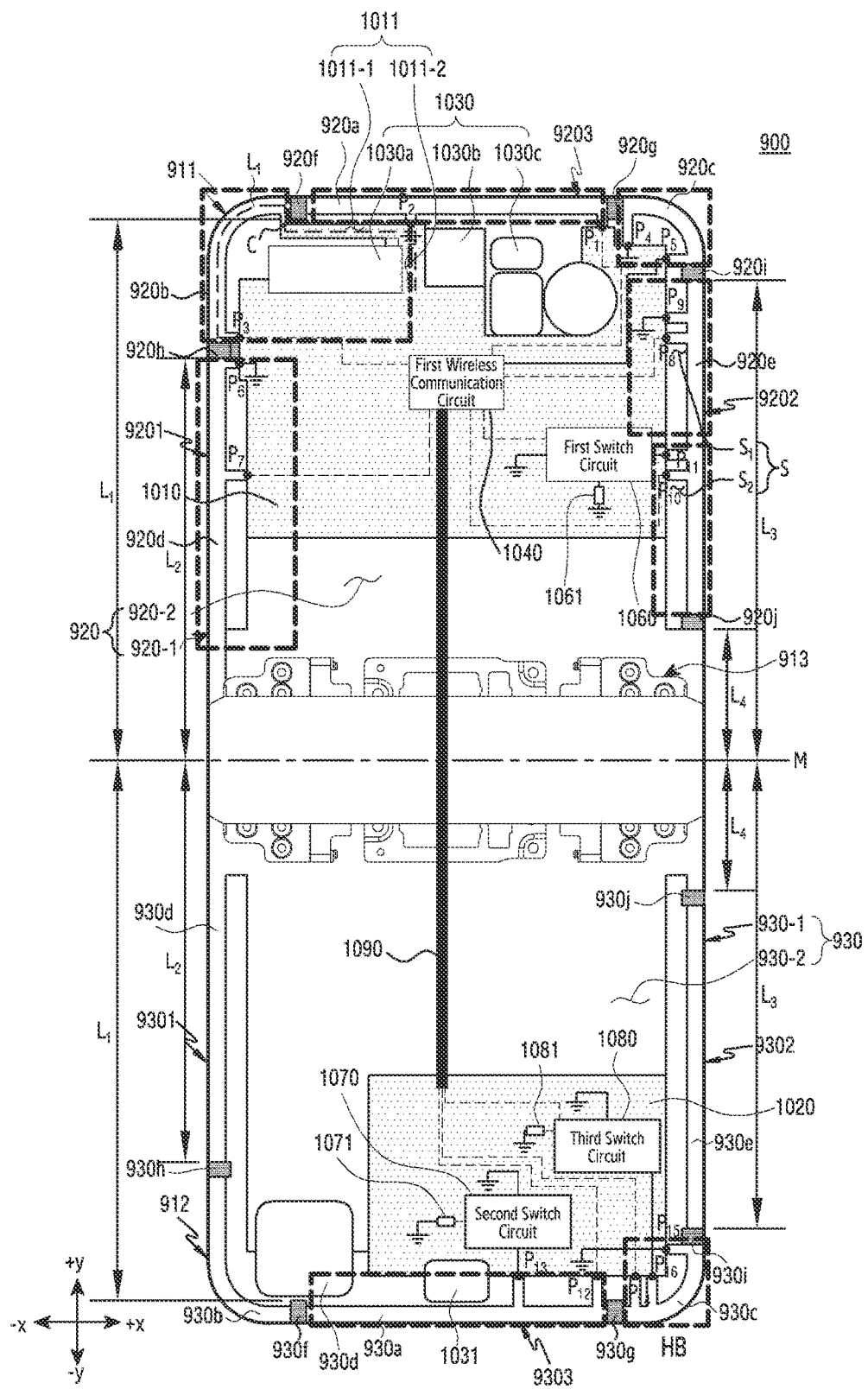
FIG. 9C is a view showing an antenna arrangement structure inside a first housing and a second housing of an electronic device according to an embodiment of the disclosure.

FIG. 9C is a view showing an antenna arrangement structure inside a first housing and a second housing of an electronic device according to an embodiment of the disclosure. FIG. 9C illustrates elements disposed on one surface (e.g., the inside in the −z-direction in FIG. 2A) of the first lateral member 920 and a second lateral member 930 disposed inside the first housing 911 and the second housing 912 when the electronic device 900 is in an unfolded state.

Referring to FIG. 9C, an electronic device 900 (e.g., the electronic device 200 in FIG. 2A or the electronic device 900 in FIG. 9A) according to an embodiment may include a first housing 911 (e.g., the first housing 211 in FIG. 2A or the first housing 911 in FIG. 9A), a second housing 912 (e.g., the second housing 212 in FIG. 2A), a hinge assembly 913 (e.g., the connecting structure 250 in FIG. 2A), a first lateral member 920 (e.g., the first lateral member 220 in FIG. 2A or a first lateral member 920 in FIG. 9A), a second lateral member 930 (e.g., the second lateral member 930 in FIG. 2A), a first printed circuit board 1010 (e.g., the first printed circuit board 1010 in FIG. 9A), a second printed circuit board 1020, at least one electronic component 1030, a first wireless communication circuit 1040 (e.g., the first wireless communication circuit 940 in FIG. 9A), and/or a second wireless communication circuit 1050.

The electronic device 900 according to an embodiment may be an electronic device in which the second housing 912, the hinge assembly 913, the second lateral member 930, the second printed circuit board 1020, and the second wireless communication circuit 1050 are added in the electronic device 900 in FIG. 9A, and hereinafter, overlapping descriptions thereof will be omitted.

According to an embodiment, the second housing 912 may be rotatably coupled to the first housing 911 through the hinge assembly 913, and rotate within a rotation range designated with reference to the first housing 911. In an example, the second housing 912 may be formed to have a substantially symmetrical shape with the first housing 911 with reference to an imaginary center line M crossing the hinge assembly 913. For example, the first housing 911 and the second housing 912 may be formed to have substantially the same size and/or the same shape.

According to an embodiment, the second lateral member 930 may be included in the second housing 912, and may include a third structure 930-1 (e.g., the third structure 230-1 in FIG. 2A) forming at least one side surface of the electronic device 900, and/or a fourth structure 930-2 (e.g., the fourth structure 230-2 in FIG. 2A) forming a space in which elements of the electronic device 900 may be disposed.

In an example, the third structure 930-1 of the second lateral member 930 may include a fourth side surface 9301 extending along a first direction (e.g., the −y-direction in FIG. 9C) and positioned on the left side (e.g., the −x-direction in FIG. 9C) of the second housing 912 and/or the electronic device 900, a fifth side surface 9302 parallel to the fourth side surface 9301 and positioned on the right side (e.g., the +x-direction in FIG. 9C) of the second housing 912 and/or the electronic device 900, and/or a sixth side surface 9303 extending along a second direction (e.g., the +x-direction in FIG. 9C) perpendicular to the first direction and connecting one end of the fourth side surface 9301 and one end of the fifth side surface 9302. For example, the first side surface 9201 (e.g., the first side surface 9201 in FIG. 5A), the second side surface 9202 (e.g., the second side surface 9202 in FIG. 5A), and the third side surface 9203 (e.g., the third side surface 9203 in FIGS. 5A to 5C) of the first lateral member 920, and the fourth side surface 9301, the fifth side surface 9302, and/or the sixth side surface 9303 of the second lateral member 930 may form a side surface of the electronic device 900.

According to an embodiment, the third structure 930-1 of the second lateral member 930 may include multiple conductive portions and/or multiple non-conductive portions disposed between the multiple conductive portions. In an example, the third structure 930-1 may include a sixth conductive portion 930a (e.g., the sixth conductive portion 230a in FIG. 2A) disposed on the sixth side surface 9303, a seventh conductive portion 930b (e.g., the seventh conductive portion 230b in FIG. 2A) adjacent to one end (e.g., the one end in the −x-direction in FIG. 9C) of the sixth conductive portion 930a and disposed on the fourth side surface 9301 and the sixth side surface 9303, or an eighth conductive portion 930c (e.g., the eighth conductive portion 230c in FIG. 2A) adjacent to the other end (e.g., the one end in the +x-direction in FIG. 9C) of the sixth conductive portion 930a and disposed on the fifth side surface 9302 and the sixth side surface 9303. As another example, the third structure 930-1 may further include a ninth conductive portion 930d (e.g., the ninth conductive portion 230d in FIG. 2A) adjacent to the seventh conductive portion 930b and disposed on the fourth side surface 9301, and/or a tenth conductive portion 930e (e.g., the tenth conductive portion 230e in FIG. 2A) adjacent to the eighth conductive portion 930c and disposed on the fifth side surface 9302.

In an example, the third structure 930-1 may include a sixth non-conductive portion 930f (e.g., the sixth non-conductive portion 230f in FIG. 2A) disposed between the sixth conductive portion 930a and the seventh conductive portion 930b to insulate the sixth conductive portion 930a and the seventh conductive portion 930b, a seventh non-conductive portion 930g (e.g., the seventh non-conductive portion 230g in FIG. 2A) disposed between the sixth conductive portion 930a and the eighth conductive portion 930c to insulate the sixth conductive portion 930a and the eighth conductive portion 930c, and/or an eighth non-conductive portion 930h (e.g., the eighth non-conductive portion 230h in FIG. 2A) disposed between the seventh conductive portion 930b and the ninth conductive portion 930d to insulate the seventh conductive portion 930b and the ninth conductive portion 930d. As another example, the third structure 930-1 may further include a ninth non-conductive portion 930i (e.g., the ninth non-conductive portion 230i in FIG. 2A) positioned between the eighth conductive portion 930c and one end of the tenth conductive portion 930e to insulate the eighth conductive portion 930c and the tenth conductive portion 930e, and/or a tenth non-conductive portion 930j (e.g., the tenth non-conductive portion 230j in FIG. 2A) positioned at the other end of the tenth conductive portion 930e. The third structure 930-1 of the second lateral member 930 according to an embodiment may be divided into five regions in the same or similar manner to the first structure 920-1 of the first lateral member 920 by the sixth non-conductive portion 930f, the seventh non-conductive portion 930g, the eighth non-conductive portion 930h, the ninth non-conductive portion 930i, or the tenth non-conductive portion 930j.

In an example, each of the first non-conductive portion 920f and the sixth non-conductive portion 930f may be disposed to be spaced apart by a first length $L_1$ with reference to the imaginary center line M crossing the hinge assembly 913. As another example, each of the second non-conductive portion 920g and the seventh non-conductive portion 930g may be disposed to be spaced apart by the same first length $L_1$ with reference to the imaginary center line M. In another example, each of the third non-conductive portion 920h and the eighth non-conductive portion 930h may be disposed to be spaced apart by a second length $L_2$ with reference to the imaginary center line M. In another example, each of the fourth non-conductive portion 920i and the ninth non-conductive portion 930i may be disposed to be spaced apart by a third length $L_3$ with reference to the imaginary center line M. As another example, each of the fifth non-conductive portion 920j and the tenth non-conductive portion 930j may be disposed to be spaced apart by a fourth length $L_4$ with reference to the imaginary center line M.

According to an embodiment, by the above-described arrangement structure, when the electronic device 900 is in a folded state (e.g., see FIG. 2B), the first conductive portion 920a of the first lateral member 920 may be disposed to overlap the sixth conductive portion 930a of the second lateral member 930 when viewed from the top of the +z-axis in FIG. 2B, and the second conductive portion 920b of the first lateral member 920 may be disposed to overlap the seventh conductive portion 930b of the second lateral member 930. As another example, when the electronic device 900 is in a folded state, the third conductive portion 920c of the first lateral member 920 may be disposed to overlap the eighth conductive portion 930c of the second lateral member 930 when viewed from the top of the +z-axis in FIG. 2B, the fourth conductive portion 920d of the first lateral member 920 may be disposed to overlap the ninth conductive portion 930d of the second lateral member 930, and the fifth conductive portion 920e of the first lateral member 920 may be disposed to overlap the tenth conductive portion 930e of the second lateral member 930.

According to an embodiment, the second printed circuit board 1020 and/or the at least one electronic component 1030 may be disposed on at least one surface (e.g., a surface in the −z-direction in FIG. 2A) of the fourth structure 930-2 of the second lateral member 930. As another example, the fourth structure 930-2 may support the second printed circuit board 1020 and/or the at least one electronic component 1030. For example, the at least one electronic component 1030 may include an audio module 1030d.

According to an embodiment, an interface 1031 (e.g., the interface 277 in FIGS. 2A and 2B) may be disposed on the second printed circuit board 1020. In an example, the interface 1031 may include a universal serial bus (USB) interface or an audio interface. In another example, the second printed circuit board 1020 may be electrically connected to the first printed circuit board 1010 disposed on the first lateral member 920 through an electrical connecting means (e.g., a FPCB).

In an example, the second printed circuit board 1020 may include a ground (not shown). The sixth conductive portion 930*a* and the eighth conductive portion 930*c* of the second lateral member 930 may be grounded to the ground of the second printed circuit board 1020.

According to an embodiment, the second printed circuit board 1020 may be electrically connected to the first wireless communication circuit 1040 disposed on the first printed circuit board 1010 through an electrical connecting member 1090. In an example, the electrical connecting member 1090 may electrically connect the first wireless communication circuit 1040 and the second printed circuit board 1020 across at least one region of the first lateral member 920, a hinge assembly 913, and/or at least one region of the second lateral member 930. In another example, the electrical connecting member 1090 may be formed of a material having a soft (or "flexible") characteristic, so that at least one region of the electrical connecting member 1090 may be bent in an operation in which the electronic device 900 rotates from a folded state to an unfolded state or rotates from the unfolded state to the folded state. The electrical connecting member 1090 may be, for example, at least one of a signal wire, a coaxial cable, and an FPCB, but is not limited thereto. In an example, the first wireless communication circuit 1040 may be disposed on the second printed circuit board 620, and electrically connected to the sixth conductive portion 930*a* and/or the eighth conductive portion 930*c* of the second lateral member 930 through a transmission line (e.g., a signal wire and/or a coaxial cable) connected to the above-described electrical connecting member 1090. In an example, as the sixth conductive portion 930*a* and/or the eighth conductive portion 930*c* are electrically connected to the first wireless communication circuit 1040, the sixth conductive portion 930*a* and/or the eighth conductive portion 930*c* may operate as an antenna radiator configured to transmit or receive an RF signal in a designated frequency band. In an example, the first wireless communication circuit 1040 may feed an RF signal to the sixth conductive portion 930*a* and/or the eighth conductive portion 930*c*. In another example, the first wireless communication circuit 1040 may receive an RF signal from the sixth conductive portion 930*a* and/or the eighth conductive portion 930*c*. In an example, the sixth conductive portion 930*a* may be electrically connected to the first wireless communication circuit 1040 at a twelfth point $P_{12}$ which is positioned at the sixth conductive portion 930*a* (e.g., the one end in the +x-direction in FIG. 9C) and adjacent to the eighth conductive portion 930*c*. In another example, the sixth conductive portion 930*a* may be electrically connected to a second switch circuit 1070 at a thirteenth point $P_{13}$ spaced apart from the twelfth point $P_{12}$ in the −x-axis direction. In an embodiment, the second switch circuit 1070 may selectively connect the sixth conductive portion 930*a* to a second passive element 1071 or the ground of the second printed circuit board 1020. The second passive element 1071 may include, for example, an inductor and/or a capacitor, but is not limited thereto. In an example, when the second switch circuit 1070 is in a first electrical connection state, the sixth conductive portion 930*a* may be electrically connected to the ground of the second printed circuit board 1020 through the second passive element 1071. In another example, when the second switch circuit 1070 is in a second electrical connection state, the sixth conductive portion 930*a* may be electrically connected to the ground of the second printed circuit board 1020 without passing through the second passive element 1071. For example, the sixth conductive portion 930*a* may be fed from the first wireless communication circuit 1040 at the twelfth point $P_{12}$, and grounded to the ground of the second printed circuit board 1020 at the thirteenth point $P_{13}$. In an example, the second switch circuit 1070 may be electrically connected to a processor (e.g., the processor 120 in FIG. 1), and the processor may change an electrical connection state of the second switch circuit 1070 according to an operation of the electronic device 900. In another example, the second switch circuit 1070 may be electrically connected to the first wireless communication circuit 1040, and the first wireless communication circuit 1040 may change an electrical connection state of the second switch circuit 1070. For example, the first wireless communication circuit 1040 may change an electrical connection state of the second switch circuit 1070 according to an operation of the electronic device 900, a surrounding environment of the electronic device 900, or a frequency band of an operating signal.

According to an embodiment, through the above-described electrical connection relation, the sixth conductive portion 930*a* may operate as an inverted F antenna (IFA) configured to transmit and/or receive an RF signal in the second frequency band and/or the sixth frequency band. In an example, the second frequency band may be a middle band (HB) (e.g., about 2.2 to about 2.7 GHz) frequency band. In another example, the sixth frequency band may be a low band (LB) (e.g., about 0.6 to about 1 GHz). For example, the sixth conductive portion 930*a* may operate as an antenna radiator configured to transmit or receive an RF signal in the sixth frequency band (e.g., the low band (LB) frequency band) when the second switch circuit 1070 is in the first electrical connection state, and operate as an antenna radiator configured to transmit or receive an RF signal in the second frequency band (e.g., the middle band (MB) frequency band) when the second switch circuit 1070 is in the second electrical connection state. In another example, the sixth conductive portion 930*a* may operate as an antenna radiator configured to transmit or receive an RF signal in the second frequency band when the second switch circuit 1070 is in the first electrical connection state, and operate as an antenna radiator configured to transmit or receive an RF signal in the sixth frequency band when the second switch circuit 1070 is in the second electrical connection state.

In an example, the eighth conductive portion 930*c* may be electrically connected to the first wireless communication circuit 1040 at a fourteenth point $P_{14}$ which is positioned at the eighth conductive portion 930*c* (e.g., the one end in the −x-direction in FIG. 9C) and adjacent to the sixth conductive portion 930*a*, and may be electrically connected to the ground of the second printed circuit board 1020 at a fifteenth point $P_{15}$ which is positioned at the eighth conductive portion 930*c* and adjacent to the ninth non-conductive portion 930*i* rather than the fourteenth point $P_{14}$. In another example, the eighth conductive portion 930*c* may be electrically connected to a third switch circuit 1080 at a sixteenth point $P_{16}$ located between the fourteenth point $P_{14}$ and the fifteenth point $P_{15}$. For example, the third switch circuit 1080 may selectively connect the eighth conductive portion 930*c* to a third passive element 1081 or the ground of the second printed circuit board 1020. In an example, when the third switch circuit 1080 is in the first electrical connection state, the eighth conductive portion 930*c* may be electrically connected to the ground of the second printed circuit board 1020 through the third passive element 1081. In another example, when the third switch circuit 1080 is in the second electrical connection state, the eighth conductive portion 930*c* may be electrically connected to the ground of the second printed circuit board 1020 without passing through the third passive element 1081. In an example, the third switch circuit 1080 may be electrically connected to a processor (e.g., the processor 120 in FIG. 1), and the processor may change an electrical connection state of the third switch circuit 1080 according to an operation of the electronic device 900.

According to an embodiment, the eighth conductive portion 930c may be fed from the first wireless communication circuit 1040 at the fourteenth point $P_{14}$, and grounded to the ground of the second printed circuit board 1020 at the fifteenth point $P_{15}$, so as to operate as an inverted-F antenna configured to transmit or receive an RF signal in the third frequency band. In an example, the third frequency band may be a high band (HB) (e.g., about 2.2 to about 2.7 GHz). In an embodiment, a resonant frequency of the eighth conductive portion 930c may be adjusted as an electrical connection state of the third switch circuit 1080 is changed.

According to an embodiment, a protrusion (e.g., a flange) extending from the second lateral member 930 may be disposed in at least a part of the twelfth point $P_{12}$ to the sixteenth point $P_{16}$ (or $P_{12}$ to $P_{16}$). For example, the protrusion may be disposed in a direction toward the inside of the second housing 912. In an example, the sixth conductive portion 930a and/or the eighth conductive portion 930c may be electrically connected to the ground of the second printed circuit board 1020 and/or the first wireless communication circuit 1040 through the above-described protrusion. In an example, the sixth conductive portion 930a and/or the eighth conductive portion 930c may be electrically connected to the second printed circuit board 1020 through a connecting member (not shown) at the twelfth point $P_{12}$ to the sixteenth point $P_{16}$. The above-described connecting member may be, for example, a C-clip, a conductive screw, a conductive foam, or an FPCB, but is not limited thereto.

According to an embodiment, the electronic device 900 may use the first conductive portion 920a as an antenna radiator of the first frequency band (e.g., the GPS L5 band), the second frequency band (e.g., the middle band (MB) frequency band), and/or the third frequency band (e.g., the high band (HB) frequency band), use the second conductive portion 920b and the first region 1011 of the first printed circuit board 1010 connected to the second conductive portion 920b as an antenna radiator of the second frequency band (e.g., the middle band (MB) frequency band), the third frequency band (e.g., the high band (HB) frequency band), the fourth frequency band (e.g., the GPS L1 band), and the fifth frequency band (e.g., the Wi-Fi band), and use the third conductive portion 920c as an antenna radiator of the second frequency band (e.g., the middle band (MB) frequency band). As another example, the electronic device 900 may use the fourth conductive portion 920d as an antenna radiator of the fifth frequency band (e.g., the Wi-Fi band), and use a slot S configured in a region adjacent to the fifth conductive portion 920e as an antenna radiator of the sixth frequency band (e.g., the low band (LB) frequency band), the third frequency band (e.g., the high band (HB) frequency band), and/or the seventh frequency band (e.g., the ultra-high band (UHB) frequency band). According to another example, the electronic device 900 may use the sixth conductive portion 930a as an antenna radiator of the sixth frequency band (e.g., the low band (LB) frequency band) and/or the second frequency band (e.g., the middle band (MB) frequency band), and use the eighth conductive portion 930c as an antenna radiator of the third frequency band (e.g., the high band (HB) frequency band).

According to an embodiment, the electronic device 900 may uses a slot S configured in a region adjacent to the second side surface 9202 as an antenna radiator configured to transmit and/or receive an RF signal in the sixth frequency band (e.g., the low band (LB) frequency band), and when the electronic device 900 is in a folded state, use the sixth conductive portion 930a disposed on the sixth side surface 9303 which does not correspond to the second side surface 9202, as an antenna radiator of the sixth frequency band. For example, the electronic device 900 according to an embodiment may reduce the occurrence of interference between RF signals in the sixth frequency band when the electronic device 900 is in a folded state.

According to an embodiment, the electronic device 900 may use multiple conductive portions of the first lateral member and the second lateral member and/or a partial region (e.g., the first region 1011) of the first printed circuit board 1010 as an antenna radiator configured to transmit or receive an RF signal in various frequency bands, and thus implement antenna diversity. In an example, the electronic device 900 may use the first conductive portion 920a, the first region 1011 of the first printed circuit board 1010 and the second conductive portion 920b, a slot S adjacent to the fifth conductive portion 920e, and the sixth conductive portion 930a as an antenna radiator configured to receive an RF signal in the second frequency band (e.g., the middle band (MB) frequency band). In another example, the electronic device 900 may use the first conductive portion 920a, the first region 1011 of the first printed circuit board 1010 and the second conductive portion 920b, the slot S adjacent to the fifth conductive portion 920e, and the eighth conductive portion 930c as an antenna radiator configured to receive an RF signal in the third frequency band (e.g., the high band (HB) frequency band). The electronic device 900 according to an embodiment may implement 4 Rx antenna diversity using four reception antennas through the above-described structure, and as the result, network latency may be reduced.

Figure 10:
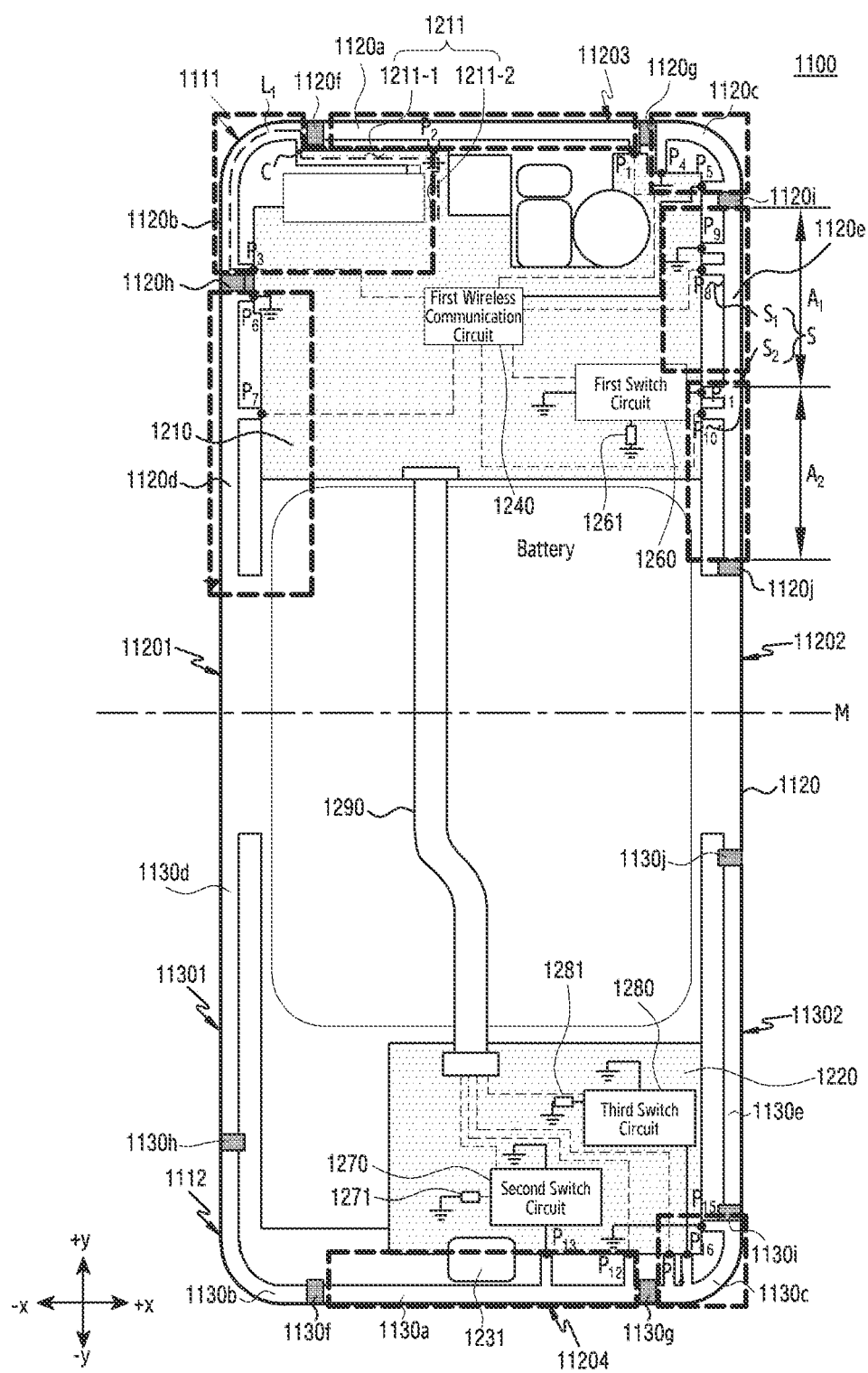
FIG. 10 is a view showing an antenna arrangement structure inside a housing of an electronic device according to an embodiment of the disclosure.

FIG. 10 is a view showing an antenna arrangement structure inside a housing of an electronic device according to an embodiment of the disclosure.

Referring to FIG. 10, an electronic device 1100 (e.g., the electronic device 300 in FIG. 3) according to an embodiment may include a housing 1110 (e.g., the housing 310 in FIG. 3), a lateral member 1120 (e.g., the lateral member 320 in FIG. 3), a first printed circuit board 1210, a second printed circuit board 1220, a wireless communication circuit 1240 (e.g., the wireless communication module 192 in FIG. 1), and/or an electrical connecting member 1290. At least one of elements of the electronic device 1100 according to an embodiment may be the same as or similar to at least one of elements of the electronic device 300 in FIG. 3, and, hereinafter, overlapping descriptions thereof will be omitted. A first housing 1111, a second housing 112, a fourth side surface 11301 and a fifth side surface 11302 may correspond to the first housing 911, the second housing 912, the fourth side surface 9301 and the fifth side surface 9302, respectively.

According to an embodiment, the lateral member 1120 may be included in the housing 1110, and may form a side surface of the electronic device 1100. In an example, the lateral member 1120 may form a first side surface 11201 positioned in the left side (e.g., the −x-direction in FIG. 10) of the electronic device 1100 and/or the housing 1110, a second side surface 11202 which is parallel to the first side surface 11201 and positioned in the right side (e.g., the +x-direction in FIG. 10) of the electronic device 1100 and/or the housing 1110, a third side surface 11203 which extends along a second direction (e.g., the +x-direction in FIG. 10)

perpendicular to a first direction and connects one end (e.g., the one end in the +y-direction in FIG. 10) of the first side surface 11201 and one end of (e.g., the one end in the +y-direction in FIG. 10) of the second side surface 11202, and/or a fourth side surface 11204 which is parallel to the third side surface 11203 and connects the other end (e.g., the one end in the −y-direction in FIG. 10) of the first side surface 11201 and the other end (e.g., the one end in the −y-direction in FIG. 10) of the second side surface 11202. In an embodiment, the lateral member 1120 may include a support member (not shown) (e.g., the second structure 220-2 or the fourth structure 230-2 in FIG. 2A). For example, the lateral member 1120 may be formed integrally with the support member, or may be formed by coupling thereof. In an embodiment, at least a part of components included in the electronic device 1100 may be disposed in the support member (not shown).

According to an embodiment, the lateral member 1120 may include multiple conductive portions and multiple non-conductive portions arranged between the multiple conductive portions. In an example, the lateral member 1120 may include a first conductive portion 1120a (e.g., the first conductive portion 320a in FIG. 3) disposed on the third side surface 11203, a second conductive portion 1120b (e.g., the second conductive portion 320b in FIG. 3) which is adjacent to one end (e.g., the one end in the −x-direction in FIG. 10) of the first conductive portion 1120a and disposed on the first side surface 11201 and the third side surface 11203, and/or a third conductive portion 1120c (e.g., the third conductive portion 320c in FIG. 3) which is adjacent to the other end (e.g., the one end in the +x-direction in FIG. 10) of the first conductive portion 1120a and disposed on the second side surface 11202 and the third side surface 11203. In another example, the lateral member 1120 may further include a fourth conductive portion 1120d (e.g., the fourth conductive portion 320d in FIG. 3) which is adjacent to the second conductive portion 1120b and disposed on the first side surface 11201, and/or a fifth conductive portion 1120e (e.g., the fifth conductive portion 320e in FIG. 3) which is adjacent to the third conductive portion 1120c and disposed on the second side surface 11202.

In another example, the lateral member 1120 may include a sixth conductive portion 1130a (e.g., the sixth conductive portion 330a in FIG. 3) disposed on the fourth side surface 11204, a seventh conductive portion 1130b (e.g., the seventh conductive portion 330b in FIG. 3) which is adjacent to one end (e.g., the one end in the −x-direction in FIG. 10) of the sixth conductive portion 1130a and disposed on the first side surface 11201 and the fourth side surface 11204, and/or an eighth conductive portion 1130c (e.g., the eighth conductive portion 330c in FIG. 3) which is adjacent to the other end (e.g., the one end in the +x-direction in FIG. 10) of the sixth conductive portion 1130a and disposed on the second side surface 11202 and the fourth side surface 11204. As another example, the lateral member 1120 may further include a ninth conductive portion 1130d (e.g., the ninth conductive portion 330d in FIG. 3) which is adjacent to the seventh conductive portion 1130b and disposed on the first side surface 11201, and/or a tenth conductive portion 1130e (e.g., the tenth conductive portion 330e in FIG. 3) which is adjacent to the eighth conductive portion 1130c and disposed on the second side surface 11202.

In an example, the lateral member 1120 may include a first non-conductive portion 1120f (e.g., the first non-conductive portion 320f in FIG. 3) disposed between the first conductive portion 1120a and the second conductive portion 1120b so as to insulate the first conductive portion 1120a and the second conductive portion 1120b, a second non-conductive portion 1120g (e.g., the second non-conductive portion 320g in FIG. 3) disposed between the first conductive portion 1120a and the third conductive portion 1120c so as to insulate the first conductive portion 1120a and the third conductive portion 1120c, and/or a third non-conductive portion 1120h (e.g., the third non-conductive portion 320h in FIG. 3) disposed between the second conductive portion 1120b and the fourth conductive portion 1120d so as to insulate the second conductive portion 1120b and the fourth conductive portion 1120d. In another example, the lateral member 1120 may further include a fourth non-conductive portion 1120i (e.g., the fourth non-conductive portion 320i in FIG. 3) positioned between the third conductive portion 1120c and one end of the fifth conductive portion 1120e so as to insulate the third conductive portion 1120c and the fifth conductive portion 1120e, and/or a fifth non-conductive portion 1120j (e.g., the fifth non-conductive portion 320j in FIG. 3) positioned at the other end of the fifth conductive portion 1120e.

In another example, the lateral member 1120 may include a sixth non-conductive portion 1130f (e.g., the sixth non-conductive portion 330f in FIG. 3) disposed between the sixth conductive portion 1130a and the seventh conductive portion 1130b so as to insulate the sixth conductive portion 1130a and the seventh conductive portion 1130b, a seventh non-conductive portion 1130g (e.g., the seventh non-conductive portion 330g in FIG. 3) disposed between the sixth conductive portion 1130a and the eighth conductive portion 1130c so as to insulate the sixth conductive portion 1130a and the eighth conductive portion 1130c, and/or an eighth non-conductive portion 1130h (e.g., the eighth non-conductive portion 330h in FIG. 3) disposed between the seventh conductive portion 1130b and the ninth conductive portion 1130d so as to insulate the seventh conductive portion 1130b and the ninth conductive portion 1130d. As another example, the lateral member 1120 may further include a ninth non-conductive portion 1130i (e.g., the ninth non-conductive portion 330i in FIG. 3) positioned between the eighth conductive portion 1130c and one end of the tenth conductive portion 1130e so as to insulate the eighth conductive portion 1130c and the tenth conductive portion 1130e, and/or a tenth non-conductive portion 1130j (e.g., the tenth non-conductive portion 330j in FIG. 3) positioned at the other end of the tenth conductive portion 1130e.

According to an embodiment, the top region (e.g., the region in the +y-direction in FIG. 10) of the lateral member 1120 may be segmented into five regions by the first non-conductive portion 1120f, the second non-conductive portion 1120g, the third non-conductive portion 1120h, the fourth non-conductive portion 1120i, and/or the fifth non-conductive portion 1120j. According to another embodiment, the bottom region (e.g., the region in the −y-direction in FIG. 10) of the lateral member 1120 may be segmented into five regions, which is identical or similar to the above-described top region of the lateral member 1120, by the sixth non-conductive portion 1130f, the seventh non-conductive portion 1130g, the eighth non-conductive portion 1130h, the ninth non-conductive portion 1130i, and/or the tenth non-conductive portion 1130j. According to another embodiment, the number of regions into which the bottom region (e.g., the region in the −y-direction in FIG. 10) of the lateral member 1120 is segmented and the number of regions into which the top region (e.g., the +y-direction region in FIG. 10) of the lateral member 1120 is segmented, may be various, and the number of regions into which the top region of the lateral member 1120 is segmented and the number of regions into which the bottom region of the lateral member 1120 is segmented, may be different from each other.

According to an embodiment, the first printed circuit board 1210 may be disposed in at least a region (e.g., the region in the +y-direction of the lateral member 1120) of the lateral member 1120. For example, the first printed circuit board 1210 may be disposed adjacent to the first conductive portion 1120a, the second conductive portion 1120b, the third conductive portion 1120c, the fourth conductive portion 1120d, and/or the fifth conductive portion 1120e. In an example, a processor (e.g., the processor 120 in FIG. 1), a memory (e.g., the memory 130 in FIG. 1), an interface (e.g., the interface 177 in FIG. 1), and/or the wireless communication circuit 1240 may be arranged on the first printed circuit board 1210. In an example, the processor may include at least one of a central processing device, an application processor, a graphic processing device, an image signal processor, a sensor hub processor, and a communication processor. For example, the memory may include a volatile memory or a non-volatile memory. In an example, the interface may include a high-definition multimedia interface (HDMI) and/or an audio interface.

In an example, the first printed circuit board 1210 may include a ground (not shown). In an embodiment, the first conductive portion 1120a, the second conductive portion 1120b, the third conductive portion 1120c, the fourth conductive portion 1120d, and/or the fifth conductive portion 1120e of the lateral member 1120 may be grounded to the ground of the first printed circuit board 1210.

According to an embodiment, the first printed circuit board 1210 may include a first region 1211 adjacent to the first conductive portion 1120a and/or the second conductive portion 1120b of the lateral member 1120. In an example, the first region 1211 may be formed in a letter "]" shape (or a letter "L" shape). In an embodiment, the first region 1211 may include a first portion 1211-1 or a second portion 1211-2. For example, the first region 1211 may include the first portion 1211-1 substantially parallel to third side surface 11203 or the first conductive portion 1120a of the electronic device 1100, and the second portion 1211-2 substantially perpendicular to the first portion 1211-1 and substantially parallel to the first side surface 11201 or the second side surface 11202 of electronic device 1100. According to an embodiment, one end (e.g., the one end in the −x-direction in FIG. 10) of the first portion 1211-1 of the first region 1211 may be connected to a point (e.g., the third point $P_3$ in FIG. 9A) of the second conductive portion 1120b, which is adjacent to the first conductive portion 1120a. In an embodiment, the first region 1211 may be a region to which the ground included in the first printed circuit board 1210 is extended. The above-described ground (hereinafter, a "conductive layer") may operate as a conductor.

In an example, the first region 1211 may be a region formed as a region of the first printed circuit board 1210 is trimmed in order to secure a space in which at least one electronic component 1030 of the electronic device 1100 is disposed. The shape of the first region 1211 may not be limited to the above-mentioned the letter "]" shape or the letter "L" shape, and if the first region 1211 can operate as an antenna radiator, the shape of the first region 1211 may be variously changed. For example, when the first region 1211 has an elongated region capable of operating as an antenna radiator, the shape of the first region 1211 may be changed into various shapes in addition to the letter "]" shape or the letter "L" shape.

According to an embodiment (e.g., see FIG. 10), the wireless communication circuit 1240 may be electrically connected to the first conductive portion 1120a, the second conductive portion 1120b, the third conductive portion 1120c, the fourth conductive portion 1120d, and/or the fifth conductive portion 1120e through a transmission line (e.g., a signal wire, a coaxial cable, or an FPCB). In an example, the first conductive portion 1120a, the second conductive portion 1120b, the third conductive portion 1120c, the fourth conductive portion 1120d, and/or the fifth conductive portion 1120e may be electrically connected to the wireless communication circuit 1240, and thus may operate as an antenna radiator for transmitting or receiving an RF signal in a designated frequency band. In an example, the wireless communication circuit 1240 may feed an RF signal to the first conductive portion 1120a, the second conductive portion 1120b, the third conductive portion 1120c, the fourth conductive portion 1120d, and/or the fifth conductive portion 1120e. In another example, the wireless communication circuit 1240 may also receive an RF signal from the first conductive portion 1120a, the second conductive portion 1120b, the third conductive portion 1120c, the fourth conductive portion 1120d, and/or the fifth conductive portion 1120e.

According to an embodiment, the second printed circuit board 1220 may be spaced apart from the first printed circuit board 1210 so as to be disposed in at least a region (e.g., the region in the −y-direction of the lateral member 1120) of the lateral member 1120. For example, the second printed circuit board 1220 may be disposed adjacent to the sixth conductive portion 1130a, the seventh conductive portion 1130b, the eighth conductive portion 1130c, the ninth conductive portion 1130d, and/or the tenth conductive portion 1130e. In an example, an interface 1231 (e.g., the interface 177 in FIG. 1) may be disposed on the second printed circuit board 1220. In an example, the interface 1231 may include a universal serial bus (USB) interface, or an audio interface.

According to an embodiment, the second printed circuit board 1220 may be electrically connected to the first printed circuit board 1210 through the electrical connecting member 1290 (e.g., a coaxial cable or an FPCB). In an example, the second printed circuit board 1220 may be electrically connected to the wireless communication circuit 1240 disposed on the first printed circuit board 1210 through the electrical connecting member 1290. In an example, the second printed circuit board 1220 may include a transmission line (e.g., a signal wire, a coaxial cable, or an FPCB) electrically connecting the electrical connecting member 1290 to the sixth conductive portion 1130a and/or the eighth conductive portion 1130c. Through the above-described electrical connecting member 1290 and/or transmission line, the sixth conductive portion 1130a and/or the eighth conductive portion 1130c of the lateral member 1120 may be electrically connected to the wireless communication circuit 1240.

In an example, the sixth conductive portion 1130a and/or the eighth conductive portion 1130c may be electrically connected to the wireless communication circuit 1240, and thus may operate as an antenna radiator for transmitting or receiving an RF signal in a designated frequency band. In an example, the wireless communication circuit 1240 may transmit or feed an RF signal in a designated frequency band to the sixth conductive portion 1130a and/or the eighth conductive portion 1130c. In another example, the wireless communication circuit 1240 may also receive an RF signal from the sixth conductive portion 1130a and/or the eighth conductive portion 1130c.

According to an embodiment, the second printed circuit board 1220 may include a ground (not shown). For example, the sixth conductive portion 1130a and the eighth conductive portion 1130c of the second lateral member 1130 may be grounded to the ground of the second printed circuit board 1220.

In an example, the first conductive portion 1120a may be electrically connected to the wireless communication circuit 1240 at a first point $P_1$ positioned at the first conductive portion 1120a (e.g., the one end in the +x-direction in FIG. 10), which is adjacent to the third conductive portion 1120c. In another example, the first conductive portion 1120a may be electrically connected to a ground of the first printed circuit board 1210 at the second point $P_2$ spaced apart from the first point $P_1$ in the −x-axis direction. For example, the first conductive portion 1120a may be electrically connected to the ground positioned in the first region 1211 of the first printed circuit board 1210. For example, the first conductive portion 1120a may be fed from the wireless communication circuit 1240 at the first point $P_1$, and may be grounded to the ground of the first printed circuit board 1210 at the second point $P_2$. For example, through the above-described electrical connection relation, the first conductive portion 1120a may operate as an inverted-F antenna (IFA) for transmitting and/or receiving an RF signal in a first frequency band, a second frequency band, and/or a third frequency band. In an example, the first frequency band may be a GPS L5 (e.g., about 1.176 GHz) band. In another example, the second frequency band may be a middle band (MB) (e.g., about 1.7 to about 2.2 GHz) frequency band. In another example, the third frequency band may be a high band (HB) (e.g., about 2.2 to about 2.7 GHz) frequency band.

In an example, the second conductive portion 1120b may be connected to the first region 1211 of the first printed circuit board 1210. For example, the second conductive portion 1120b may be connected to the first portion 1211-1 (e.g., the one end of the −x-direction in FIG. 10) of the first region 1211 in a region (e.g., the region C in FIG. 10) adjacent to the first conductive portion 1120a. As the second conductive portion 1120b and the first region 1211 of the first printed circuit board 1210 are connected, the electrical path $L_1$ may be formed between the second conductive portion 1120b and the first region 1211 of the first printed circuit board 1210. For example, the first region 1211 of the first printed circuit board 1210 may be formed to have a designated length, and thus a conductive layer disposed in the first region 1211 may operate as at least a part of an antenna radiator. The above-described conductive layer of the first region 1211 may be electrically connected to a ground of the first printed circuit board 1210, and as the result, the electrical path $L_1$ may be formed between the second conductive portion 1120b and the first region 1211 of the first printed circuit board 1210. In an embodiment, the designated length of the first region 1211 may be determined based on a frequency of a signal to be transmitted and/or received.

In an example, the second conductive portion 1120b may be electrically connected to the wireless communication circuit 1240 at the third point $P_3$ which is positioned at the second conductive portion 1120b (e.g., the one end in the −y-direction in FIG. 10) and adjacent to the fourth conductive portion 1120d. For example, the second conductive portion 1120b may be fed from the wireless communication circuit 1240 at the third point $P_3$, and the fed RF signal may be transmitted to the first region 1211 of the first printed circuit board 1210 along the electrical path $L_1$. For example, the second conductive portion 1120b and the first region 1211 of the first printed circuit board 1210, which is connected to the second conductive portion 1120b, may operate as a loop antenna for transmitting or receiving an RF signal of a designated frequency band.

For example, since a loop antenna has a maximum radiation characteristic in one-wavelength (λ) length, as the length of the antenna radiator operating as a loop antenna increases, antenna performance (e.g., radiation performance) can be improved. The electronic device 1100 according to an embodiment may use not only the second conductive portion 1120b of the lateral member 1120 but also the first region 1211 of the first printed circuit board 1210 as an antenna radiator so as to increase the length of the antenna radiator. Accordingly, radiation performance of the second conductive portion 1120b and the first region 1211 of the first printed circuit board 1210 connected to the second conductive portion 1120b, which operate as a loop antenna, can be improved. For example, the second conductive portion 1120b and the first region 1211 of the first printed circuit board 1210 may operate as a loop antenna covering a wide band. In an example, the second conductive portion 1120b and the first region 1211 of the first printed circuit board 1210 may operate as a wideband loop antenna for transmitting or receiving an RF signal in a second frequency band, a third frequency band, a fourth frequency band, and/or a fifth frequency band. In an example, the second frequency band may be a middle band (MB) (e.g., about 1.7 to about 2.2 GHz) frequency band. In another example, the third frequency band may be a high band (HB) (e.g., about 2.2 to about 2.7 GHz) frequency band. In another example, the fourth frequency band may be a GPS L1 (e.g., about 1.575 GHz) band. In another example, the fifth frequency band may be a Wi-Fi (e.g., about 2.4 GHz and/or about 5 GHz) band. According to an embodiment, through the above-described structure, the electronic device 1100 may allow the length of an antenna radiator operating as a loop antenna to be lengthened without increasing the size of the form factor of the electronic device 1100.

According to an embodiment, differently from the electronic device 500 in FIG. 5A, in which an RF signal is fed at a point of the second conductive portion 1120b, which is adjacent to the first conductive portion 1120a, the electronic device 1100 may be configured such that an RF signal is fed at a point of the second conductive portion 1120b, which is adjacent to the fourth conductive portion 1120d, and thus interference generated between the first conductive portion 1120a and the second conductive portion 1120b can be reduced. The electronic device 1100 according to an embodiment may be configured such that feeding is performed at a point of the second conductive portion 1120b, which is separated from the first conductive portion 1120a, and thus isolation between the first conductive portion 1120a and the second conductive portion 1120b, which are adjacent to each other, can be improved.

In an example, the third conductive portion 1120c may be electrically connected to a ground of the first printed circuit board 1210 at the fourth point $P_4$ which is positioned at the third conductive portion 1120c and adjacent to the first conductive portion 1120a. In another example, the third conductive portion 1120c may be electrically connected to the wireless communication circuit 1240 at the fifth $P_5$ which is positioned at the third conductive portion 1120c to be closer to the fifth conductive portion 1120e than the first conductive portion 1120a. For example, the third conductive portion 1120c may be grounded to the ground of the first printed circuit board 1210 at the fourth point $P_4$, and may be fed from the wireless communication circuit 1240 at the fifth point $P_5$. The third conductive portion 1120c according to an embodiment may operate as an inverted-F antenna for transmitting or receiving an RF signal in a second frequency band through the above-described electrical connection relation. In an example, the second frequency band may be a middle band (MB) (e.g., about 1.7 to about 2.2 GHz) frequency band.

In an example (e.g., FIG. 10), the fourth conductive portion 1120d may be electrically connected to a ground of the first printed circuit board 1210 at the sixth point $P_6$ which is positioned at the fourth conductive portion 1120d and adjacent to the second conductive portion 1120b. In another example, the fourth conductive portion 1120d may be electrically connected to the wireless communication circuit 1240 at the seventh point $P_7$ spaced apart from the sixth point $P_6$ in the −y-axis direction. For example, the fourth conductive portion 1120d may be grounded to the ground of the first printed circuit board 1210 at the sixth point $P_6$, and may be fed from the wireless communication circuit 1240 at the seventh point $P_7$. The fourth conductive portion 1120d according to an embodiment may operate as an inverted-F antenna for transmitting or receiving an RF signal in a fifth frequency band through the above-described electrical connection relation. In an example, the fifth frequency band may be a WiFi (e.g., about 2.4 and/or about 5 GHz) band.

According to an embodiment, the fifth conductive portion 1120e may include a first portion $A_1$ which is adjacent to the third conductive portion 1120c and has a first length, and a second portion $A_2$ which is adjacent to the first portion $A_1$ and has a second length. As an example, the second length may be longer than the first length, but it may be not limited thereto. According to an embodiment, a slot S (e.g., the slot S in FIG. 9A) may be formed in the lateral member 1120 adjacent to the fifth conductive portion 1120e. In an example, the slot S may include a first slot region $S_1$ adjacent to the first slot region $S_1$ of the fifth conductive portion 1120e, and/or a second slot region $S_2$ adjacent to the second portion $A_2$ of the fifth conductive portion 1120e. In an example, the first slot region $S_1$ may mean a region between the ninth point $P_9$ and the eleventh point $P_{11}$. In another example, the second slot region $S_2$ may mean a region between the eleventh point $P_{11}$ and the fifth non-conductive portion 1120j.

In an example, the first portion $A_1$ of the fifth conductive portion 1120e, which is adjacent to the first slot region $S_1$ of the slot S, may be electrically connected to the wireless communication circuit 1240 at the eighth point $P_8$, and may be electrically connected to a ground of the first printed circuit board 1210 at the ninth point $P_9$ positioned between the eighth point $P_8$ and the fourth non-conductive portion 1120i. For example, the first portion $A_1$ may be fed from the wireless communication circuit 1240 at the eighth point $P_8$, and may be grounded to the ground of the first printed circuit board 1210 at the ninth point $P_9$. For example, as the first portion $A_1$ of the fifth conductive portion 1120e is fed at the eighth point $P_8$ and grounded at the ninth point $P_9$, and the first slot region $S_1$, which is adjacent to the first portion $A_1$ of the fifth conductive portion 1120e, may operate as a slot antenna. For example, the first slot region $S_1$ may operate as a slot antenna for transmitting or receiving an RF signal in a seventh frequency band. In an example, the seventh frequency band may be an ultra-high band (UHB) (e.g., about 3.55 to about 3.7 GHz).

In an example, the second portion $A_2$ of the fifth conductive portion 1120e, which is adjacent to the second slot region $S_2$ of the slot S, may be electrically connected to the wireless communication circuit 1240 at the tenth point $P_{10}$, and may be electrically connected to a first switch circuit 1260 at the eleventh point $P_{11}$ positioned between the tenth point $P_{10}$ and the eighth point $P_8$. In an embodiment, the first switch circuit 1260 may selectively connect the second portion $A_2$ of the fifth conductive portion 1120e to a first passive element 1261 or the ground of the first printed circuit board 1210. For example, the first passive element 1261 may include an inductor and/or a capacitor, but it is not limited thereto. In an example, when the first switch circuit 1260 is in the first electrical connection state, the second portion $A_2$ may be electrically connected to the ground of the first printed circuit board 1210 through the first passive element 1261. In another example, when the first switch circuit 1260 is in the second electrical connection state, the second portion $A_2$ may be electrically connected to the ground of the first printed circuit board 1210 without passing through the first passive element 1261. For example, the second portion $A_2$ of the fifth conductive portion 1120e may be fed from the wireless communication circuit 1240 at the tenth point $P_{10}$, and may be grounded to the ground of the first printed circuit board 1210 at the eleventh point $P_{11}$. In an example, the first switch circuit 1260 may be electrically connected to a processor (e.g., the processor 120 in FIG. 1), and the processor may change an electrical connection state of the first switch circuit 1260. In another example, the first switch circuit 1260 may be electrically connected to the wireless communication circuit 1240, and the wireless communication circuit 1240 may change an electrical connection state of the first switch circuit 1260 according to an operation of the electronic device 1100.

In an example, according to an electrical connection state of the first switch circuit 1260, the first slot region $S_1$ may be expanded from a region between the ninth point $P_9$ and the eleventh point $P_{11}$ to a region from the ninth point $P_9$ to the fifth non-conductive portion 1120j. For example, when the first switch circuit 1260 is in the second electrical connection state, the first slot region $S_1$ may be expanded to a region from the ninth point $P_9$ to the fifth non-conductive portion 1120j. According to an embodiment, as the second portion $A_2$ of the fifth conductive portion 1120e is fed at the tenth point $P_{10}$, and grounded at the eleventh point $P_{11}$, the second slot region $S_2$, which is adjacent to the second portion $A_2$ of the fifth conductive portion 1120e, may operate as a slot antenna. For example, the second slot region $S_2$ may operate as a slot antenna for transmitting or receiving an RF signal in a third frequency band and/or a sixth frequency band. In an example, the third frequency band may be a high band (HB) (e.g., about 2.2 to about 2.7 GHz) frequency band. In another example, the sixth frequency band may be a low band (LB) (e.g., about 0.6 to about 1 GHz) frequency band. For example, the second slot region $S_2$ may operate as a slot antenna for transmitting or receiving an RF signal in the sixth frequency band (e.g., a low band (LB)) when the first switch circuit 1260 is in the first electrical connection state, and may operate as a slot antenna for transmitting or receiving an RF signal of the third frequency band (e.g., a high band (HB)) when the first switch circuit 1260 is in the second electrical connection state. In another example, the second slot region $S_2$ may also operate as a slot antenna for transmitting or receiving an RF signal in the third frequency band when the first switch circuit 1260 is in the first electrical connection state, and may also operate as a slot antenna for transmitting or receiving an RF signal of the sixth frequency band when the first switch circuit 1260 is in the second electrical connection state.

The electronic device 1100 according to an embodiment may transmit and/or receive an RF signal in various frequency bands through the first conductive portion 1120a, the third conductive portion 1120c, and the fourth conductive portion 1120d which operate as an inverted-F antenna, the second conductive portion 1120b and the first region 1211 of the first printed circuit board 1210, which operate as a loop antenna, and/or the slot S of the lateral member 1120 operating as a slot antenna.

In an example, the sixth conductive portion 1130a may be electrically connected to the wireless communication circuit 1240 at a twelfth point $P_{12}$ which is positioned at the sixth conductive portion 1130a (e.g., the one end in the +x-direction in FIG. 10) and adjacent to the eighth conductive portion 1130c. In another example, the sixth conductive portion 1130a may be electrically connected to the second switch circuit 1270 at the thirteenth point $P_{13}$ spaced apart from the twelfth point $P_{12}$ in the −x-axis direction. In an embodiment, the second switch circuit 1270 may selectively connect the sixth conductive portion 1130a to the second passive element 1271 or a ground of the second printed circuit board 1220. For example, the second passive element 1271 may include an inductor and/or a capacitor, but it is not limited thereto. In an example, when the second switch circuit 1270 is in the first electrical connection state, the sixth conductive portion 1130a may be electrically connected to the ground of the second printed circuit board 1220 through the second passive element 1271. In an example, when the second switch circuit 1270 is in the second electrical connection state, the sixth conductive portion 1130a may be electrically connected to the ground of the second printed circuit board 1220 without passing through the second passive element 1271. For example, the sixth conductive portion 1130a may be fed from the wireless communication circuit 1240 at the twelfth point $P_{12}$, and may be grounded to the ground of the second printed circuit board 1220 at the thirteenth point $P_{13}$. In an example, the second switch circuit 1270 may be electrically connected to a processor (e.g., the processor 120 in FIG. 1), and the processor may change an electrical connection state of the second switch circuit 1270 according to an operation of the electronic device 1100. In another example, the second switch circuit 1270 may be electrically connected to the wireless communication circuit 1240, and the wireless communication circuit 1240 may change an electrical connection state of the second switch circuit 1270.

According to an embodiment, through the above-described electrical connection relation, the sixth conductive portion 1130a may operate as an inverted-F antenna (IFA) for transmitting and/or receiving an RF signal in a second frequency band and/or a sixth frequency band. In an example, the second frequency band is a middle band (HB) (e.g., about 2.2 to about 2.7 GHz) frequency band. In another example, the sixth frequency band may be a low band (LB; e.g., about 0.6 to about 1 GHz). For example, the sixth conductive portion 1130a may operate as an antenna radiator for transmitting or receiving an RF signal in the sixth frequency band (e.g., a low band (LB) frequency band) when the second switch circuit 1270 is in the first electrical connection state, and may operate as an antenna radiator for transmitting or receiving an RF signal of the second frequency band (e.g., a middle band (MB) frequency band) when the second switch circuit 1270 is in the second electrical connection state. In another example, when the second switch circuit 1270 is in the first electrical connection state, the sixth conductive portion 1130a may also operate as an antenna radiator for transmitting or receiving an RF signal in the second frequency band, and when the second switch circuit 1270 is in the second electrical connection state, may also operate as an antenna radiator for transmitting or receiving an RF signal in the sixth frequency band.

In an example, the eighth conductive portion 1130c may be electrically connected to the wireless communication circuit 1240 at the fourteenth point $P_{14}$ which is positioned at the eighth conductive portion 1130c (e.g., the one end in the −x-direction in FIG. 10) and adjacent to the sixth conductive portion 1130a, and may be electrically connected to a ground of the second printed circuit board 1220 at the fifteenth point $P_{15}$ which is positioned at the eighth conductive portion 1130c and closer to the ninth non-conductive portion 1130i than the fourteenth point $P_{14}$. In another example, the eighth conductive portion 1130c may be electrically connected to a third switch circuit 1280 at the sixteenth point $P_{16}$ positioned between the fourteenth point $P_{14}$ and the fifteenth point $P_{15}$. For example, the third switch circuit 1280 may selectively connect the eighth conductive portion 1130c to a third passive element 1281 or the ground of the second printed circuit board 1220. In an example, when the third switch circuit 1280 is in the first electrical connection state, the eighth conductive portion 1130c may be electrically connected to the ground of the second printed circuit board 1220 through the third passive element 1281. In another example, when the third switch circuit 1280 is in the second electrical connection state, the eighth conductive portion 1130c may be electrically connected to the ground of the second printed circuit board 1220 without passing through the third passive element 1281. In an example, the third switch circuit 1280 may be electrically connected to a processor (e.g., the processor 120 in FIG. 1), and the processor may change an electrical connection state of the third switch circuit 1280 according to an operation of the electronic device 1100.

According to an embodiment, the eighth conductive portion 1130c may be fed from the wireless communication circuit 1240 at the fourteenth point $P_{14}$ and grounded to a ground of the second printed circuit board 1220 at the fifteenth point $P_{15}$, so as to operate as an inverted-F antenna for transmitting or receiving an RF signal in a third frequency band. In an example, the third frequency band may be a high band (HB) (e.g., about 2.2 to about 2.7 GHz). In an embodiment, the resonant frequency of the eighth conductive portion 1130c may be adjusted as an electrical connection state of the third switch circuit 1280 is changed.

According to an embodiment, a protrusion (e.g., a flange), which extends from the lateral member 1120, may be formed in at least a part of the first point $P_1$ to the sixteenth point $P_{16}$ (or $P_1$ to $P_{16}$). For example, the protrusion may be formed in a direction toward the inside of the housing 1110.

According to an embodiment, the electronic device 1100 may use the first conductive portion 1120a as an antenna radiator in a first frequency band (e.g., a GPS L5 band), a second frequency band (e.g., a middle band (MB) frequency band), and/or a third frequency band (e.g., a high band (HB) frequency band), the second conductive portion 1120b and the first region 1011 of the first printed circuit board 1210, which connected to the second conductive portion 1120b, as an antenna radiator in a second frequency band (e.g., middle band (MB) frequency band), a third frequency band (e.g., high band (HB) frequency band), a fourth frequency band (e.g., GPS L1 band), and a fifth frequency band (e.g., a Wi-Fi band), and the third conductive portion 1120c as an antenna radiator in the second frequency band (e.g., a middle band (MB) frequency band). As another example, the electronic device 1100 may use the fourth conductive portion 1120d as an antenna radiator in a fifth frequency band (e.g., a Wi-Fi band), and the slot S, which is formed in a region adjacent to the fifth conductive portion 1120e, as an antenna radiator in a sixth frequency band (e.g., a low band (LB) frequency band), a third frequency band (e.g., a high band (HB) frequency band), and/or a seventh frequency band (e.g., an ultra-high band (UHB) frequency band). According to another example, the electronic device 1100 may use the sixth conductive portion 1130a as an antenna radiator in a sixth frequency band (e.g., a low band (LB) frequency band) and/or a second frequency band (e.g., a middle band (MB) frequency band), and the eighth conductive portion 1130c as an antenna radiator in a third frequency band (e.g., a high band (HB) frequency band).

According to an embodiment, the electronic device 1100 may use the slot S, which is formed in a region adjacent to the second side surface 11202, as an antenna radiator for transmitting and/or receiving an RF signal in a sixth frequency band (e.g., a low band (LB) frequency band), and when the electronic device 1100 is in a folded state, may use the sixth conductive portion 1130a, which is disposed on the sixth side surface 11303 not corresponding to the second side surface 11202, as an antenna radiator in the sixth frequency.

Figure 11A:
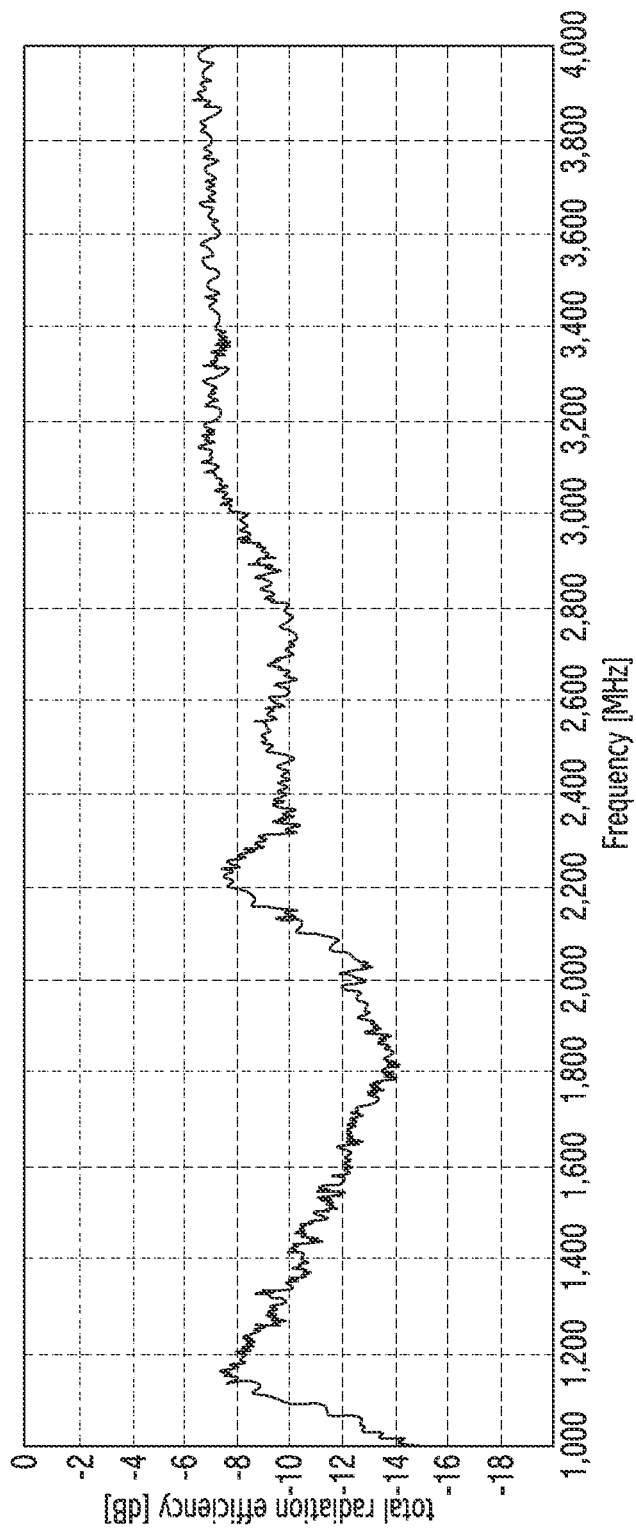
FIG. 11A illustrates a graph showing the antenna gain of a first conductive portion operating as an antenna radiator in an electronic device according to an embodiment of the disclosure.
Figure 11B:
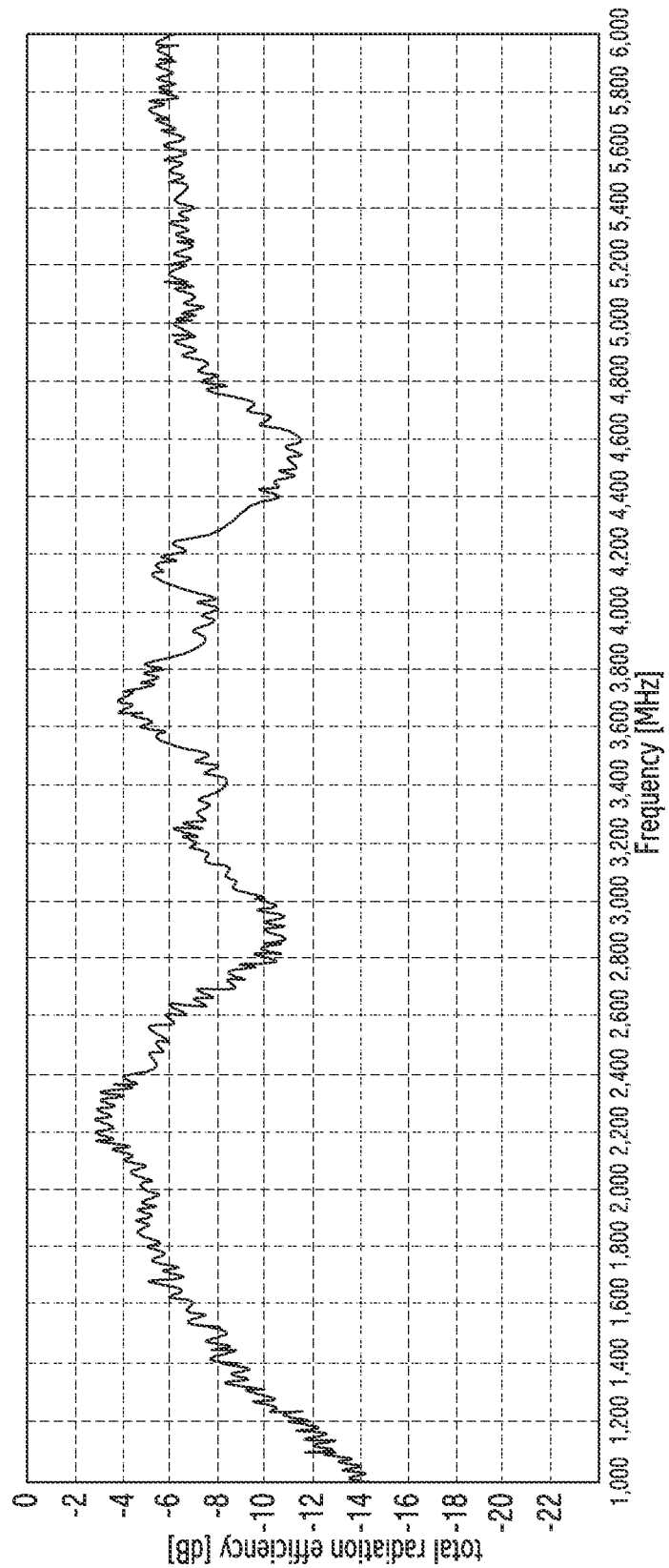
FIG. 11B illustrates a graph showing the antenna gain of a second conductive portion operating as an antenna radiator and a region of a first printed circuit board connected to the second conductive portion of an electronic device according to an embodiment of the disclosure.
Figure 12:
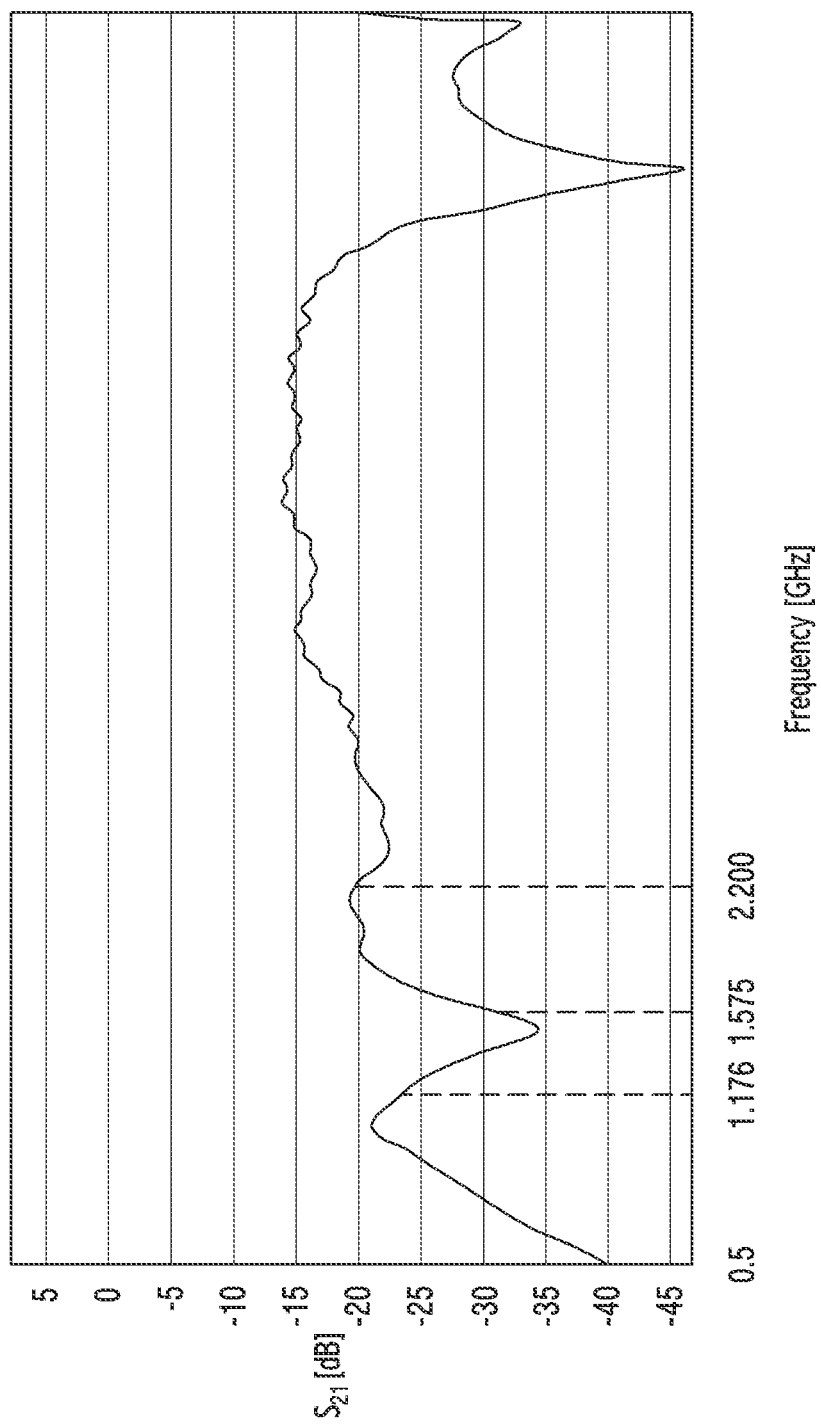
FIG. 12 illustrates a graph showing a transmission coefficient $S_{21}$ between a first conductive portion and a second conductive portion of the electronic device according to an embodiment of the disclosure.

FIG. 11A is a graph showing an antenna gain of a first conductive portion operating as an antenna radiator in an electronic device according to an embodiment of the disclosure. FIG. 11B is a graph showing an antenna gain of a second conductive portion operating as an antenna radiator and a region of a first printed circuit board connected to the second conductive portion of an electronic device according to an embodiment of the disclosure. FIG. 12 is a graph showing a transmission coefficient between a first conductive portion and a second conductive portion of an electronic device according to an embodiment of the disclosure.

A first conductive portion (e.g., the first conductive portion 920a in FIG. 9A and FIG. 9C) of an electronic device (e.g., the electronic device 900 in FIG. 9A and FIG. 9C, or the electronic device 1100 in FIG. 10) according to an embodiment may be fed from a wireless communication circuit (e.g., the first wireless communication circuit 940 in FIG. 9A) at a first point (e.g., the first point $P_1$ in FIG. 9A) and may be grounded to a ground of a printed circuit board (e.g., the first printed circuit board 910 in FIG. 9A) at a second point (e.g., the second point $P_2$ in FIG. 9A), so as to operate as an inverted-F antenna for transmitting or receiving an RF signal.

Referring to FIG. 11A, a first conductive portion, which operates as an antenna radiator, may have an antenna gain of about −10 dB or more in the frequency band between about 1.15 GHz (about 1,150 MHz) and about 1.4 GHz (about 1,400 MHz), and may have an antenna gain of about −8 dB or more in the frequency band of about 1.17 GHz (about 1,170 MHz). In addition, the first conductive portion may have an antenna gain of about −12 dB or more in the frequency band of about 2 GHz (2,800 MHz) or more, and may have an antenna gain of about −8 dB or more in the frequency band around 2.2 GHz.

In an example, transmission and/or reception of an RF signal can be performed efficiently in the frequency band in which the antenna gain is about −12 dB or more, and as the antenna gain is higher, the radiation performance thereof can also be improved. Referring to FIG. 11A, since a first conductive portion according to an embodiment has an antenna gain of about −12 dB or more in the frequency band of about 1.15 GHz to about 1.4 GHz and/or about 2 GHz or more, it may be identified that as described above, the first conductive portion can operate as an inverted-F antenna for transmitting and/or receiving an RF signal in a GPS L5 (e.g., about 1.176 GHz) frequency band, a middle band (MB) (e.g., about 1.7 to about 2.2 GHz) frequency band, and/or a high band (HB) (e.g., about 2.2 to about 2.7 GHz) frequency band.

A second conductive portion (e.g., the second conductive portion 920b in FIG. 9A or FIG. 9C) and a region (e.g., the first region 1011 in FIG. 9A or FIG. 9C) of a printed circuit board (e.g., the first printed circuit board 1010 in FIG. 9A or FIG. 9C), which is connected to the second conductive portion, of an electronic device according to an embodiment, may be configured such that an RF signal is fed from one end (e.g., the one end adjacent to the fourth conductive portion 920d in FIG. 9A) of the second conductive portion spaced apart from a first conductive portion, so as to operate as a loop antenna.

Referring to FIG. 11B, a second conductive portion and a region (e.g., the first region 1011 in FIG. 10A or FIG. 10C) of a printed circuit board, may have an antenna gain of about −8 dB or more in about 1.4 GHz (about 1,400 MHz) to about 2.6 GHz (about 2,600 MHz) frequency band, and may have an antenna gain of about −8 dB or more even in the frequency band of about 4.8 GHz (about 4,800 MHz) or more. Through this, it may be identified that the second conductive portion and a region of the printed circuit board, which is connected to the second conductive portion, can operate as an antenna in a broadband range. For example, it may be identified that the second conductive portion and a region of the printed circuit board connected to the second conductive portion, which operate as a loop antenna, can operate as a wideband loop antenna for transmitting and/or receiving an RF signal in a GPS L1 frequency band (e.g., 1.575 GHz), a middle band (MB) (e.g., 1.7 to 2.2 GHz), a high band (HB) (e.g., 2.2 to 2.7 GHz), and/or a Wi-Fi frequency band (e.g., 2.4 GHz or 5 GHz).

Referring to FIG. 12, it may be identified that a first conductive portion and a second conductive portion, which operate as antenna radiators in frequency bands different from each other, have a transmission coefficient $S_{21}$ of about −15 dB or less in the frequency band of about 0.5 GHz or more, and have a transmission coefficient $S_{21}$ of about −20 dB or less in the frequency band of about 1.176 GHz to about 2.2 GHZ. Through this, it may be identified that the first conductive portion and the second conductive portion, which are arranged in adjacent regions, can be effectively isolated.

An electronic device (e.g., the electronic device 900 in FIG. 9A, FIG. 9B, or FIG. 9C, or the electronic device 1100 in FIG. 10) according to an embodiment of the disclosure may include a lateral member (e.g., the first lateral member 920 in FIG. 9A or FIG. 9B, or the lateral member 1120 in FIG. 10) forming at least a region of a side surface of the electronic device, the lateral member including a first conductive portion (e.g., the first conductive portion 920a in FIG. 9A), a second conductive portion (e.g., the second conductive portion 920b in FIG. 9A) adjacent to one end of the first conductive portion, and a first non-conductive portion (e.g., the first non-conductive portion 920f in FIG. 9A) positioned between the first conductive portion and the second conductive portion, a printed circuit board (e.g., the first printed circuit board 1010 in FIG. 9A or the first printed circuit board 1210 in FIG. 10) which is connected to one end of the second conductive portion, which is adjacent to the first conductive portion, and includes a first region (e.g., the first region 1011 in FIG. 9A or the first region 1211 in FIG. 10) including a conductive layer, and a ground, a wireless communication circuit (e.g., the first wireless communication circuit 1040 in FIG. 9A or the wireless communication circuit 1240 in FIG. 10) disposed on the printed circuit board, wherein the conductive layer of the first region may be electrically connected to the ground, the first conductive portion may be fed from the wireless communication circuit at a first point (e.g., the first point $P_1$ in FIG. 9A or FIG. 10) and to be grounded to the ground of the printed circuit board at a second point (e.g., the second point $P_2$ in FIG. 9A or FIG. 10) adjacent to the first region, the second conductive portion may be fed from the wireless communication circuit at a third point (e.g., the third point $P_3$ in FIG. 9A or FIG. 10) positioned at the other end of the second conductive portion, and the second conductive portion and the first region of the printed circuit board, which is connected to the second conductive portion, may operate as a loop antenna.

According to an embodiment, the side surface may include a first side surface (e.g., the first side surface 9201 in FIG. 9A) extending along a first direction, a second side surface (e.g., the second side surface 9202 in FIG. 9A) parallel to the first side surface, and a third side surface (e.g., the third side surface 9203 in FIG. 9A) extending along a second direction perpendicular to the first direction and to connect one end of the first side surface and one end of the second side surface.

According to an embodiment, the first conductive portion may be disposed on the third side surface, and the second conductive portion may be disposed on the first side surface and the third side surface.

According to an embodiment, the first conductive portion may operate as an antenna radiator for transmitting or receiving an RF signal in at least one frequency band of a first frequency band, a second frequency band, and a third frequency band.

According to an embodiment, the first region of the printed circuit board may be formed in a letter "]" shape (e.g., FIG. 9A or FIG. 9B).

According to an embodiment, the second conductive portion and the first region of the printed circuit board may operate as an antenna radiator for transmitting or receiving an RF signal in at least one frequency band of a second frequency band, a third frequency band, a fourth frequency band, and a fifth frequency band.

According to an embodiment, the lateral member may further include a third conductive portion (e.g., the third conductive portion 920c in FIG. 9A) disposed on the second side surface and the third side surface and adjacent to the other end of the first conductive portion, a fourth conductive portion (e.g., the fourth conductive portion 920d in FIG. 9A) disposed on the first side surface and adjacent to the second conductive portion, a fifth conductive portion (e.g., the fifth conductive portion 920e in FIG. 9A) disposed on the second side surface and adjacent to the third conductive portion, a second non-conductive portion (e.g., the second non-conductive portion 920g in FIG. 9A) disposed between the first conductive portion and the third conductive portion, a third non-conductive portion (e.g., the third non-conductive portion 920h in FIG. 9A) disposed between the second conductive portion and the fourth conductive portion, a fourth non-conductive portion (e.g., the fourth non-conductive portion 920i in FIG. 9A) disposed between the third conductive portion and one end of the fifth conductive portion, and a fifth non-conductive portion (e.g., the fifth non-conductive portion 920j in FIG. 9A) disposed at the other end of the fifth conductive portion.

According to an embodiment, the third conductive portion may be grounded to the ground of the printed circuit board at a fourth point (e.g., the fourth point $P_4$ in FIG. 9A or FIG. 10) which is positioned at the third conductive portion to be closer to the first conductive portion than the fifth conductive portion and to be fed from the wireless communication circuit at a fifth point (e.g., the fifth point $P_5$ in FIG. 9A or FIG. 10) which is positioned at the third conductive portion and closer to the fifth conductive portion than the first conductive portion, and the third conductive portion may operate as an antenna radiator for transmitting or receiving an RF signal in a second frequency band.

According to an embodiment, the fourth conductive portion may be grounded to the ground of the printed circuit board at a sixth point (e.g., the sixth point $P_6$ in FIG. 9A or FIG. 10) which is positioned at the fourth conductive portion and is adjacent to the second conductive portion, and to be fed from the wireless communication circuit at a seventh point (e.g., the seventh point $P_7$ in FIG. 9A or FIG. 10) spaced apart from the second conductive portion more than the sixth point and positioned at the fourth conductive portion, and the fourth conductive portion may operate as an antenna radiator for transmitting or receiving an RF signal in a fifth frequency band.

According to an embodiment, a slot (e.g., the slot S in FIG. 9A or FIG. 10), which is formed in a region adjacent to the fifth conductive portion, may be included therein.

According to an embodiment, the fifth conductive portion may include a first portion (e.g., the first portion $A_1$ in FIG. 9A or FIG. 10) adjacent to the third conductive portion and a second portion (e.g., the second portion $A_2$ in FIG. 9A or FIG. 10) spaced apart from the third conductive portion more than the first portion and adjacent to the first portion, may be fed from the wireless communication circuit at an eighth point (e.g., the eighth point $P_8$ in FIG. 9A or FIG. 10) positioned at the first portion of the fifth conductive portion, to be closer to the third conductive portion than the eighth point, and to be grounded to the ground of the printed circuit board at a ninth point (e.g., the ninth point $P_9$ in FIG. 9A or FIG. 10) positioned at the first portion, and may be fed from the wireless communication circuit at a tenth point (e.g., the tenth point $P_{10}$ in FIG. 9A or FIG. 10) positioned at the second portion of the fifth conductive portion, to be closer to the third conductive portion than the tenth point, and to be electrically connected to a switch circuit (e.g., the first switch circuit 1060 in FIG. 9A) at an eleventh point (e.g., the eleventh point $P_{11}$ n FIG. 9A or FIG. 10) positioned at the second portion, and the second portion of the fifth conductive portion may be selectively connected to a passive element (e.g., the first passive element 1061 in FIG. 9A) or the ground of the printed circuit board through the switch circuit.

According to an embodiment, the slot may operate as a slot antenna for transmitting or receiving an RF signal in at least one frequency band of a third frequency band, a sixth frequency band, and a seventh frequency band.

An electronic device (e.g., the electronic device 900 in FIG. 9A, FIG. 9B, or FIG. 9C, or the electronic device 1100 in FIG. 10) according to another embodiment of the disclosure may include a lateral member (e.g., the first lateral member 920 in FIG. 9A or FIG. 9B) forming at least a region of a side surface of the electronic device, the lateral member including a first conductive portion (e.g., the first conductive portion 920a in FIG. 9A), a second conductive portion (e.g., the second conductive portion 920b in FIG. 9A) adjacent to one end of the first conductive portion, a third conductive portion (e.g., the third conductive portion 920c in FIG. 9A) adjacent to the other end of the first conductive portion, a fourth conductive portion (e.g., the fourth conductive portion 920d in FIG. 9A) adjacent to the second conductive portion, a fifth conductive portion (e.g., the fifth conductive portion 920e in FIG. 9A) adjacent to the third conductive portion, a first non-conductive portion (e.g., the first non-conductive portion 920f in FIG. 9A) positioned between the first conductive portion and the second conductive portion, a second non-conductive portion (e.g., the second non-conductive portion 920g in FIG. 9A) disposed between the first conductive portion and the third conductive portion, a third non-conductive portion (e.g., the third non-conductive portion 920h in FIG. 9A) disposed between the second conductive portion and the fourth conductive portion, a fourth non-conductive portion (e.g., the fourth non-conductive portion 920i in FIG. 9A) disposed between the third conductive portion and one end of the fifth conductive portion, and a fifth non-conductive portion (e.g., the fifth non-conductive portion 920j in FIG. 9A) disposed at the other end of the fifth conductive portion, a printed circuit board (e.g., the first printed circuit board 1010 in FIG. 9A or the first printed circuit board 1210 in FIG. 10) which is connected to one end of the second conductive portion, which is adjacent to the first conductive portion, and includes a first region (e.g., the first region 1011 in FIG. 9A or the first region 1211 in FIG. 10) including a conductive layer, and a ground, a wireless communication circuit (e.g., the first wireless communication circuit 1040 in FIG. 9A or the wireless communication circuit 1240 in FIG. 10) disposed on the printed circuit board, wherein the conductive layer of the first region may be electrically connected to the ground, the first conductive portion may be fed from the wireless communication circuit at a first point (e.g., the first point $P_1$ in FIG. 9A or FIG. 10) and to be grounded to the ground of the printed circuit board at a second point (e.g., the second point $P_2$ in FIG. 9A or FIG. 10) adjacent to the first region, the second conductive portion may be fed from the wireless communication circuit at a third point (e.g., the third point $P_3$ in FIG. 9A or FIG. 10) positioned at the other end of the second conductive portion, and the second conductive portion and the first region of the printed circuit board, which is connected to the second conductive portion, may operate as a loop antenna.

According to an embodiment, the second conductive portion and the first region of the printed circuit board connected to the second conductive portion may operate as an antenna radiator for transmitting or receiving an RF signal of at least one frequency band of a second frequency band, a third frequency band, a fourth frequency band, and a fifth frequency band.

An electronic device (e.g., the electronic device 200 in FIG. 2A or FIG. 2B, or the electronic device 900 in FIG. 9C) according to another embodiment of the disclosure may include a foldable housing (e.g., the foldable housing 210 in FIG. 2A) including a first housing (e.g., first housing 211 in FIG. 2A), a second housing (e.g., second housing 212 in FIG. 2A), and a connecting structure (e.g., the connecting structure 250 in FIG. 2A) connecting the first housing and the second housing such that the second housing is rotatable with respect to the first housing, and a flexible display (e.g., the flexible display 240 in FIG. 2A) disposed to extend from a region of the first housing to at least a region of the second housing while crossing the connecting structure and configured to be foldable according to the rotation, wherein the first housing may include a first lateral member (e.g., the first lateral member 920 in FIG. 9C) forming a side surface of the first housing, the first lateral member including a first conductive portion (e.g., the first conductive portion 920a in FIG. 9C), a second conductive portion (e.g., the second conductive portion 920b in FIG. 9C) adjacent to one end of the first conductive portion, and a first non-conductive portion (e.g., the first non-conductive portion 920f in FIG. 9C) positioned between the first conductive portion and the second conductive portion, a first printed circuit board (e.g., the first printed circuit board 1010 in FIG. 9C) which is positioned in the first housing, is connected to one end of the second conductive portion, which is adjacent to the first conductive portion, and includes a first region including a conductive layer, and a first ground, and a wireless communication circuit (e.g., the first wireless communication circuit 1040 in FIG. 9C) disposed on the first printed circuit board, the second housing may include a second lateral member (e.g., the second lateral member 930 in FIG. 9C) forming a side surface of the second housing, and a second printed circuit board (e.g., the second printed circuit board 1020 in FIG. 9C) positioned in the second housing and including a second ground, the conductive layer of the first region may be electrically connected to the first ground, the wireless communication circuit may be electrically connected to the second printed circuit board through an electrical connecting member, the first conductive portion may be fed from the wireless communication circuit at a first point (e.g., the first point $P_1$ in FIG. 9C) and to be grounded to the first ground of the first printed circuit board at a second point (e.g., the second point $P_2$ in FIG. 9C) adjacent to the first region, the second conductive portion may be fed from the wireless communication circuit at a third point (e.g., the third point $P_3$ in FIG. 9C) positioned at the other end of the second conductive portion, and the second conductive portion and the first region of the first printed circuit board, which is connected to the second conductive portion, may operate as a loop antenna.

According to an embodiment, the first lateral member may further include a third conductive portion (e.g., the third conductive portion 920c in FIG. 9C) adjacent to the other end of the first conductive portion, a fourth conductive portion (e.g., the fourth conductive portion 920d in FIG. 9C) adjacent to the second conductive portion, a fifth conductive portion (e.g., the fifth conductive portion 920e in FIG. 9C) adjacent to the third conductive portion, a second non-conductive portion (e.g., the second non-conductive portion 920g in FIG. 9C) disposed between the first conductive portion and the third conductive portion, a third non-conductive portion (e.g., the third non-conductive portion 920h in FIG. 9C) disposed between the second conductive portion and the fourth conductive portion, a fourth non-conductive portion (e.g., the fourth non-conductive portion 920i in FIG. 9C) disposed between the third conductive portion and one end of the fifth conductive portion, and a fifth non-conductive portion (e.g., the fifth non-conductive portion 920j in FIG. 9C) disposed at the other end of the fifth conductive portion.

According to an embodiment, the second lateral member may further include a sixth conductive portion (e.g., the sixth conductive portion 930a in FIG. 9C), a seventh conductive portion (e.g., the seventh conductive portion 930b in FIG. 9C) adjacent to one end of the sixth conductive portion, an eighth conductive portion (e.g., the eighth conductive portion 930c in FIG. 9C) adjacent to the other end of the sixth conductive portion, a ninth conductive portion (e.g., the ninth conductive portion 930d in FIG. 9C) adjacent to the seventh conductive portion, a tenth conductive portion (e.g., tenth conductive portion 930e in FIG. 9C) adjacent to the eighth conductive portion, a sixth non-conductive portion (e.g., the sixth non-conductive portion 930f in FIG. 9C) disposed between the sixth conductive portion and the seventh conductive portion, a seventh non-conductive portion (e.g., the seventh non-conductive portion 930*g* in FIG. 9C) disposed between the sixth conductive portion and the eighth conductive portion, an eighth non-conductive portion (e.g., the eighth non-conductive portion 930*h* in FIG. 9C) disposed between the seventh conductive portion and the ninth conductive portion, a ninth non-conductive portion (e.g., the ninth non-conductive portion 930*i* in FIG. 9C) disposed between the eighth conductive portion and one end of the tenth conductive portion, and a tenth non-conductive portion (e.g., the tenth non-conductive portion 930*j* in FIG. 9C) disposed at the other end of the tenth conductive portion.

According to an embodiment, the sixth conductive portion may be fed from the wireless communication circuit at a fourth point (e.g., the twelfth point $P_{12}$ in FIG. 9C), and may be electrically connected to a first switch circuit (e.g., the second switch circuit 1070 in FIG. 9C) at a fifth point (e.g., the thirteenth point $P_{13}$ in FIG. 9C) adjacent to the fourth point, and the sixth conductive portion may be selectively connected to a first passive element (e.g., the second passive element 1071 in FIG. 9C) or a second ground of a second printed circuit board through the first switch circuit.

According to an embodiment, the eighth conductive portion may be fed from the wireless communication circuit at a sixth point (e.g., the fourteenth point $P_{14}$ in FIG. 9C), may be grounded to the second ground of the second printed circuit board at the seventh point (e.g., the fifteenth point $P_{15}$ in FIG. 9C), and may be electrically connected to the second switch circuit (e.g., the third switch circuit 1080 in the FIG. 9C) at an eighth point (e.g., the sixteenth point $P_{16}$ in FIG. 9C), and the eighth conductive portion may be selectively connected to a second passive element (e.g., the third passive element 1081 in FIG. 9C) or the second ground of the second printed circuit board through the second switch circuit.

According to an embodiment, when the electronic device is in a folded state (e.g., see FIG. 2B), the first conductive portion may be disposed to overlap the sixth conductive portion, the second conductive portion may be disposed to overlap the seventh conductive portion, the third conductive portion may be disposed to overlap the eighth conductive portion, the fourth conductive portion may be disposed to overlap the ninth conductive portion, and the fifth conductive portion may be disposed to overlap the tenth conductive portion.

In specific embodiments of the disclosure described above, elements included in the disclosure are expressed in a singular form or a plural form according to the specific embodiment presented herein. However, the singular or plural expression may be selected appropriately for the situation presented for the convenience of description, and the disclosure may not be limited to a singular element or multiple elements. In addition, even though an element is expressed as a plural form, the element may include a singular element, or even though an element is expressed as a singular form, the element may include multiple elements.

On the other hand, although a specific embodiment has been described in the detailed description of the disclosure, it goes without saying that various modifications are possible without departing from the scope of the disclosure. Therefore, the scope of the disclosure should not be limited to the described embodiment, and should be defined by not only the claims described below but also equivalents to the claims.

Figure 13A:
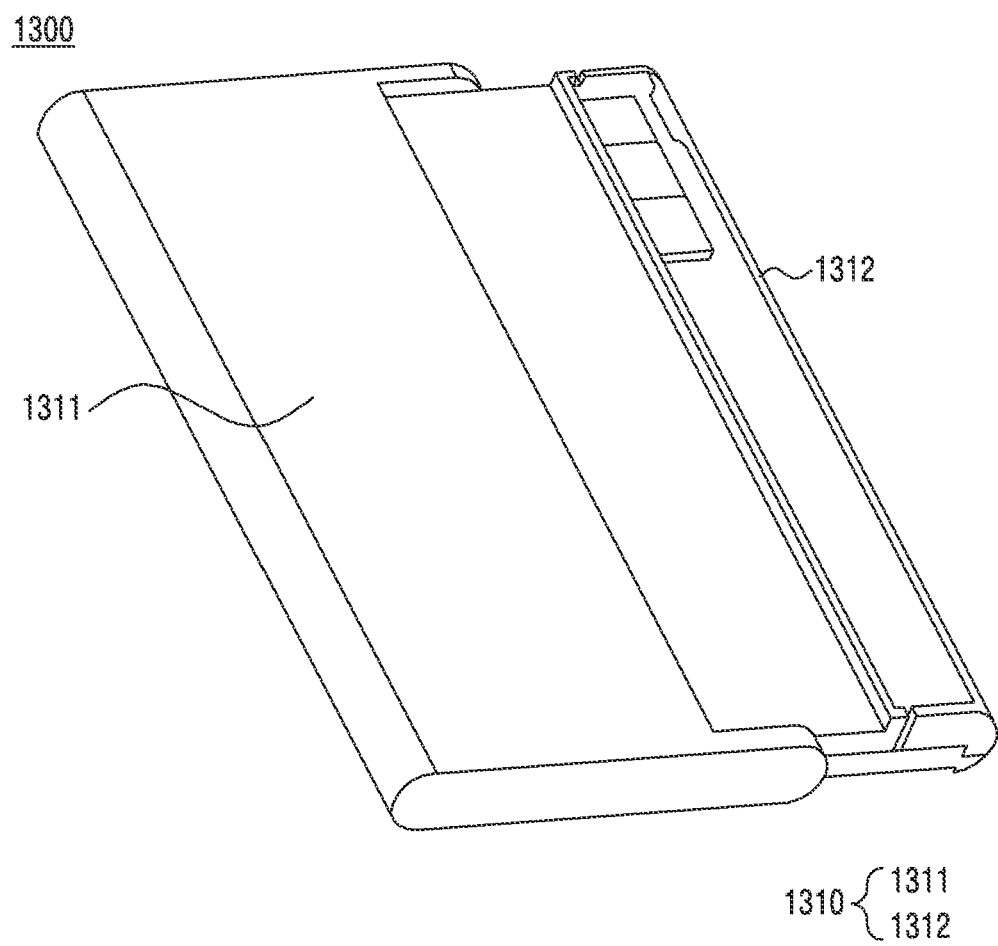
FIG. 13A is a rear perspective view of a rollable electronic device according to an embodiment of the disclosure.

FIG. 13A is a rear perspective view of a rollable electronic device according to an embodiment of the disclosure.

Figure 13B:
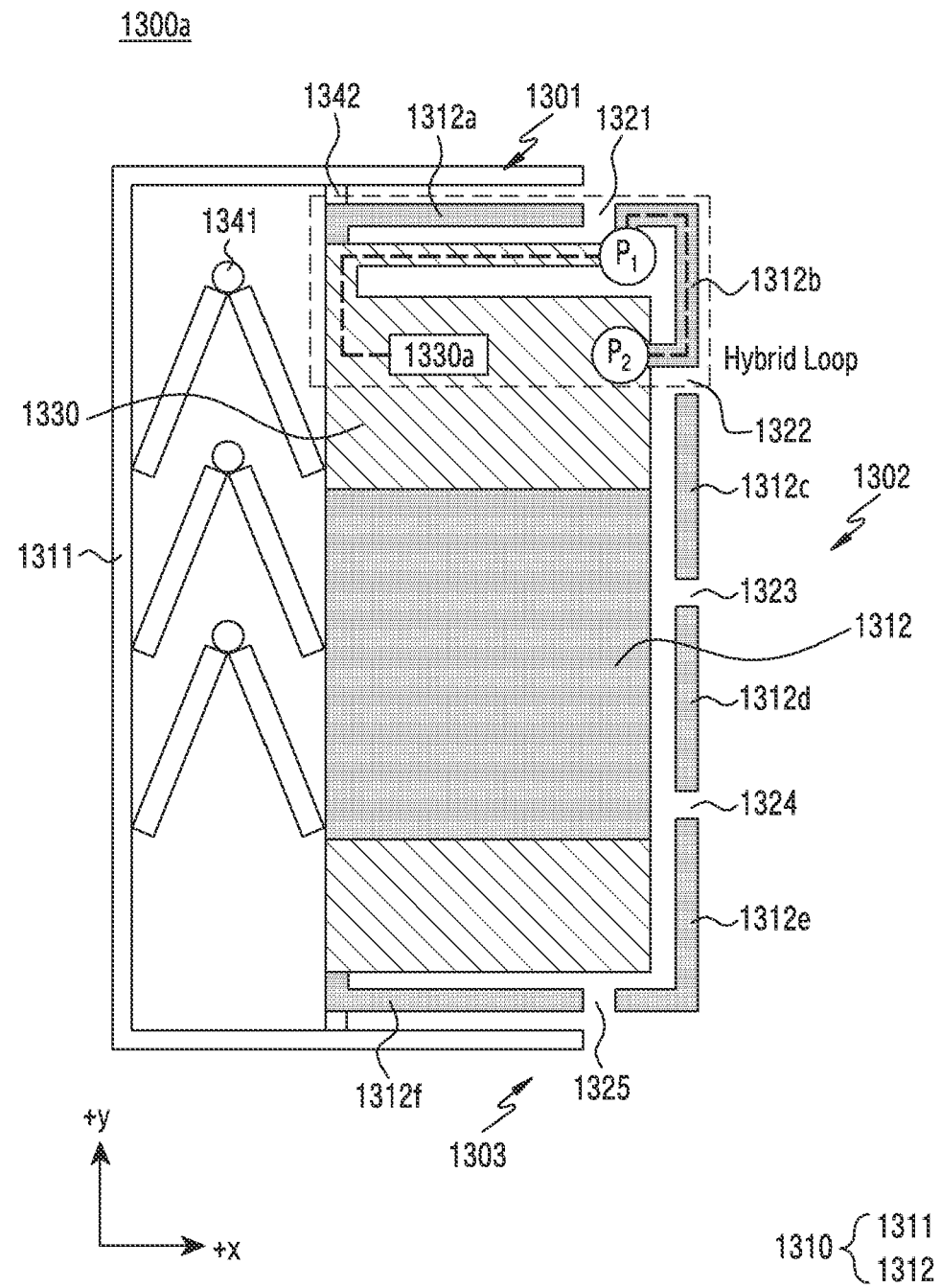
FIG. 13B is an internal view in a first state of a rollable electronic device according to an embodiment of the disclosure.

FIG. 13B is an internal view of a rollable electronic device in a first state according to an embodiment of the disclosure.

Figure 13C:
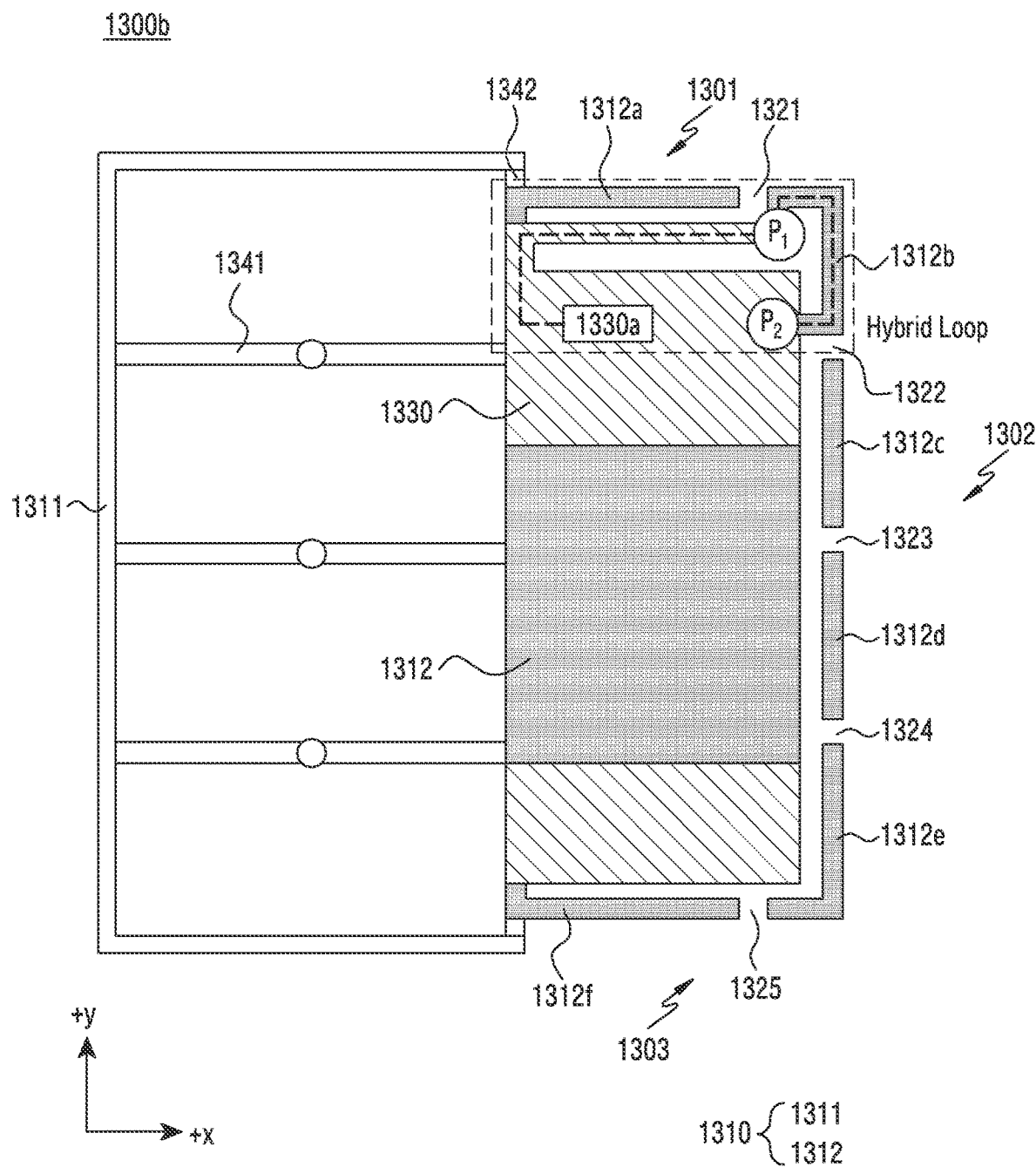
FIG. 13C is an internal view in a second state of a rollable electronic device according to an embodiment of the disclosure.

FIG. 13C is an internal view of a rollable electronic device in a second state according to an embodiment of the disclosure.

Referring to FIG. 13A, a rollable electronic device 1300 according to an embodiment may include a housing 1310.

According to an embodiment, the housing 1310 may include a first housing 1311 and a second housing 1312 coupled to be movable with respect to the first housing 1311 in a specific range.

Referring to FIGS. 13B and 13C, a rollable electronic device 1300 according to an embodiment may include a first state 1300*a* and a second state 1300*b*.

In an embodiment, the first state 1300*a* and the second state 1300*b* of the rollable electronic device 1300 may be determined according to a relative position of the second housing 1312 with respect to the first housing 1311. For example, referring to FIG. 13B, the state of the electronic device 1300, in which the first housing 1311 and the second housing 1312 are adjacent to each other, may be referred to as the first state 1300*a*. For another example, referring to FIG. 13C, the state of the electronic device 1300, in which the second housing 1312 is away from the first housing 1311 as sliding in the +x-direction in the first state 1300*a*, may be referred to as the second state 1300*b*.

In an embodiment, the rollable electronic device 1300 may be changeable between the first state 1300*a* and the second state 1300*b* by a manipulation of a user or a mechanical operation. Referring to FIG. 13B and FIG. 13C, the rollable electronic device 1300 according to an embodiment may include the first housing 1311, the second housing 1312, non-conductive members 1321, 1322, 1323, 1324, and 1325, a printed circuit board 1330, a first hinge structure 1341, and a second hinge structure 1342.

According to an embodiment, the second housing 1312 may include multiple conductive portions. In an embodiment, the second housing 1312 may include a first conductive portion 1312*a*, a second conductive portion 1312*b*, a third conductive portion 1312*c*, a fourth conductive portion 1312*d*, a fifth conductive portion 1312*e*, and a sixth conductive portion 1312*f*.

According to an embodiment, a surface, on which a display (not shown) is disposed, may be defined as the front surface of the rollable electronic device 1300, and a surface opposite to the front surface may be defined as the rear surface of the rollable electronic device 1300. In addition, a surface surrounding a space between the front surface and the rear surface may be defined as the side surface of the electronic device 1300. In an embodiment, the side surface of the rollable electronic device 1300 may include a first side surface 1301, a second side surface 1302, and a third side surface 1303.

According to an embodiment, the multiple conductive portions 1312*a*, 1312*b*, 1312*c*, 1312*d*, 1312*e*, and 1312*f* of the second housing 1312 may form one side surface of the rollable electronic device 1300. For example, the first conductive portion 1312*a* and the second conductive portion 1312*b* may form a first side surface 1301 of the rollable electronic device 1300. For another example, the second conductive portion 1312*b*, the third conductive portion 1312*c*, the fourth conductive portion 1312*d*, and the fifth conductive portion 1312*e* may form a second side surface 1302 of the rollable electronic device 1300. For another example, the fifth conductive portion 1312*e* and the sixth conductive portion 1312f may form a third side surface 1303 of the rollable electronic device 1300.

According to an embodiment, the non-conductive members 1321, 1322, 1323, 1324, 1325 may be arranged between the multiple conductive portions 1312a, 1312b, 1312c, 1312d, 1312e, and 1312f of the second housing 1312. In an embodiment, the non-conductive members each may include an insulation material, and the insulation material may be formed of ceramic, plastic, resin, or a combination of the materials.

For example, the first non-conductive member 1321 may be disposed between the first conductive portion 1312a and the second conductive portion 1312b of the second housing 1312. For another example, the second non-conductive member 1322 may be disposed between the second conductive portion 1312b and the third conductive portion 1313c of the second housing 1312. For another example, the third non-conductive member 1323 may be disposed between the third conductive portion 1312c and the fourth conductive portion 1312d of the second housing 1312. For another example, the fourth non-conductive member 1324 may be disposed between the fourth conductive portion 1312d and the fifth conductive portion 1312e of the second housing 1312. For another example, the fifth conductive member 1325 may be disposed between the fifth conductive portion 1312e and the sixth conductive portion 1312f.

According to an embodiment, at least one electronic component may be disposed on the printed circuit board 1330. For example, a processor (e.g., the processor 120 in FIG. 1), a memory (e.g., the memory 130 in FIG. 1), an interface (e.g., the interface 177 in FIG. 1), and/or a wireless communication circuit 1330a may be arranged on the printed circuit board 1330.

According to an embodiment, the printed circuit board 1330 may include a ground (not shown). In an embodiment, the first conductive portion 1312a, the second conductive portion 1312b, the third conductive portion 1312c, the fourth conductive portion 1312d, the fifth conductive portion 1312e, and/or the sixth conductive portion 1312f of the second housing 1312 may be electrically connected to the ground of the printed circuit board 1330.

According to an embodiment, the printed circuit board 1330 may include a region adjacent to the first conductive portion 1312a and the second conductive portion 1312b of the second housing 1312. In an embodiment, the region may be formed in an inverted-L shape.

According to an embodiment, the wireless communication circuit 1330a may feed a point of the first conductive portion 1312a, the second conductive portion 1312b, the third conductive portion 1312c, the fourth conductive portion 1312d, the fifth conductive portion 1312e, and the sixth conductive portion 1312f of the second housing 1312. The conductive portions 1312a, 1312b, 1312c, 1312d, 1312e, and 1312f of the second housing 1312 may be electrically connected to the wireless communication circuit 1330a, and accordingly, may operate as an antenna radiator for transmitting and/or receiving an RF signal in a designated frequency band.

For example, the wireless communication circuit 1330a may feed a point of the first conductive portion 1312a of the second housing 1312, and thus the first conductive portion 1312a of the second housing 1312 may operate as an antenna radiator for transmitting and/or receiving an RF signal of a designated frequency band. In the same manner, the second conductive portion 1312b, the third conductive portion 1312c, the fourth conductive portion 1312d, the fifth conductive portion 1312e, and the sixth conductive portion 1312f of the second housing 1312 may operate as an antenna radiator for transmitting and/or receiving an RF signal in the designated frequency band.

According to an embodiment, the second conductive portion 1312b may operate as a loop antenna for transmitting and/or receiving an RF signal of a designated frequency band as the wireless communication circuit 1330a feeds to a point of the second conductive portion 1312b.

For example, the wireless communication circuit 1330a may feed a first point $P_1$ of the second conductive portion 1312b of the second housing 1312, and the second conductive portion 1312b may be grounded at a second point $P_2$ of the printed circuit board 1330. The second conductive portion 1312b of the second housing 1312 may operate as a loop antenna radiator for transmitting and/or receiving an RF signal of a designed frequency band, based on the electrical path.

According to an embodiment, a state of the rollable electronic device 1300 may be changed by the first hinge structure 1341. For example, as the first hinge structure 1341, which is folded, is unfolded (unfolding), the second housing 1312, which is coupled to the first hinge structure 1341, may slide in the +x-direction so that the rollable electronic device 1300 is changed from the first state 1300a to the second state 1300b. For another example, as the first hinge structure 1341, which is unfolded, is folded, the second housing 1312, which is coupled to the first hinge structure 1341, may slide in the −x-direction so that the rollable electronic device 1300 is changed from the second state 1300b to the first state 1300a.

According to an embodiment, the second hinge structure 1342 may fix the second housing 1312 to the first housing 1311. For example, when the rollable electronic device 1300 is the first state 1300a, the second hinge structure 1342, which is coupled to the second housing 1312, may be coupled to a first portion of the first housing 1311 so as to fix the second housing 1312 to the first housing 1311. For another example, when the rollable electronic device 1300 is the second state 1300b, the second hinge structure 1352, which is coupled to the second housing 1312, may be coupled to a second portion of the first housing so as to fix the second housing 1312 to the first housing 1311. In an embodiment, the second portion of the second housing 1312, to which the second hinge structure 1342 is coupled, may be positioned in the +x-direction more than the first portion.

Figure 14A:
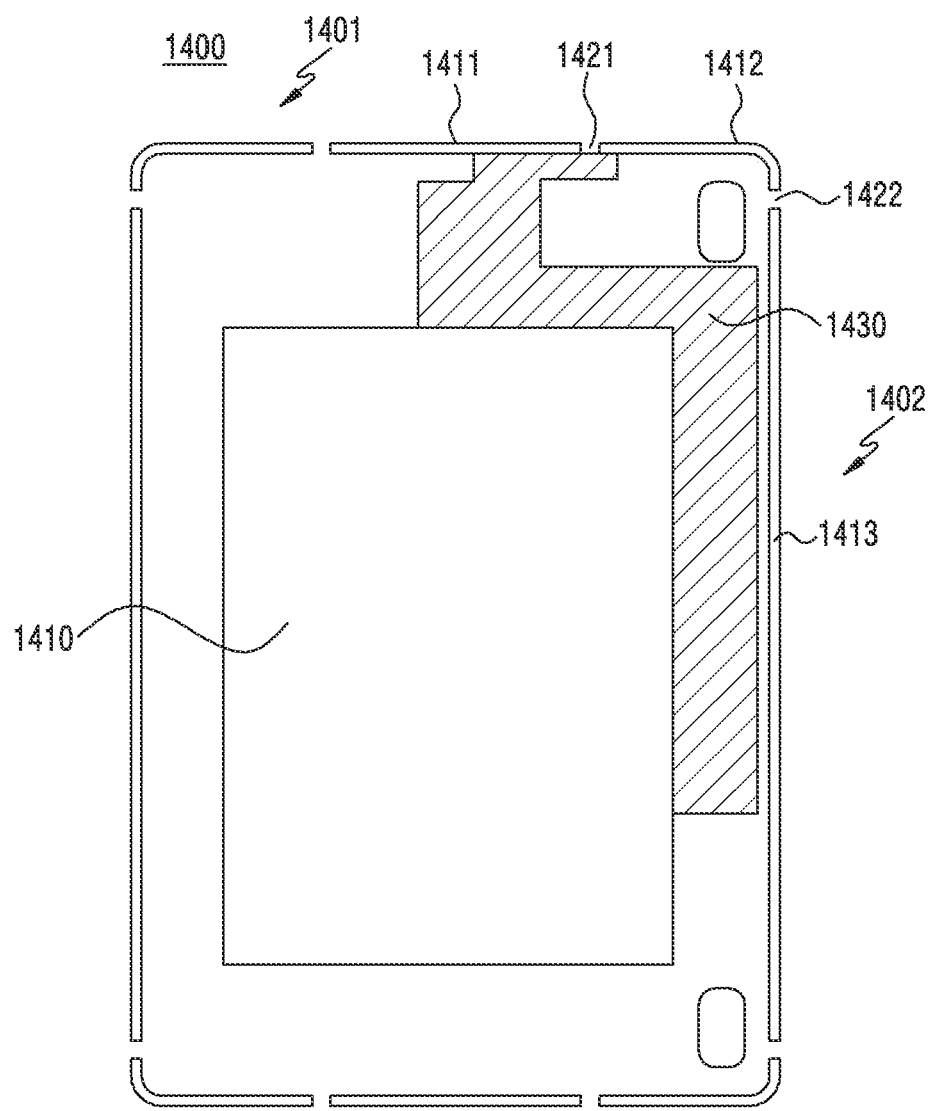
FIG. 14A is a rear view of a tablet electronic device according to an embodiment of the disclosure.

FIG. 14A is a rear view of a tablet electronic device according to an embodiment of the disclosure.

Figure 14B:
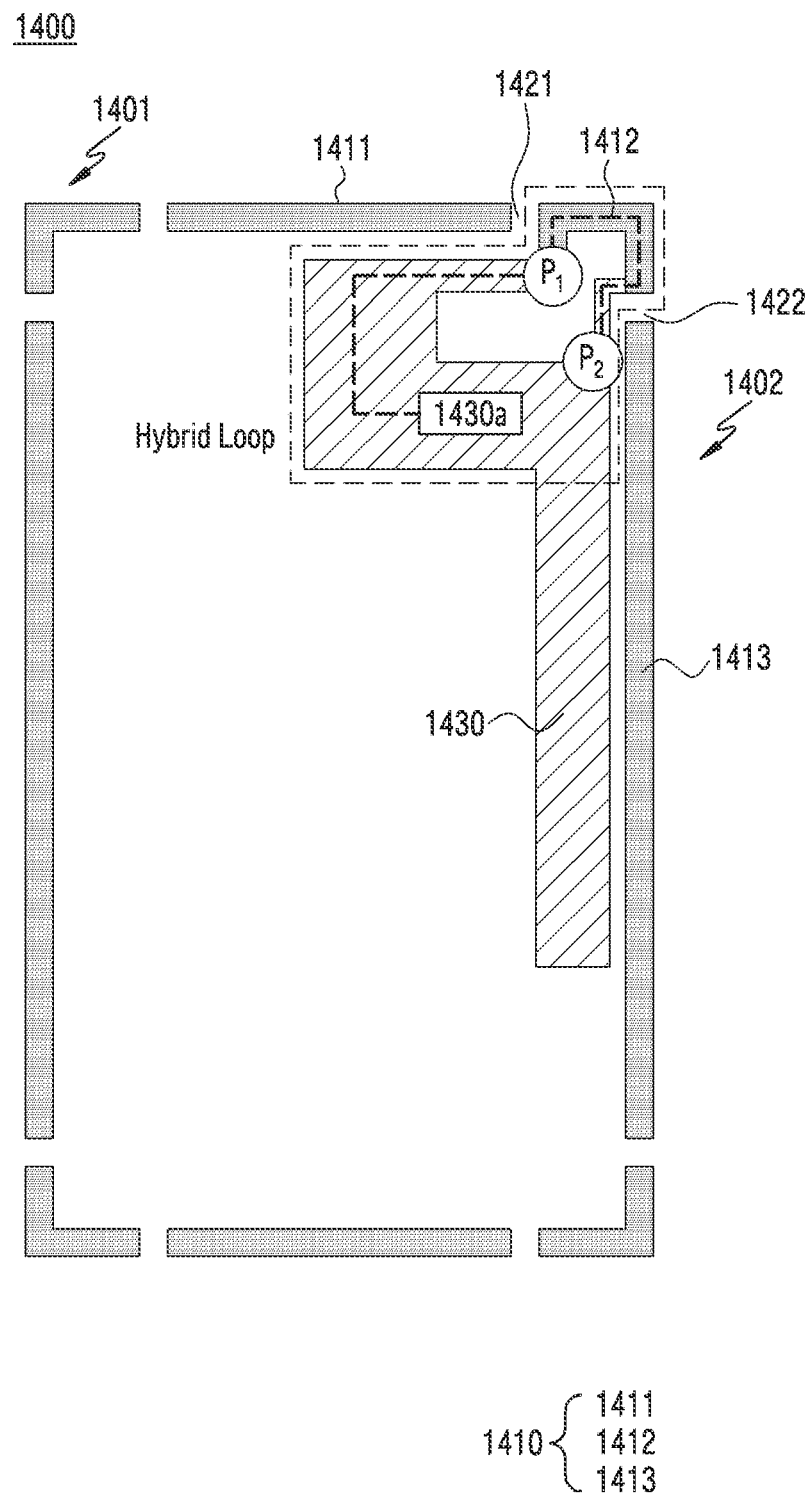
FIG. 14B is a view showing an antenna arrangement structure inside a tablet electronic device according to an embodiment of the disclosure.

FIG. 14B is a view showing an antenna arrangement structure inside a tablet electronic device according to an embodiment of the disclosure.

Referring to FIGS. 14A and 14B, a tablet electronic device 1400 according to an embodiment may include a housing 1410, non-conductive members 1421 and 1422, and a printed circuit board 1430.

According to an embodiment, the housing 1410 may include multiple conductive portions. In an embodiment, the housing 1410 may include a first conductive portion 1411, a second conductive portion 1412, and a third conductive portion 1413.

According to an embodiment, a surface, on which a display (not shown) is disposed, may be defined as the front surface of the tablet electronic device 1400, and a surface opposite to the front surface may be defined as the rear surface of the tablet electronic device 1400. In addition, a surface, which surrounds a space between the front surface and the rear surface, may be defined as the side surface of the tablet electronic device 1400. In an embodiment, the side surface of the tablet electronic device 1400 may include a first side surface 1401 and a second side surface 1402.

According to an embodiment, the multiple conductive portions 1411, 1412, and 1413 of the housing 1410 may form one side surface of the tablet electronic device 1400. For example, the first conductive portion 1411 and the second conductive portion 1412 may form the first side surface 1401 of the tablet electronic device 1400. For another example, the second conductive portion 1412 and the third conductive portion 1413 may form the second side surface 1402 of the tablet electronic device 1400.

According to an embodiment, the non-conductive members 1421 and 1422 may be arranged between the multiple conductive portions 1411, 1412, and 1413 of the housing 1410. In an embodiment, the non-conductive members 1421 and 1422 each may include an insulation material, and the insulation material may be formed of ceramic, plastic, resin, or a combination of the materials.

For example, the first non-conductive member 1421 may be disposed between the first conductive portion 1411 and the second conductive portion 1412 of the housing 1410. For another example, the second non-conductive member 1422 may be disposed between the second conductive portion 1412 and the third conductive portion 1413 of the housing 1410.

Referring to FIG. 14B, at least one electronic component may be disposed on the printed circuit board 1430 according to an embodiment. For example, a processor (e.g., the processor 120 in FIG. 1), a memory (e.g., the memory 130 in FIG. 1), an interface (e.g., the interface 177 in FIG. 1), and/or a wireless communication circuit 1430a may be arranged on the printed circuit board 1430.

According to an embodiment, the printed circuit board 1430 may include a ground (not shown). In an embodiment, the first conductive portion 1411, the second conductive portion 1412, and the third conductive portion 1413 of the housing 1410 may be electrically connected to the ground of the printed circuit board 1430.

According to an embodiment, the printed circuit board 1430 may include a region adjacent to the first conductive portion 1411 and the second conductive portion 1412 of the housing 1410. In an embodiment, the region may be formed in an inverted-L shape.

According to an embodiment, the wireless communication circuit 1430a may feed a point of the first conductive portion 1411, the second conductive portion 1412, and the third conductive portion 1413 of the housing 1410. The multiple conductive portions 1411, 1412, and 1413 of the housing 1410 may be electrically connected to the wireless communication circuit 1430a, and accordingly, may operate as an antenna radiator for transmitting and/or receiving an RF signal in a designated frequency band.

For example, the wireless communication circuit 1430a may feed a point of the first conductive portion 1411 of the housing 1410, and thus the first conductive portion 1411 of the housing 1410 may operate as an antenna radiator for transmitting and/or receiving an RF signal of a designated frequency band. In the same manner, the second conductive portion 1412 and the third conductive portion 1413 of the housing 1410 may operate as an antenna radiator for transmitting and/or receiving an RF signal of a designed frequency band.

In an embodiment, multiple conductive portions of the housing 1410 other than the first conductive portion 1411, the second conductive portion 1412, and the third conductive portion 1413 may also operate as an antenna radiator for transmitting and/or receiving an RF signal of the designated frequency band as the wireless communication circuit feeds to a point of the multiple conductive portions.

According to an embodiment, the second conductive portion 1412 may operate as a loop antenna for transmitting and/or receiving an RF signal of a designated frequency band as the wireless communication circuit 1430a feeds to a point of the second conductive portion 1412.

For example, the wireless communication circuit 1430a may feed a first point $P_1$ of the second conductive portion 1412 of the housing 1410, and the second conductive portion 1412 may be grounded at a second point $P_2$ of the printed circuit board 1430. The second conductive portion 1412 of the housing 1410 may operate as a loop antenna radiator for transmitting and/or receiving an RF signal of a designed frequency band, based on the electrical path.

Figure 15A:
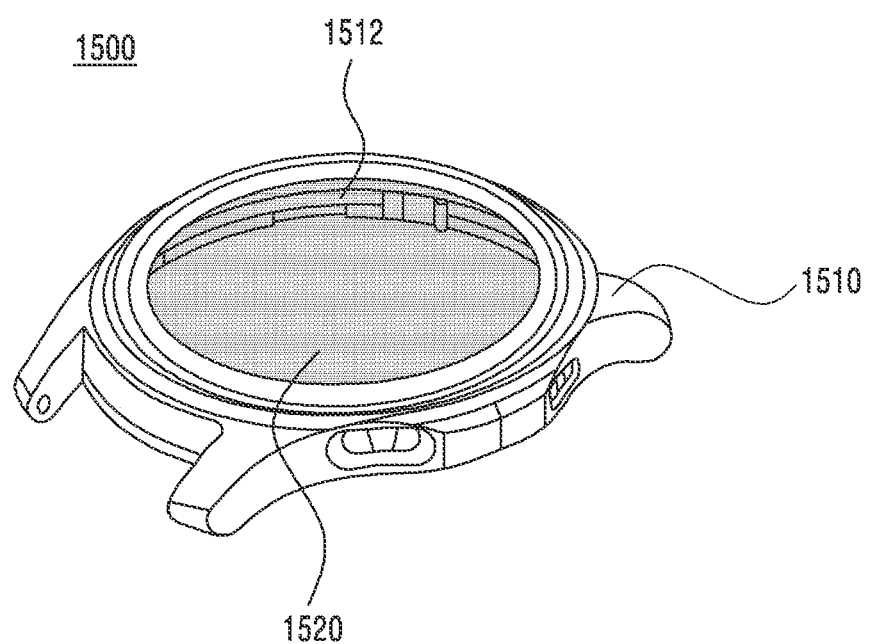
FIG. 15A is a front perspective view of a wearable electronic device according to an embodiment of the disclosure.

FIG. 15A is a front perspective view of a wearable electronic device according to an embodiment of the disclosure.

Referring to FIG. 15A, a wearable electronic device 1500 may include a housing 1510 and a display 1520.

According to an embodiment, the housing 1510 may include a frame 1512. In an embodiment, the frame 1512 may form at least a part of a side surface of housing 1510.

According to an embodiment, the frame 1512 may be formed of a conductive material. For example, the frame 1512 may be formed of a metal material such as aluminum. According to an embodiment, an antenna structure for transmitting and/or receiving a radio frequency (RF) signal may be formed by at least a part of the frame 1512.

According to an embodiment, the display 1520 may be seated in a space formed by the frame 1512, and may be seen from the outside through an opening formed through the frame 1512. According to an embodiment, the shape of the display 1520 may be a shape corresponding to the shape of the opening formed through the frame 1512. The display 1520 may have various shapes such as a circle, an oval, or a polygon.

Figure 15B:
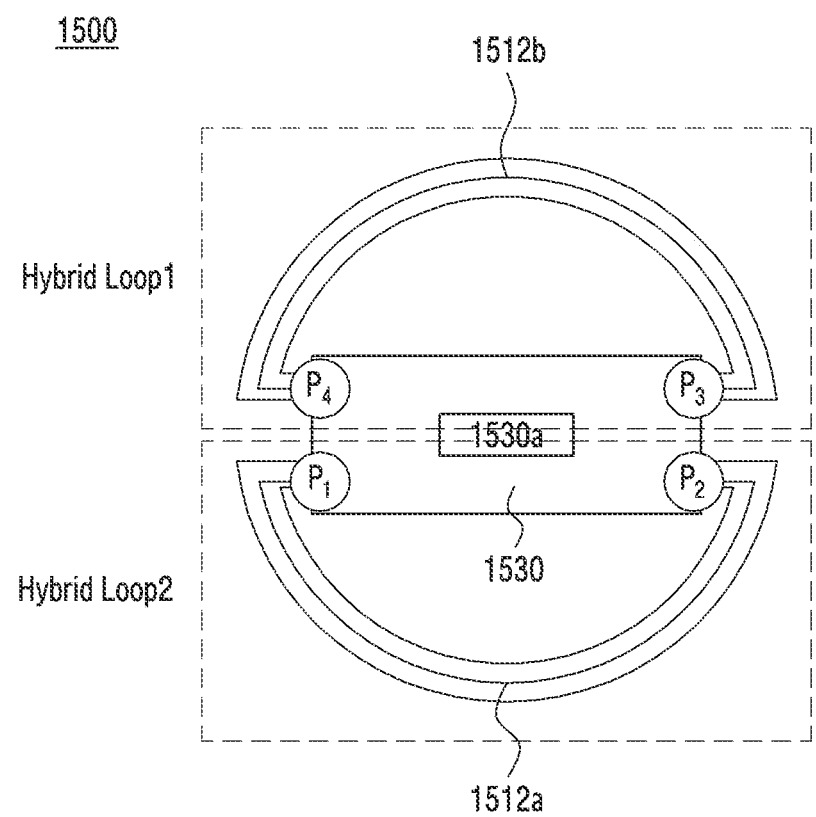
FIG. 15B is a view showing an antenna arrangement structure inside a wearable electronic device according to an embodiment of the disclosure.

FIG. 15B is a view showing an antenna arrangement structure inside a wearable electronic device according to an embodiment of the disclosure.

Referring to FIG. 15B, according to an embodiment, a wearable electronic device 1500 may include a printed circuit board 1530. In an embodiment, a wireless communication circuit 1530a may be disposed on the printed circuit board 1530.

According to an embodiment, the frame 1512 may include multiple conductive portions. For example, the frame 1512 may include a first conductive portion 1512a and a second conductive portion 1512b.

According to an embodiment, non-conductive members may be disposed between the conductive portions 1512a and 1512b of the frame 1512. In an embodiment, the non-conductive members each may include an insulation material, and the insulation material may be formed of ceramic, plastic, resin, or a combination of the materials.

According to embodiment, the wireless communication circuit 1530a may be disposed on the printed circuit board 1530.

According to an embodiment, the printed circuit board 1530 may include a ground (not shown). In an embodiment, the first conductive portion 1512a and/or the second conductive portion 1512b of the frame 1512 may be grounded to the ground of the printed circuit board 1530.

According to an embodiment, the wireless communication circuit 1530a may feed a point of the first conductive portion 1512a and the second conductive portion 1512b of the frame 1512. The conductive portions 1512a and 1512b of the frame 1512 may be electrically connected to the wireless communication circuit 1530a, and accordingly, may operate as a loop antenna radiator for transmitting and/or receiving an RF signal in a designated frequency band.

For example, the wireless communication circuit 1530a may feed a first point $P_1$ of the first conductive portion 1512a of the frame 1512, and the first conductive portion 1512a may be grounded at a second point $P_2$ of the printed circuit board 1530. The first conductive portion 1512a of the frame 1512 may operate as a loop antenna radiator for transmitting and/or receiving an RF signal of a designed frequency band, based on the electrical path.

For another example, the wireless communication circuit 1530a may feed a third point $P_3$ of the second conductive portion 1512b of the frame 1512, and the second conductive portion 1512b may be grounded at a fourth point $P_4$ of the printed circuit board 1530. The second conductive portion 1512b of the frame 1512 may operate as an antenna radiator for transmitting and/or receiving an RF signal of a designed frequency band, based on the electrical path.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
    a lateral side member forming at least a portion of a lateral side of the electronic device and comprising a first conductive portion, a second conductive portion, and a first non-conductive portion disposed between the first conductive portion and the second conductive portion;
    a printed circuit board comprising a ground and a first portion electrically connected to the ground, wherein the first portion is electrically connected to the first conductive portion and a first end of the second conductive portion; and
    a wireless communication circuit disposed on the printed circuit board,
    wherein the first conductive portion is fed power from the wireless communication circuit, and is electrically connected to the ground of the printed circuit board via the first portion,
    wherein the second conductive portion is fed power from the wireless communication circuit at a second end of the second conductive portion, and is electrically connected to the ground of the printed circuit board via the first portion, and
    wherein the second conductive portion and the first portion of the printed circuit board correspond to a loop antenna.

2. The electronic device of claim 1, wherein the lateral side comprises:
    a first lateral side extending along a first direction;
    a second lateral side parallel to the first lateral side; and
    a third lateral side extending along a second direction perpendicular to the first direction and connecting an end of the first lateral side and an end of the second lateral side.

3. The electronic device of claim 2,
    wherein the first conductive portion forms at least a portion of the third lateral side, and
    wherein the second conductive portion forms at least a portion of the first lateral side and at least a portion of the third lateral side.

4. The electronic device of claim 2, wherein the lateral member further comprises:
    a third conductive portion forming at least a portion of the second lateral side and at least a portion of the third lateral side and adjacent to the first conductive portion;
    a fourth conductive portion forming at least a portion of the first lateral side and adjacent to the second conductive portion;
    a fifth conductive portion forming at least a portion of the second lateral side and adjacent to the third conductive portion;
    a second non-conductive portion disposed between the first conductive portion and the third conductive portion;
    a third non-conductive portion disposed between the second conductive portion and the fourth conductive portion;
    a fourth non-conductive portion disposed between the third conductive portion and an end of the fifth conductive portion; and
    a fifth non-conductive portion disposed at another end of the fifth conductive portion.

5. The electronic device of claim 4,
    wherein the third conductive portion is:
        electrically connected to the ground of the printed circuit board at a point of the third conductive portion closer to the first conductive portion than the fifth conductive portion, and
        fed power from the wireless communication circuit at a point of the third conductive portion closer to the fifth conductive portion than the first conductive portion, and
    wherein the third conductive portion operates as an antenna radiator for transmitting or receiving a radio frequency (RF) signal in of a second frequency band.

6. The electronic device of claim 4,
    wherein the fourth conductive portion is:
        electrically connected to the ground of the printed circuit board at a point of the fourth conductive portion, and
        fed power from the wireless communication circuit at a point spaced apart from the second conductive portion, and
    wherein the fourth conductive portion operates as an antenna radiator for transmitting or receiving a radio frequency (RF) signal of a third frequency band.

7. The electronic device of claim 4, wherein the lateral side member further comprises a slot formed in a region adjacent to the fifth conductive portion.

8. The electronic device of claim 7,
    wherein the fifth conductive portion comprises:
        a second portion adjacent to the third conductive portion; and
        a third portion spaced apart from the third conductive portion more than the second portion and adjacent to the second portion,
    and
        wherein the third portion of the fifth conductive portion is selectively connected to a passive element or the ground of the printed circuit board through a switch circuit.

9. The electronic device of claim 7, wherein the slot operates as a slot antenna for transmitting or receiving a radio frequency (RF) signal.

10. The electronic device of claim 1, wherein the first conductive portion operates as an antenna radiator for transmitting or receiving a radio frequency (RF) signal in at least one frequency band of a first frequency band, a second frequency band, or a third frequency band.

11. The electronic device of claim 1, wherein the first portion has an L shape.

12. An electronic device comprising:
- a foldable housing comprising a first housing, a second housing, and a connecting structure connecting the first housing and the second housing such that the second housing is rotatable with respect to the first housing, wherein the first housing includes a lateral side member forming at least portion of a lateral side of the electronic device and comprising a first conductive portion, a second conductive portion, and a first non-conductive portion disposed between the first conductive portion and the second conductive portion;
- a flexible display disposed on the foldable housing;
- a printed circuit board comprising a ground and a first portion electrically connected to the ground, wherein the first portion is electrically connected to the first conductive portion and a first end of the second conductive portion; and
- a wireless communication circuit disposed on the printed circuit board, wherein the first conductive portion is fed power from the wireless communication circuit, and is electrically connected to the ground of the printed circuit board via the first portion, wherein the second conductive portion is fed power from the wireless communication circuit at a second end of the second conductive portion, and is electrically connected to the ground of the printed circuit board via the first portion, and wherein the second conductive portion and the first portion of the printed circuit board correspond to a loop antenna.

13. The electronic device of claim 12, wherein the lateral side comprises:
- a first lateral side extending along a first direction;
- a second lateral side parallel to the first lateral side; and
- a third lateral side extending along a second direction perpendicular to the first direction and connecting an end of the first lateral side and an end of the second lateral side.

14. The electronic device of claim 13,
wherein the first conductive portion forms at least portion of the third lateral side, and
wherein the second conductive portion forms at least portion of the first lateral side and at least portion of the third lateral side.

15. The electronic device of claim 12, wherein the first portion has a L shape.

* * * * *